US012573417B2

(12) United States Patent
Ingraito et al.

(10) Patent No.: US 12,573,417 B2
(45) Date of Patent: Mar. 10, 2026

(54) COMPUTER-IMPLEMENTED METHOD OF PROVIDING DATA FOR AN AUTOMATED BABY CRY ASSESSMENT

(71) Applicant: ZOUNDREAM S.L., BARCELONA, ZWEIGNIEDERLASSUNG BASEL (SCHWEIZ), Basel (CH)

(72) Inventors: Paolo Francesco Ingraito, Carzago Riviera (IT); Ana Laguna Pradas, Manzanares el Real (ES)

(73) Assignee: ZOUNDREAM S.L., BARCELONA, ZWEIGNIEDERLASSUNG BASEL (SCHWEIZ), Basel (CH)

( * ) Notice: Subject to any disclaimer, the term of this patent is extended or adjusted under 35 U.S.C. 154(b) by 393 days.

(21) Appl. No.: 18/015,732

(22) PCT Filed: Jul. 13, 2021

(86) PCT No.: PCT/EP2021/025257
§ 371 (c)(1),
(2) Date: Jan. 12, 2023

(87) PCT Pub. No.: WO2022/012777
PCT Pub. Date: Jan. 20, 2022

(65) Prior Publication Data

US 2023/0260535 A1 Aug. 17, 2023

(30) Foreign Application Priority Data

Jul. 13, 2020 (EP) .................................... 20020321

(51) Int. Cl.
*G10L 25/18* (2013.01)
*G10L 25/63* (2013.01)
*G10L 25/84* (2013.01)

(52) U.S. Cl.
CPC .............. *G10L 25/63* (2013.01); *G10L 25/18* (2013.01); *G10L 25/84* (2013.01)

(58) Field of Classification Search
CPC .......... G10L 25/63; G10L 25/18; G10L 25/84
See application file for complete search history.

(56) References Cited

U.S. PATENT DOCUMENTS 6,150,941 A * 11/2000 Geiger .................. A61B 5/113 600/459
9,899,037 B2 * 2/2018 Paul ...................... G10L 15/075
(Continued)

FOREIGN PATENT DOCUMENTS

CN 1564245 A 1/2005
CN 103530979 A 1/2014
(Continued)

OTHER PUBLICATIONS

W. A. Jabbar, H. K. Shang, S. N. I. S. Hamid, A. A. Almohammedi, R. M. Ramli and M. A. H. Ali, "IoT-BBMS: Internet of Things-Based Baby Monitoring System for Smart Cradle," in IEEE Access, vol. 7, pp. 93791-93805, 2019, doi: 10.1109/ACCESS.2019.2928481 (Year: 2019).*
(Continued)

*Primary Examiner* — Douglas Godbold
*Assistant Examiner* — Mulugeta Tuji Dugda
(74) *Attorney, Agent, or Firm* — McDonald Hopkins LLC

(57) ABSTRACT

A computer-implemented method of providing data for an automated baby cry assessment is suggested, comprising the steps of acoustically monitoring a baby and providing a corresponding stream of sound data, detecting a cry in the stream of sound data, selecting cry related data from the sound data in response to the detection of a cry, determining personal baby data for a personalized cry assessment, preparing an assessment stage for assessment according to
(Continued)

personal baby data, and feeding cry related data into the cry assessment stage prepared according to personal baby data. Furthermore, an automated baby cry assessment arrangement is suggested.

18 Claims, 10 Drawing Sheets

(56) References Cited

U.S. PATENT DOCUMENTS

| | | | | |
|---|---|---|---|---|
| 2008/0003550 | A1 | 1/2008 | Dunstan | |
| 2013/0317815 | A1 | 11/2013 | Hong et al. | |
| 2014/0044269 | A1 | 2/2014 | Anderson | |
| 2015/0265206 | A1 * | 9/2015 | Sheinkopf | A61B 5/4076 704/208 |
| 2016/0351074 | A1 * | 12/2016 | Paul | A61B 5/4803 |
| 2016/0364963 | A1 | 12/2016 | Matsuoka et al. | |
| 2017/0178667 | A1 | 6/2017 | Hofer et al. | |
| 2019/0180772 | A1 | 6/2019 | Richards et al. | |
| 2020/0135229 | A1 * | 4/2020 | Richards | G10L 25/63 |
| 2021/0110924 | A1 * | 4/2021 | Tkach | G16H 50/30 |
| 2021/0134307 | A1 * | 5/2021 | Murmann | G10L 19/02 |

FOREIGN PATENT DOCUMENTS

| | | | | |
|---|---|---|---|---|
| CN | 104347066 | A | 2/2015 | |
| CN | 106653001 | A | 5/2017 | |
| CN | 106653059 | A | 5/2017 | |
| CN | 107280679 | A * | 10/2017 | A61B 5/6804 |
| CN | 107591162 | A | 1/2018 | |
| CN | 107657963 | A | 2/2018 | |
| CN | 107886953 | A | 4/2018 | |
| CN | 109243493 | A | 1/2019 | |
| CN | 109658953 | A | 4/2019 | |
| CN | 110085216 | A | 8/2019 | |
| CN | 106653001 | B * | 3/2020 | G10L 15/02 |
| CN | 106653059 | B | 6/2020 | |
| GB | 2234840 | A | 2/1991 | |
| JP | 2002278582 | A | 9/2002 | |
| JP | 2002367049 | A | 12/2002 | |
| JP | 2019095931 | | 6/2019 | |
| KR | 20030077489 | A | 10/2003 | |
| KR | 20050023812 | A | 3/2005 | |
| KR | 20080035549 | A | 4/2008 | |
| KR | 1020100000466 | A | 1/2010 | |
| KR | 20110113359 | A | 10/2011 | |
| KR | 20120107382 | A | 10/2012 | |
| KR | 20160118527 | A * | 10/2016 | G10L 25/78 |

OTHER PUBLICATIONS

A. Bğnicğ, H. Cucu, A. Buzo, D. Burileanu and C. Burileanu, “Baby cry recognition in real-world conditions,” 2016 39th International Conference on Telecommunications and Signal Processing (TSP), Vienna, Austria, 2016, pp. 315-318, (Year: 2016).*

Rothenberg, S. J., Cansino, S., Sepkoski, C., Torres, L. M., Medina, S., Schnaas, L., . . . & Karchmer, S. (1995). Prenatal and perinatal lead exposures alter acoustic cry parameters of neonate. Neurotoxicology and teratology, 17(2), 151-160. (Year: 1995).*

Chittora, Anshu, and Hemant A. Patil. “Data collection of infant cries for research and analysis.” Journal of Voice 31, No. 2 (2017): 252-e15. (Year: 2017).*

Japanese Patent Office, Office Action issued in counterpart Japanese patent app. 2023-502740 on Feb. 4, 2025 including an English translation provided by the Japanese associate appearing before the Japanese Office (Feb. 4, 2025).

Cohen and Lavner, “Infant cry analysis and detection,” 2012 IEEE 27-th Convention of Electrical and Electronics Engineers in Israel (2012).

S. Ntalampiras, “Audio Pattern Recognition of Baby Crying Sound Events,” Journal of the Audio Engineering Society, vol. 63, No. 5 (May 2015).

Turan and Erzi, “Monitoring Infant's Emotional Cry in Domestic Environments using the Capsule Network Architecture,” conference: Interspeech 2018, Hyderabad (Sep. 2, 2018).

C. C. Onu et al., “Neural Transfer Learning for Cry-based Diagnosis of Perinatal Asphyxia,” conference: Interspeech 2019, arXiv:1906.10199 [cs.LG], https://doi.org/10.48550/arXiv.1906.10199 (Jun. 24, 2019).

C. C. Onu, “Harnessing infant cry for swift, cost-effective diagnosis of Perinatal Asphyxia in low-resource settings,” 2014 IEEE Canada International Humanitarian Technology Conference—(IHTC), Montreal, QC, Canada, pp. 1-4, doi: 10.1109/IHTC.2014.7147559 (2014).

C. C. Onu et al., “Ubenwa Cry-based Diagnosis of Birth Asphyxia”, 31st Conference on Neural Information Processing Systems (NIPS 2017), Long Beach, CA, USA (2017).

D. Lederman, Master thesis “Automatic Classification of Infant's Cry,” Ben-Gurion University of the Negev, Faculty of engineering sciences, Department of Electrical and Computer Engineering (Oct. 2002).

European Patent Office, Written opinion for PCT/EP2021/025257A1 (Jan. 20, 2022).

J. Saraswathy et al., “Time-frequency analysis in infant cry classification using quadratic time frequency distributions,” Biocybernetics and Biomedical Engineering 38, p. 634-645 (May 2018).

Jeyaraman et al., “A review: Survey on automatic Infant Cry Analysis and Classification,” Health and Technology 8, 391-404 (Jul. 16, 2018).

R.I. Tuduce, “Automated Baby Cry Classification on a Hospital-acquired Baby Cry Database,” 42nd International Conference on Telecommunications and Signal Processing, TSP 2019, pp. 343-346 (Jul. 1, 2019).

R.P. Balandong, “Review paper: Acoustic Analysis of Baby Cry,” Department of Biomedical Engineering Faculty of Engineering University of Malaya, available at: https://www.researchgate.net/publication/257527998_ACOUSTIC_ANALYSIS_OF_BABY_CRY (May 2013).

Renanti et al., “Infant Cries Identification by using Codebook as Feature Matching, and MFCC as Feature Extraction,” Journal of Theoretical and Applied Information Technology, vol. 56, No. 2 (Oct. 22, 2013).

Reyes-García et al., “A Hybrid System for Automatic Infant Cry Recognition II,” Encyclopedia of Artificial Intelligence (2009).

S. Asthana et al., “An investigation into classification of infant cries using modified signal processing methods,” 2015 2nd International Conference on Signal Processing and Integrated Networks (SPIN), Noida, India, pp. 679-684 (Feb. 2015).

* cited by examiner

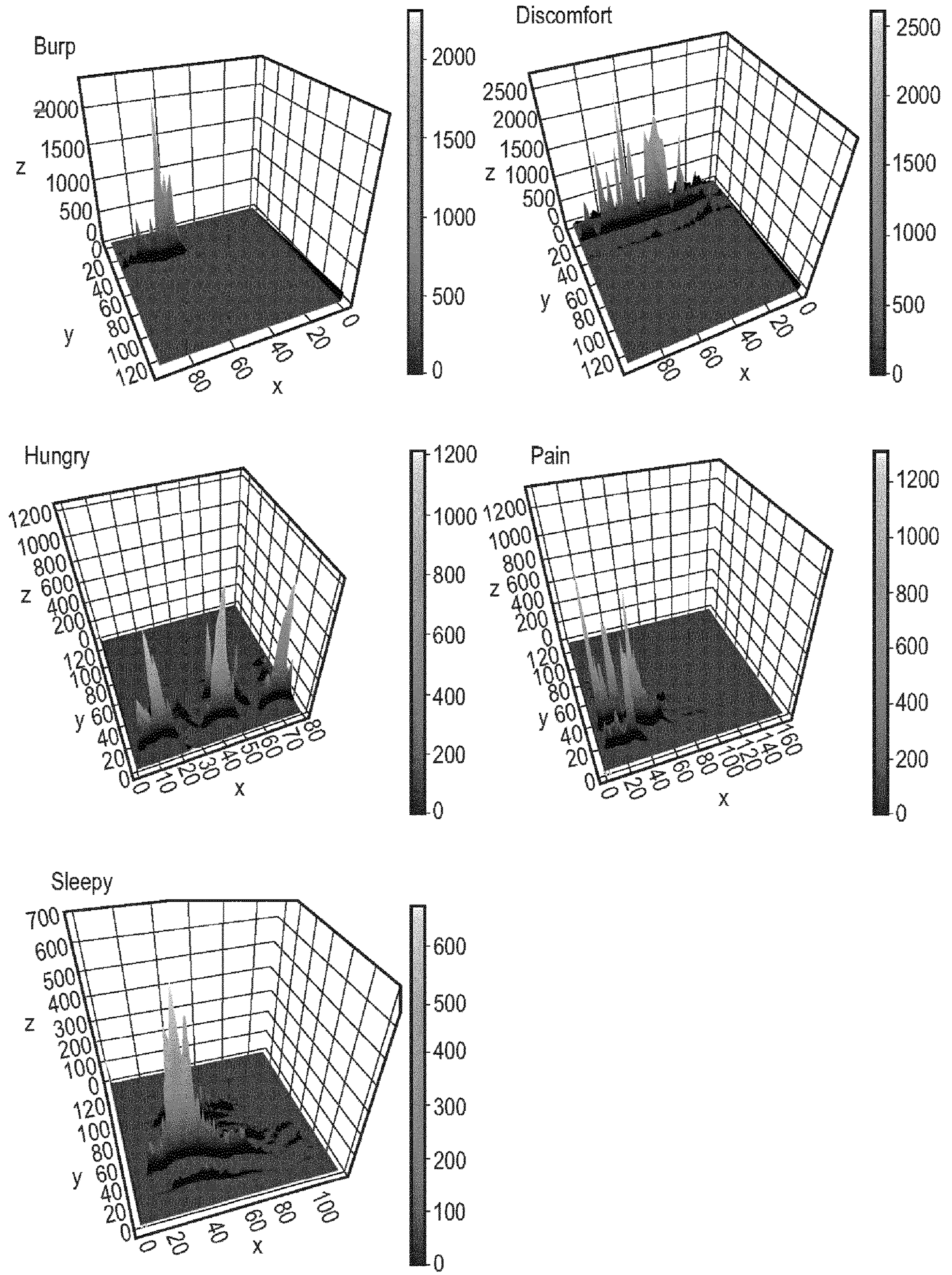
Fig. 3a-e: 3d spectrograms

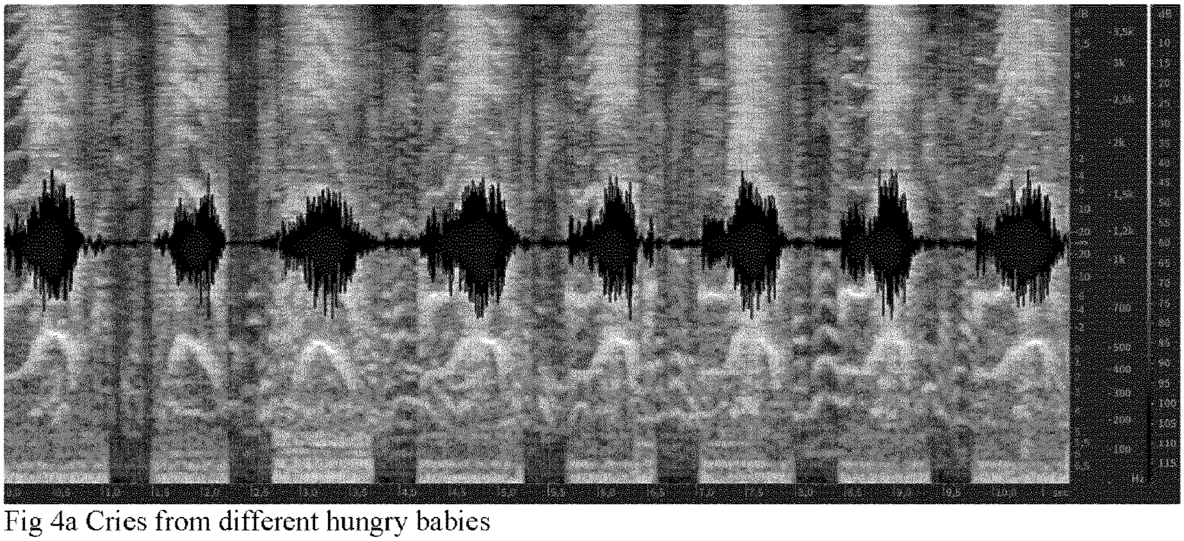
Fig 4a Cries from different hungry babies
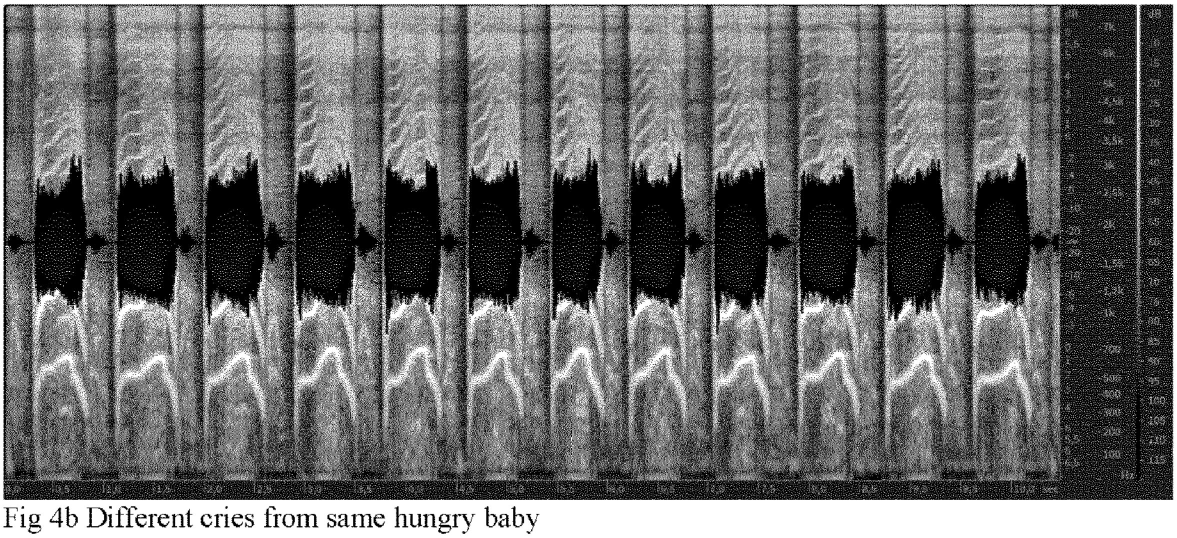
Fig 4b Different cries from same hungry baby

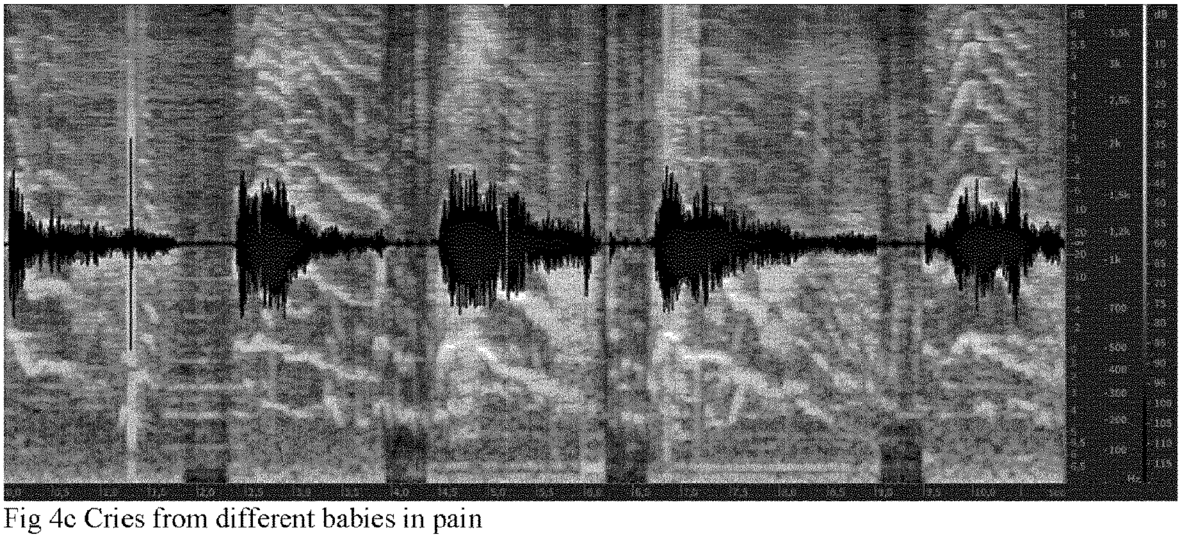
Fig 4c Cries from different babies in pain
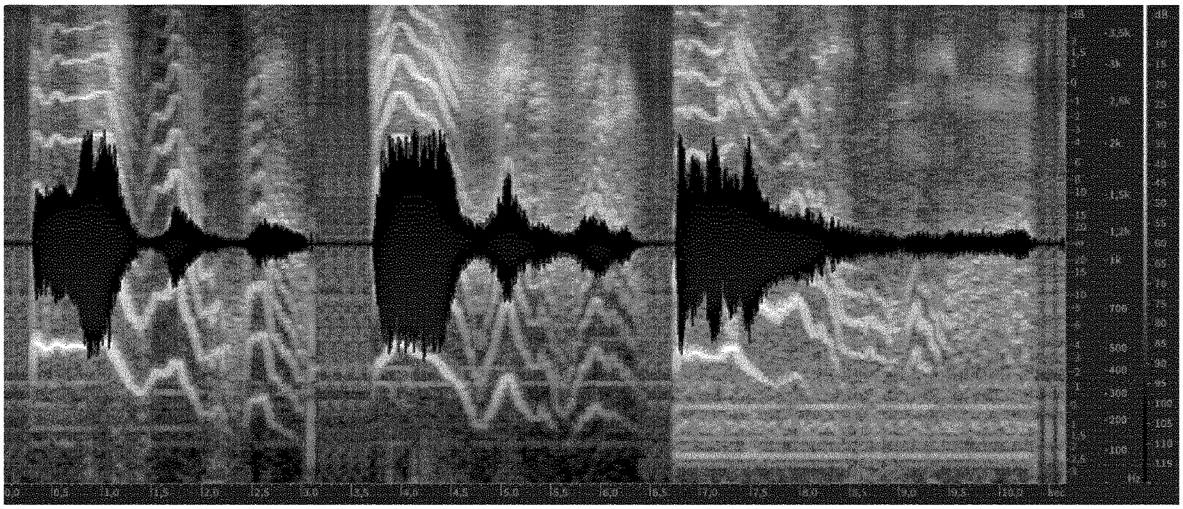
Fig 4d Different cries from same baby in pain

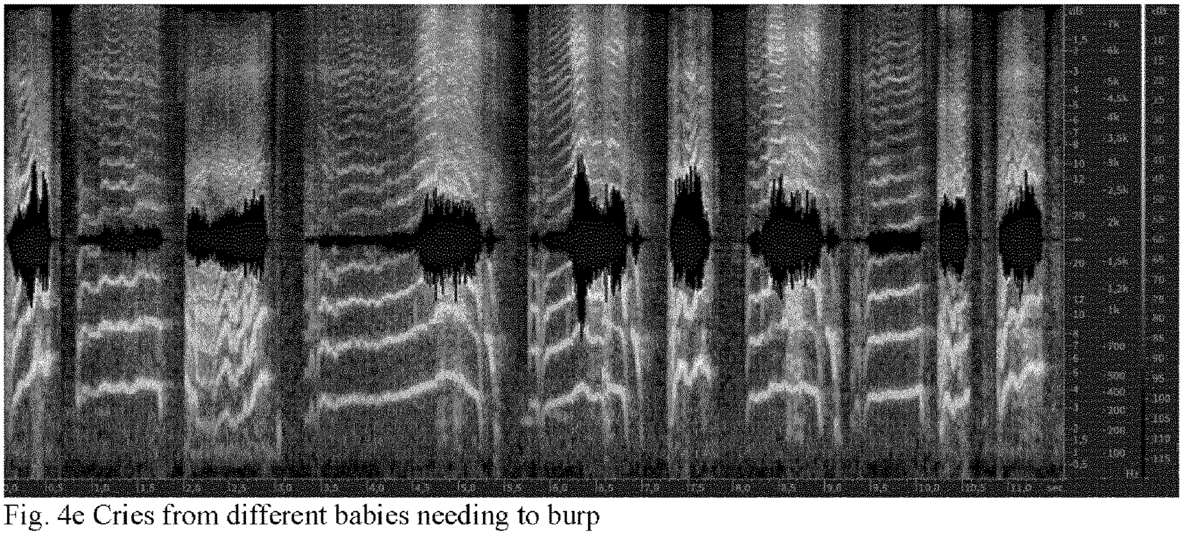
Fig. 4e Cries from different babies needing to burp
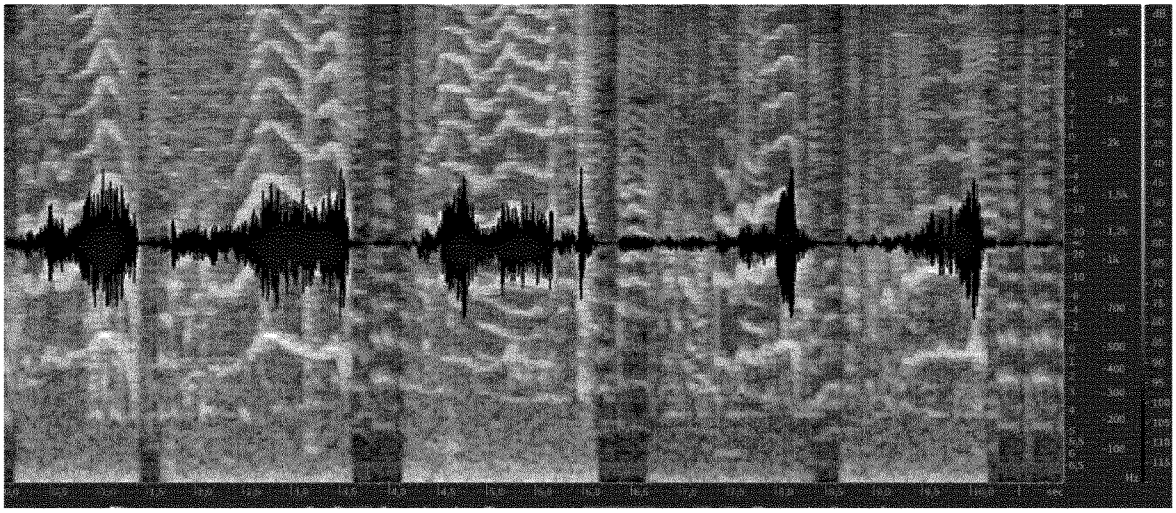
Fig. 4f Different cries from the same baby needing to burp

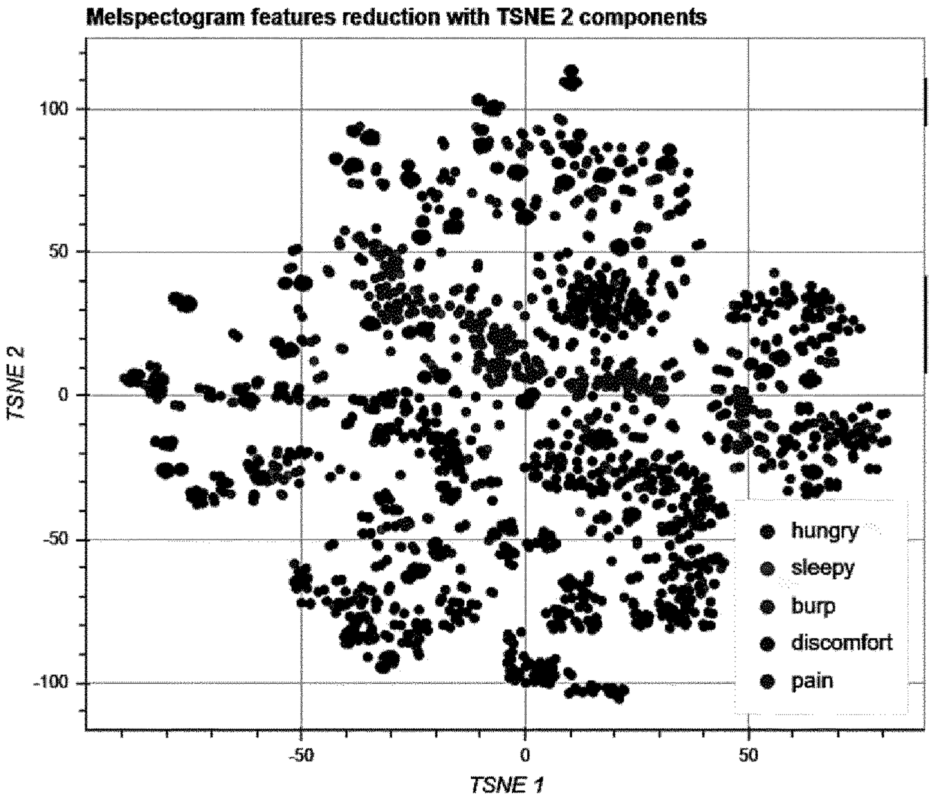
Fig. 5a Overall Clusters of Cries
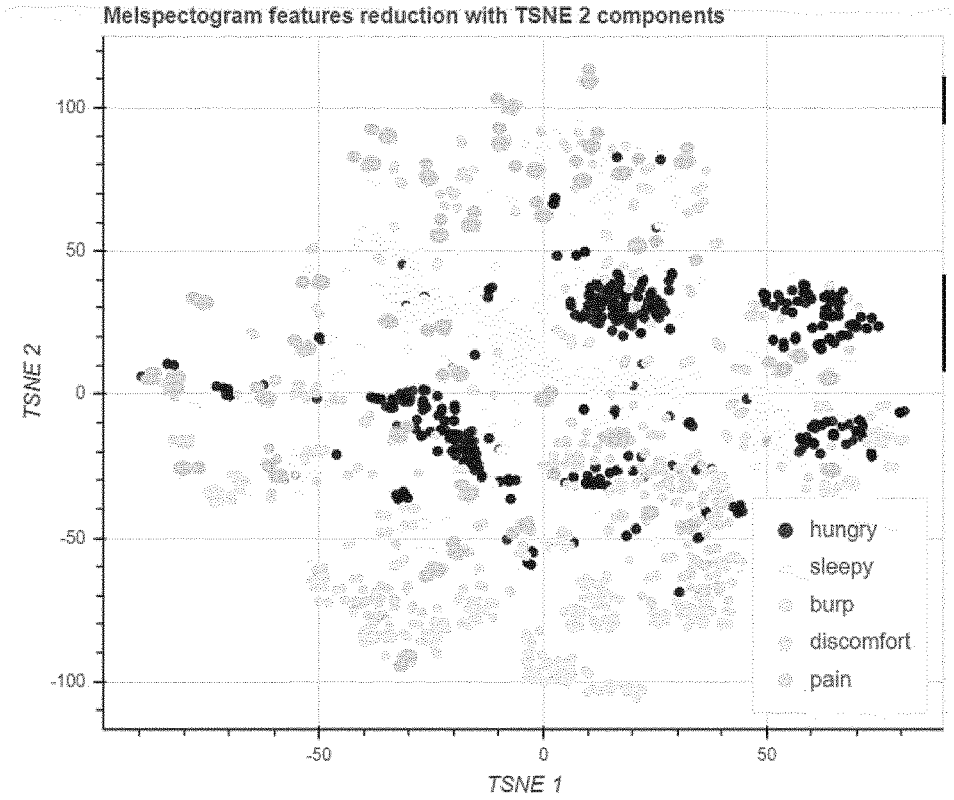
Fig. 5b Hungry Cries in overall cluster

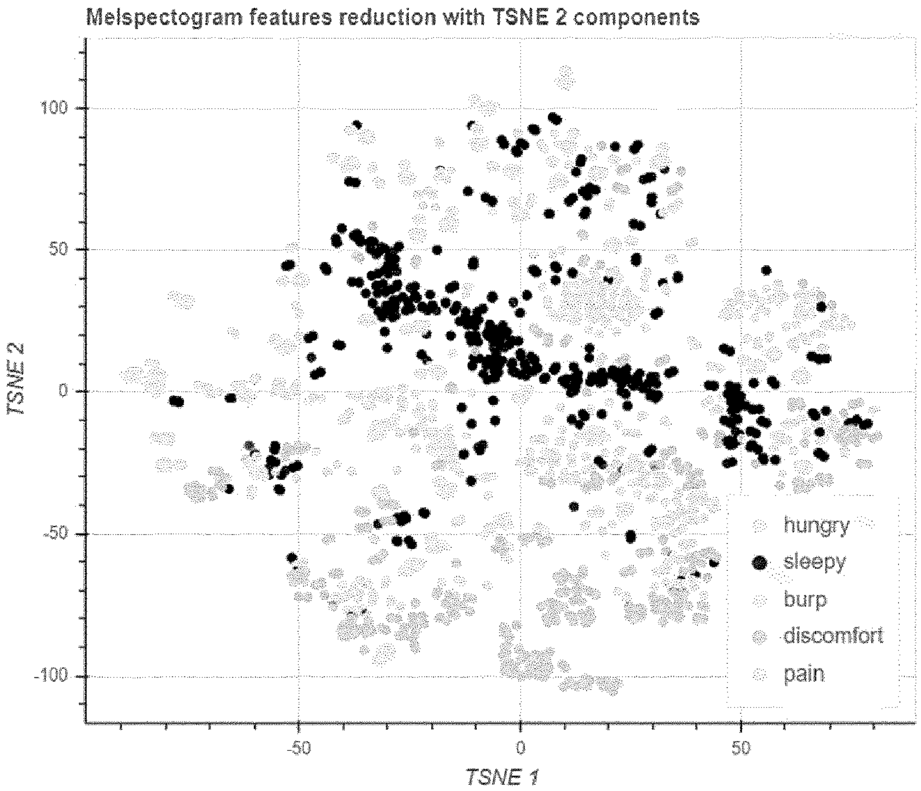
Fig. 5c : "Sleepy Cries in overall cluster
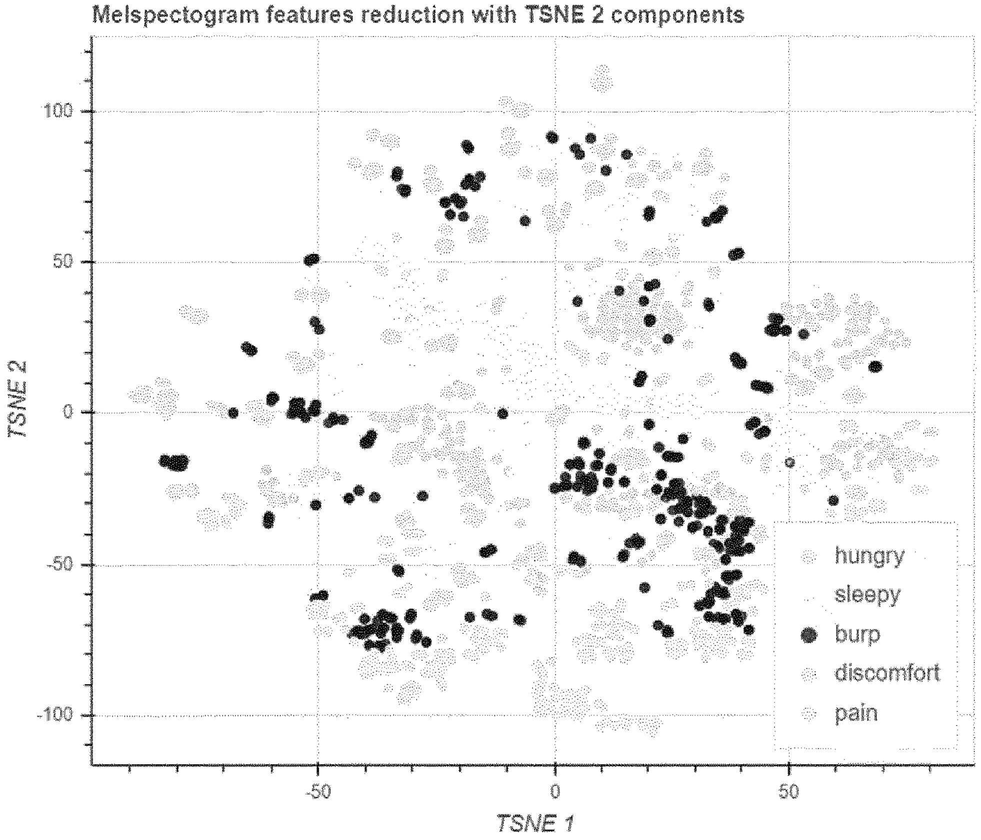
Fig. 5d : "Need to Burp" Cries in overall cluster

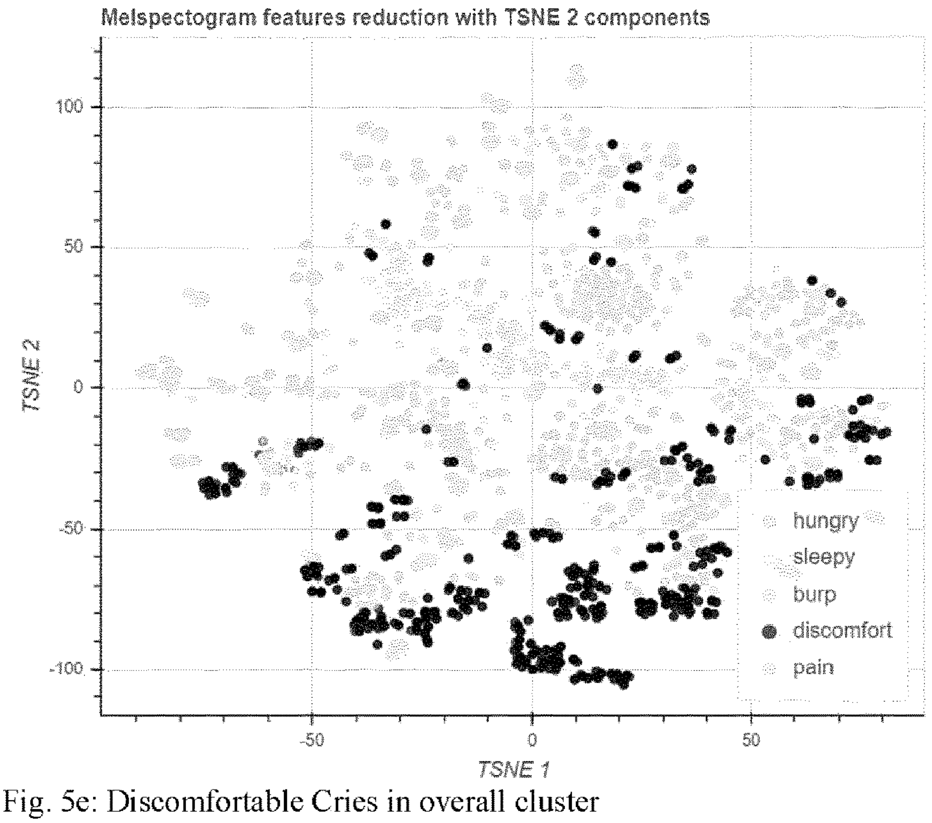
Fig. 5e: Discomfortable Cries in overall cluster
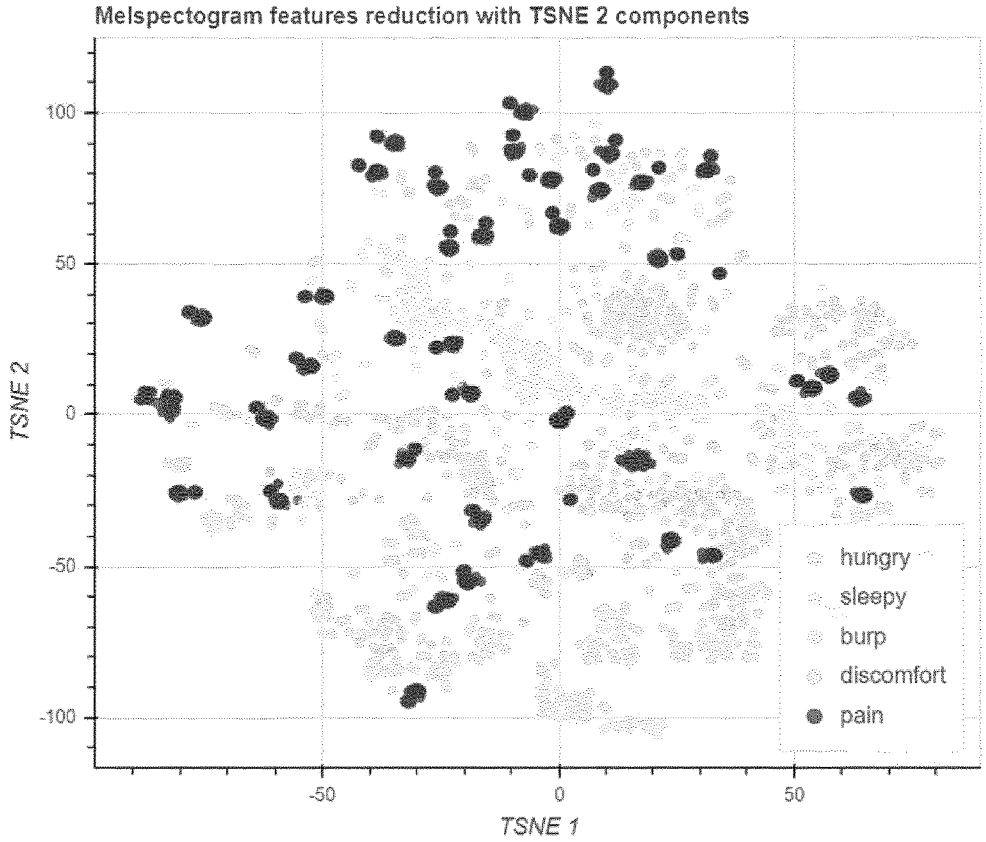
Fig. 5f : Pain Cries in overall cluster

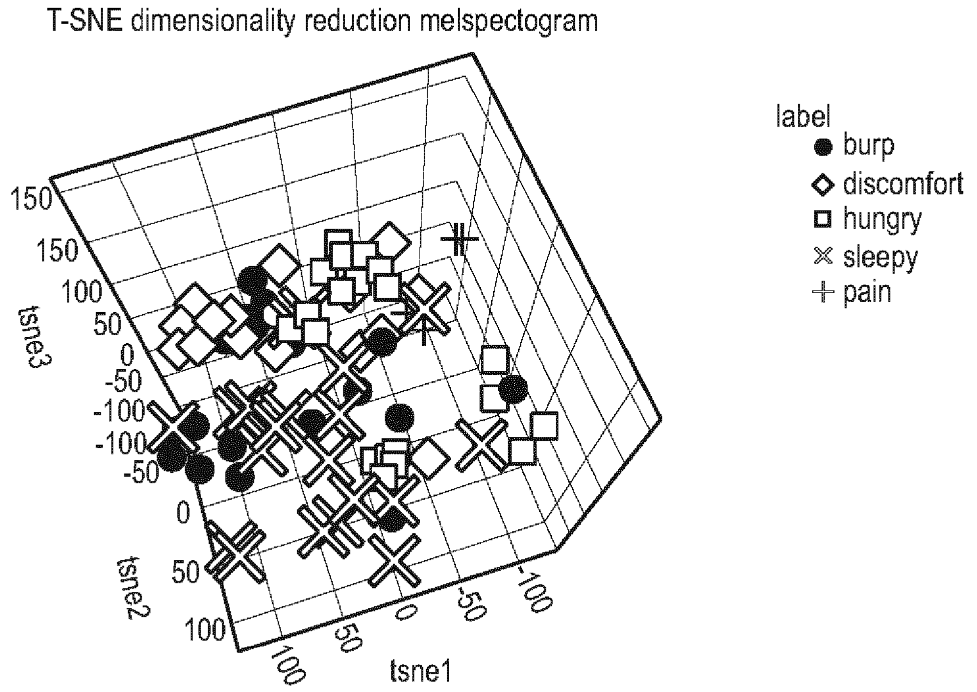
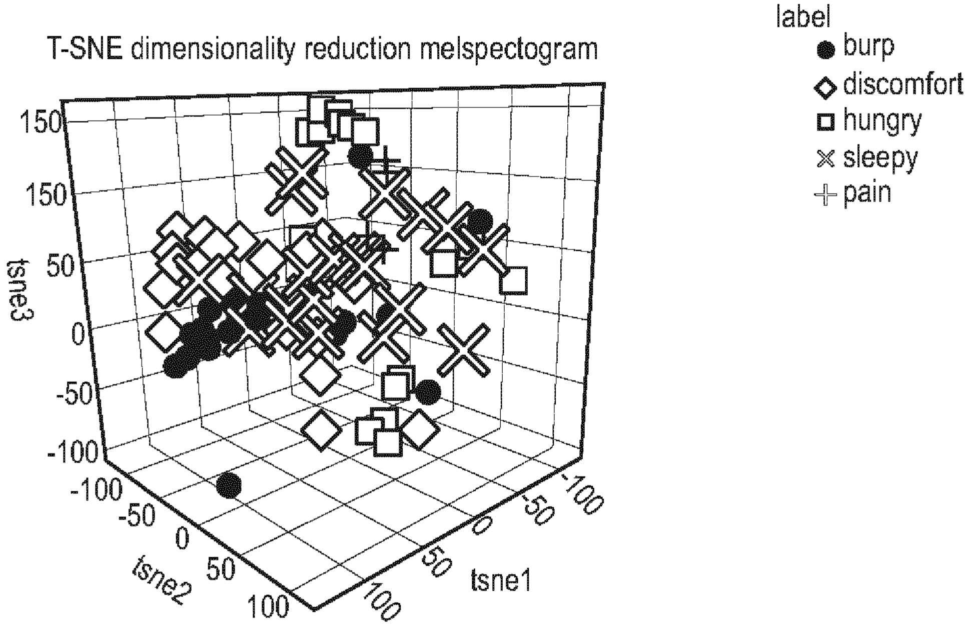
Fig. 6 3d-representation of a T-SNE dimensionality reduction melspectrogram shown from two different perspectives

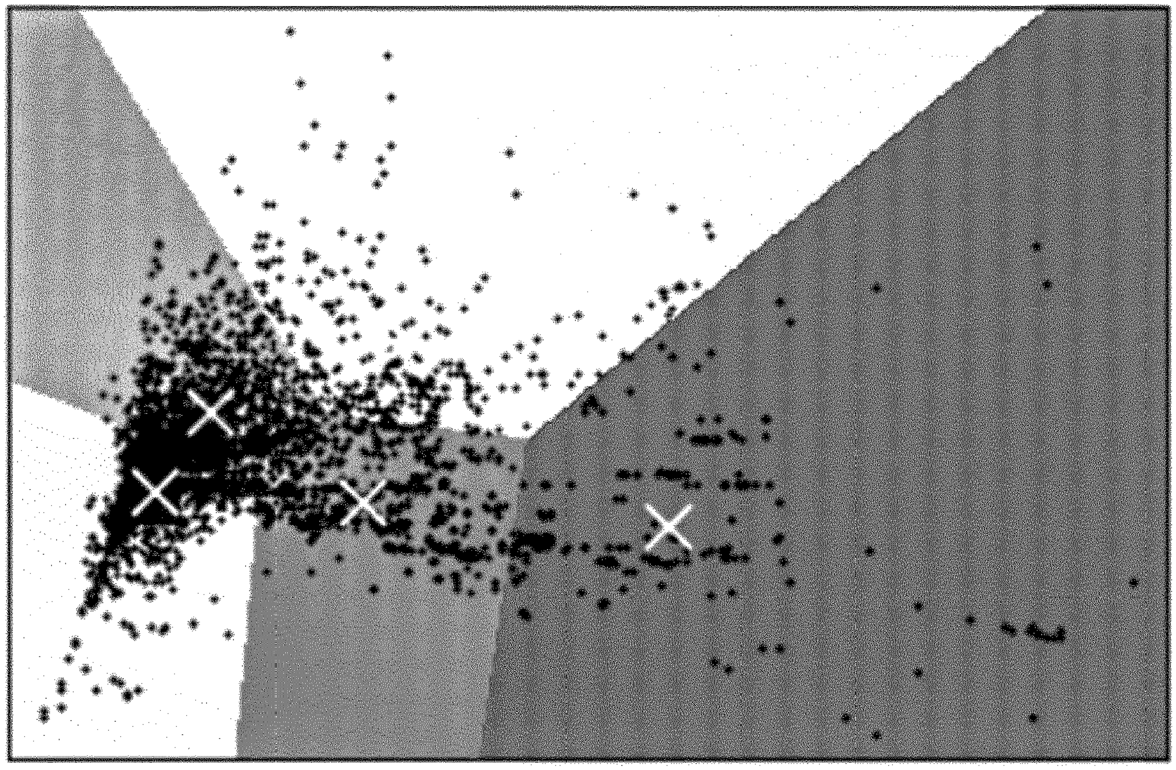
Fig. 7 K-Means Clustering showing the centroids for each cluster of 5 different cry patterns as white crosses, and the partitioning into different cells.

COMPUTER-IMPLEMENTED METHOD OF PROVIDING DATA FOR AN AUTOMATED BABY CRY ASSESSMENT

CROSS-REFERENCE TO RELATED APPLICATIONS

This is the U.S. national stage of international patent application no. PCT/EP2021/025257, filed Jul. 13, 2021 designating the United States and claiming priority to European Patent application no. EP 20020321.4, filed Jul. 13, 2020, which is incorporated herein by reference in its entirety.

DESCRIPTION

The present invention relates to baby cries.

A newborn baby literally cries for help whenever it experiences any discomfort due to more or less serious causes such as being hungry, suffering from exhalation, being tired, requiring diapers to be changed, having some form of pain and so forth. The parents not only have to notice that the baby is crying, but they also have to find out the current reason why their baby is crying based on their experience, their understanding of the often limited signals from the baby and, ultimately, their instinct This may give rise to stress for the parents for two simple reasons. On the one hand, the baby must be heard promptly whenever it cries; on the other hand, the parents need to identify the reason, which is a particular problem for parents having their first newborn, whereas more experienced parents will understand that frequently, the way a baby cries is indicative for the need to be attended to.

It has been suggested to place audio transmitters close to a cradle for transmitting audio sounds to a receiver close to the parents—this solves the first problem, but the second problem of identifying the reason why a baby is crying remains with simple transmitter/receiver combinations. In view of this, a number of suggestions have been made to identify the reason why the baby is crying in an automated way. For example, it has been suggested to use smart phones both as transmitters and receivers and to install a baby cry assessment app on one of the smart phones helping to identify the reason why a baby is crying. Even where in this manner, appropriate hardware is provided, the problem of identifying the reason why the baby is crying remains as a suitable app is needed for identifying the reason the baby cries.

In the scientific literature, a plurality of suggestions has already been made relating to ways of such identification.

In the paper "Harnessing Infant Cry for swift, cost-effective Diagnosis of Perinatal Asphyxia in low-resource settings" by Charles C. Onu, it has been suggested that perinatal asphyxia, which is one of the top three causes of infant mortality in developing countries, could be recognized by a pattern recognition system that models patterns in the cries of known asphyxiating infants and normal infants. It is suggested that cries are sampled and each cry sample is passed through several signal processing stages, at the end of which a feature vector is extracted representing coefficients of the MEL frequency Cepstrum. A recognition process then includes the steps of audio sampling, feature extraction, mean normalization, training with cross validation and testing. The feature vectors used are ensured to all have the same length and sampling rate.

In the paper "Ubenwa: Cry-based Diagnosis of Birth Asphyxia" by Charles Udeogu, Eyenimi Ndio-mu, Urbain Kengni, Doina Precup, Guilherme M. Sant'anna, Edward Alikor and Peace Opar published in "31st Conference on Neural Information Processing Systems (NIPS 2017), Long Beach, CA, USA", the authors suggest that a cry input sample is segmented, preprocessed, features are extracted and a multi-segment classification is determined; then, a decision about the cry reason is made.

In the paper "Neural Transfer Learning for Cry-based Diagnosis of Perinatal Asphyxia" by Charles C. Onu, Jonathan Lebenso, William L. Hamilton and Doina Precup, it is stated that a significant alteration in the crying patterns of newborns affected by asphyxia exists. The authors assume that model parameters learned from adult speech could serve as a better (than random) initialization for training models on infant speech. They also state that a physiological interconnectedness of crying and respiration has been long appreciated and that crying presupposes functioning of the respiratory muscles; in addition, cry generation and respiration are stated to be both coordinated by the same regions of the brain. The authors suggest a model and evaluate the robustness of the model in different noise situations such as sounds of children playing, dogs barking and sirens. They also evaluate the response of each model to varying a length of audio data and state that real-world diagnostic system must be able to work with as much data as is available.

In the paper "Time—frequency analysis in infant cry classification using quadratic time frequency distributions" by J. Saraswathy, M. Hariharan, Wan Khairunizama, J. Sarojini, N. Thiyagar, Y. Sazali, and Shafriza Nisha, published in Biocybernetics and Biomedical Engineering 38 (2018) 634-645, the authors suggest that research on infant cries might result in an automated tool for discriminating conditions of infants such as organic disturbances, feed management, sleep management, maternal health and sensorimotor integration conditions. They refer to parameters such as pitch information, noise concentration, spectral energy features, harmonic analysis based attributes, linear prediction cepstral coefficients and MEL-frequency cepstral coefficients. The authors state that representations of infant cry signals might use time-frequency based techniques namely wavelet packet transform, short time Fourier transform (STFT) and empirical mode decomposition (EMD). The authors also state that in a joint t-f analysis, the time and frequency domain representations of a signal can be combined into a t-f spectral energy density function leading towards a clear exploration on the characteristics of the multi component signals. The t-f spectral energy content is suggested to be usable to derive prominent features which can characterize the different patterns of cry signals, emphasizing the importance of the t-f analysis based methods in classification and detection using multi component signals, in particular for discriminating different cry utterances efficiently.

In the paper "Monitoring Infant's Emotional Cry in Domestic Environments using the Capsule Network Architecture" by M. A. Tugtekin Turan and Engin Erzin, published in Interspeech 2018, 2-6 Sep. 2018, Hyderabad, the authors suggest to employ spectrogram representations from the short segments of an audio signal representing baby cries as an input into a specific deep learning topology. To achieve accurate performance, the authors apply a high-pass FIR filter to remove speech sounds and other low-frequency noise on the signal. They allege that baby cry sounds do not have a fully continuous characteristics; accordingly, impulse-like sequences with different sizes or durations are segmented before a voice activity detection algorithm is applied.

In the paper "A Hybrid System for Automatic Infant Cry Recognition II" by Carlos Alberto Reyes-García, Sandra E. Barajas, Esteban Tlelo-Cuautle and Orion Fausto Reyes-Galaviz, the authors suggest to use a genetic algorithm and also suggest that automatic infant cry recognition is very similar to automatic speech recognition processes.

In the review "Acoustic Analysis of Baby Cry" by Rodney Petrus Balandong R, Department of Biomedical Engineering Faculty of Engineering University of Malaya, May 2013, it is stated that several approaches to obtain cry samples exist.

In: "A review: Survey on automatic Infant Cry Analysis and Classification" by Saraswathy Jeyaraman Hariharan Muthusamy, Wan Khairunizam, Sarojini Jeyaraman, Thiyagar Nadarajaw and Sazali Yaa-cob5 & Shafriza Nisha, Health and Technology https://doi org/10.1007/s12553-018-0243-5, the authors state that automatic infant cry classification process is a pattern recognition problem akin to automatic speech recognition. They report that eliminating or segmenting is one of the well-known pre-processing techniques in infant cry classification analysis as the silence interval usually carries less information but increases computational cost. The authors also refer to different cry types such as spontaneous cries while changing diapers, before feeding, while calming, during pediatric evaluation, and with pathological conditions such as vena cava thrombosis, meningitis, peritonitis, asphyxia, lingual frenum, IUGR-microcephaly, tetralogy of fallot, hyperbilirubinemia, gastroschisis, IUGR-asphyxia, bovine protein allergy, cardio complex, X-chromosome.

According to the paper "Infant Cries Identification by using Codebook as Feature Matching, and MFCC as Feature Extraction" by M. D. Renanti et al, published in the Journal of theoretical and applied Information Technology, I-ESS 1817-31 95, it is disadvantageous if silence is only cut out from a sound data stream at the beginning and at the end of a sound signal.

In "Audio Pattern Recognition of Baby Crying Sound Events" by Stavros Ntalampiras, Journal of the Audio Engineering Society, Vol. 63, No. 5, May 2015, a methodology to distinguish among five different states, namely (a) hungry, (b) uncomfortable (need change), (c) need to burp, (d) in pain, and (e) need to sleep is suggested. It is stated that the periodic nature of the audio signals involved is a burden. The author considers several groups of acoustic parameters such as perceptual linear predictive parameters, Mel-frequency Cepstral coefficients, perceptual wavelet packets, Teager Energy Operator (TEO) Based Features, Temporal Modulation Features. A plurality of methods such as support vector machines, multilayer perceptions and so forth to discriminate the cries is discussed.

In the paper "Automated Baby Cry Classification on a Hospital-acquired Baby Cry Database" by Rodica Ileana Tuduce, Mircea Sorin Rus, Horia Cucu and Corneliu Burileanu, it is suggested that a baby cry recognition system capable of distinguishing between different kinds of baby cries will help parents to distinguish the needs of their specific baby while they learn to make such distinction for themselves. The authors examine a plurality of classifiers, but observe that most classifiers perform lower on real-life recorded baby cries than on cries extracted from carefully selected samples.

In the paper "Infant cry analysis and detection" by Rami Cohen and Yizhar Lavner, 2012 IEEE 27-th Convention of Electrical and Electronics Engineers in Israel, an algorithm is suggested comprising three main stages, namely a voice activity detector stage, a classification stage and a post-processing stage for validating the classification stage in order to reduce negative errors. This algorithm is stated to be based on three decision levels in different time-scales: namely a frame level, in which each frame (tens of msec) is classified either as 'cry' or 'no cry', based on its spectral characteristics; sections of a few hundred msec; and segments of several seconds for which the final decision is obtained according to the number of 'cry' sections they contain. The multiple time-scale analysis and decision levels are said to be aimed at providing a classifier with very high detection rate, while keeping a low rate of false positives. The authors consider that a performance evaluation, with infant cry recordings as well as other natural sounds such as car engines, horn sounds and speech, demonstrates both high detection rate and robustness in the presence of noise.

In the paper "An Investigation into Classification of Infant Cries using Modified Signal Processing Methods" by Shubham Asthana, Naman Varma and Vinay Kumar Mittal, it is suggested that infant cry is a combination of vocalization, constrictive silence, coughing, choking and interruptions.

Methods and devices have also been suggested in patent documents.

From CN 103530979A, a remote baby crying alarm device for a hospital is known comprising a baby crying detection module, an alarm planning module, an alarm receiving module and an alarm module, wherein some parts are connected by wire while other parts are connected in a wireless manner.

From CN104347066A, an "Infant crying sound recognition method and system based on deep neural network" is known. It is suggested to distinguish pathological and non-pathological conditions in view of cries recorded.

From CN 106653001A, an infant crying cognition method and system is known. It is stated that a main problem is that only one crying reason can be given. A method for recognising reasons for infant crying is suggested and it is stated that in this context, a plurality of the following features can be extracted and analysed: Average cry duration, cry duration variance, average cry energy, cry energy variance, pitch frequency, average of pitch frequency, maximum of pitch frequency, minimum of pitch frequency, dynamic range of pitch frequency, pitch average rate of change of frequency, first formant frequency, average rate of change of first formant frequency, mean value of first formant frequency, maximum value of first formant frequency, minimum value of first formant frequency, first resonance peak frequency dynamic range, second formant frequency, second formant frequency average rate of change, second formant frequency average, second formant frequency maximum, second formant frequency minimum, second resonance peak frequency dynamic range, the Mel frequency cepstrum parameter, and the inverted Mel frequency cepstrum parameter. Regarding preprocessing steps, it is suggested that noise reduction is performed on the cry signal to suppress background noise and that an automatic detection algorithm is used to remove data fragments with particularly noisy noise, thereby improving the signal-to-noise ratio of the cry signal that is extracted into subsequent features. It will be understood that the features extracted according to CN 106653001A and the way they are extracted could also be used in the context of the present invention. Accordingly, the cited document is fully incorporated herein by reference.

From CN 106653059A, an automatic recognition method of infant crying and system thereof is known. It is suggested that for identifying the reason why a baby is crying, the baby's age and crying time when crying may help to determine a probability of pathological reasons for crying. With respect to a crying time interval, explicit mention of a last lactation time is made. It is also stated that performing an image analysis of a video capturing the baby's face while recording baby crying sound might be helpful. It is noted that with unprofessional recording under non-laboratory conditions, the accuracy of judgement will drop, giving inaccurate reasons for crying or misleading inexperienced parents. Explicit mention is made of implementing the known method as an app on a smartphone.

From CN 107591162A, a pattern matching based cry recognition method and intelligent care system is known. It is stated that young parents spend more and more time outside their homes, but that hiring a babysitter is expensive; thus, baby crying might not be treated in time. Given smart homes, a babycare function is suggested to resolve this problem.

From GB 2234840A, an automatic baby cry detection is known automatically producing a sound when detecting that a baby is crying. The sound continues for a time sufficient to ensure the baby is lulled to sleep. Thereafter, the cry detector is muted for a time long enough to ensure that a genuine cry of distress is not ignored by the parents.

US 2008/000 3550 A1 suggests teaching new parents the meaning of particular cries by storing infant sounds in a reproducible audio form. The storage medium may be a DVD.

From KR 2008 003 5549A, a system for notifying a cry of a baby to a mobile phone is known wherein when crying sound is detected, the mother's mobile phone is automatically called.

From KR 2010 000 466 A, a pediatric diagnostic apparatus is known capable of early diagnosis of childhood pediatric pneumonia and pediatric pneumonia through crying of a child.

From KR 2011 0113359A, method and apparatus for detecting a baby's crying sound using a frequency and a continuous pattern is known.

A method and system for analyzing digital sound audio signal associated with a baby cry is also known from US 2013/031 7815 A1. It is suggested to determine a special need of the baby by inputting a time-frequency characteristic determined by processing the digital audio signal in a pre-trained artificial neural network.

From US 2014/004 4269 A1, an intelligent ambient sound monitoring system is known. It is suggested that the system monitors an ambient sound environment and compares it to preset sounds, for example with respect to frequency signatures, amplitudes and durations to detect important or critical background sounds such as alarm, horn, directed vocal communications, crying baby, doorbell, telephone and so forth. It is stated that the system is helpful for people listening to music via headphones shielding ambient sounds.

In US 2019/180772A1, it is suggested that an audio capture device can store audio data over a long-term or short-term period and that the audio capture device might transmit audio in a wireless manner. It is also stated that a mobile terminal such as a smart phone can be used to record and display a crying sound and that in unfavorable environments (such as a noisy environment), the accuracy of the automatic judgment will be reduced to a certain extent. It is stated that by displaying multiple reasons for crying in a terminal screen, the system would have better fault tolerance, It is stated that a classifier can be implemented using deep neural networks. It is also suggested to perform segmentation and to identify the source for each segment. Furthermore, the document considers a relationship between the age in weeks and the typical times of crying. Also, it is suggested that a process of segmenting an audio stream can involve machine learning algorithms to automatically parse the data set of audio data into labeled time segments distinguishing for example the baby to be assessed from other children, environmental noise or silence. However, any such personalization is suggested only for the cry identification. Furthermore it is stated that vocalization, cry and fixed-signal/vegetative sleep-sound models can be created for a plurality of age groups, for example groups each comprising babies in a 2 month-interval of age.

A method and system for detecting an audio event for smartphone devices is known from US 2016/036 4963 A1. It is suggested that when an electronic device obtains audio data, the audio data are split to a plurality of sound components each associated with a respective frequency of frequency band and including a series of time windows. The electronic device is suggested to then extract a feature vector from these sound components and to classify the extracted feature vector. In this manner, smartphone devices shall be able to distinguish different audio events.

From US 2017/017 8667 A1, technologies for robust cry detection using temporal characteristics of acoustic features are known. It is suggested to split sound data into frames, to then determine an acoustic feature vector for each frame and to determine parameters based on each acoustic feature varying over time corresponding to the frames. It is then determined whether the sound matches a predefined sound based on the parameters. Reference is made to the use of a baby monitor and to the identification of baby cries. It is stated that generating a small number of parameters from a dataset is useful for identifying desired sounds as this would be an important aspect of using machine learning techniques such as neural networks. It is stated that the known sound identification device may be embodied in a computer, smart phone, laptop, camera device consumer electronic device or other.

From CN 107657963A, a cry identification and cry recognition method is known suitable for recognising the reason of infant crying and collecting different crying samples and corresponding crying reasons according to different infants so as to provide a comparison for good cry recognition. It is stated that in general, a baby cry has a higher volume and higher energy than a pure background noise. It is stated that a cry database for storing at least one cry sample can be provided and that additional cry samples can be stored in the database after the cause has been identified during use of a device identifying causes of cries. It is also suggested to store additional cry information in the database where the reason for crying could not be determined based on the sound samples the database.

From CN 107886953A, an infant crying voice translation system based on facial expression and speech recognition is known. It is suggested that a crying microprocessor is used to continuously train and optimise sample feature data in a sample crying database through learning memory and feedback self-checking functions. It is suggested to determine whether a sound segment corresponds to a baby crying sound in view of the intensity being greater than a threshold.

From CN 109243493A, a baby crying emotion recognition method based on improved long and short-term memory networks is known. In this context, a long and short time memory network must be trained.

From CN 110085216A, a baby crying detection method and device is known. The document states that shortcomings in the detection technology for baby signal crying detection exist, including the support vector machine learning algorithm, which has a low separation precision for baby crying and other sounds and that the detection of sound is not accurate enough. It is suggested to perform feature extraction of a perceptual linear prediction coefficient and to acquire speech features corresponding to the speech data in a sample training that. At least two voice types are to be provided and an acoustic model of the baby crying sound is suggested to take into account posterior probability of each frame to correspond to a specific voice type.

From CN 1564 2458 A, a baby cry detection method is known relying on a comparison with a number of stored samples.

As can be seen, a plurality of methods of identifying the reason why babies cry exist and also, a plurality of different conditions can be distinguished. Therefore, the above cited documents are enclosed herein in their entirety with respect to the methods of cry identification, in particular with respect to machine-learning methods and furthermore, with respect to the different reasons why a baby cries can be identified by analysing the cry sounds.

However, while a lot of research has been done in the past to identify the reasons why a baby is crying from the cries themselves, and while it has been suggested that a plurality of different conditions can be distinguished, the results obtained by practical devices still need to be improved. In this respect, it should be noted that it is known that certain conditions have a large influence on the cry characteristic so that different babies will cry in a different manner under similar circumstances.

In this respect, in the master thesis "Automatic Classification of Infant's Cry" by Dror Lederman, the physiology of newborns is related to the audio signature of their cries and histograms for stationary cries of full-term versus preterm neonates are compared. Other comparisons include inter alia the cries of in utero cocaine exposed infants versus non-exposed infant cries, and the crying of infants with disturbances such as metabolic disturbances or chromosomal abnormalities. The author states that when dealing with cry signals, the accuracy of an automatic segmentation is not as critical as in speech/word segmentation where inaccurate segmentation may lead to loss of important information. The author also states that age is known to be a critical parameter in the analysis of cry signals and that cry features including fundamental frequency and formants have been found to change significantly if an infant develops, especially during the first months.

In KR20030077489A, it is emphasized that infants grow rapidly and that cry characteristics of race, gender, etc. can be classified into different groups of toddlers. It is stated that a mass produced machine cannot analyze the individual characteristics of a crying infant. It is suggested to use a local internet terminal for acquiring sound data from a crying baby and to utilize an internet server for analysis of the sound data. It is mentioned that data can be stored for future use in the study of infant cries. Also a service method for providing an instant condition analysis service and a service method for providing an instant condition analysis service is suggested wherein details of the infant populations might be stored in a database. However, while a decision about the reason for a baby cry can be based on a large database, it is a disadvantage that a connection to a server must be provided and that accordingly, without connection, cry characterization is not possible.

From KR 2005 0023812A, a system for analyzing infant cries is known using wireless Internet connections. It is suggested to provide a server management system that manages a wireless Internet service system which in turn is providing wireless Internet terminal infant voice applications for wireless Internet terminals. It is stated that a personalized sound database may be configured and that information needed for an infant sound device application can be modified so that a user can receive always an accurate analysis of the cries according to latest research. However, it is not mentioned how the database is best enlarged nor is a statement made how the modification of the infant sound device application is effected in a particularly efficient manner.

From KR 2012 0107382A, another device for analysing crying of infants is known. It is stated that if baby crying sound frequency distribution information has been recognized for a minimum number of times for a predetermined period, a crying frequency distribution information can be statistically processed so as to adjust and optimize to the crying sound of a specific baby at the location where a device is placed. It is suggested that the adult use of the device can utter a reason why the baby is crying and that this utterance is recognized so that if it is confirmed that the users utterance is recognized within a certain time period during or after the baby is crying, the utterance contents can be processed so as to be correlated with service functions related to the baby crying. Such utterances could be "38.5°" or "the diaper is not wet".

From CN 109658953A, a baby crying recognition method and device is known. It is stated that a cloud server may be provided to which audio feature vectors and collected audio data segments can be sent. When a device is connected to the server, the cloud server may send a latest version of an identification model to the device and the device may compare and send its own identification model to the cloud server if the identification model is not the latest version. Furthermore, where no network connection to the cloud server is available, an audio feature vector can be identified by a locally stored neural network model.

Accordingly, it has been suggested in the past to identify the reason why a baby is crying in an automated manner. However, even though it has been suggested in the past that a personalization might help in identifying the reason why a baby is crying, the assessments suggested by automatic methods often are not considered sufficiently reliable. In view of this, it would be helpful to allow for improvements of automated cry assessment techniques.

The object of the present invention is to provide novelties for the industrial application.

This object is achieved by the subject matter claimed in the independent claims. Some of the preferred embodiments are described in dependent claims.

According to a first general idea, a computer-implemented method of providing data for an automated baby cry assessment is suggested, comprising the steps of acoustically monitoring a baby and providing a corresponding stream of sound data, automatically detecting a cry in the stream of sound data, automatically selecting the cry data from the sound data in response to the detection of a cry, determining parameters from the selected cry data allowing cry assessment, establishing personal baby data for a personalized cry assessment, preparing an assessment stage for assessment according to personal baby data, and feeding the parameters into the cry assessment stage prepared according to personal baby data.

The inventors of the present invention have understood that for a personal assessment of the baby cry, a high quality of the cry data used in the assessment is needed. Where the data provided for the automatic baby cry assessment is of insufficient quality, the effects of personalization cannot be achieved to the full extent otherwise possible and the quality of assessment, e.g. as deduced from the percentage of correct assessments, cannot be increased or increased significantly over non-personalized assessments. In contrast, where the quality of the data is sufficiently high, the personalization typically not only is increasing reliability. Also, the personalization usually needs to be affected at a very late stage only; in particular, it often is possible to use the same set of parameters for all babies despite a personalization of the assessment. This simplifies the assessment.

Nonetheless, even though very good results can be obtained by using the same parameter determination stage for all babies once correct sound input data have been selected, it would also be possible to determine a different set of parameters depending on the personal baby data established.

The personal baby data can be established in a variety of different ways, but it will be obvious that requesting personal baby data from parents or other caregivers prior to the assessment in a personalized manner is the most preferred way and is most easy to implement. It will also be understood that requesting corresponding inputs from parents or other caregivers is needed only during an initialization of a device used for executing the method and for updating some of the input later. While establishing personal baby data by requesting input from parents and/or caregivers is considered to be the most reliable and simple way, it would also be possible to identify at least some of the data by cry analysis; for example, a single cry or a plurality of previous cries from the same baby could be evaluated to then derive a personalization such as the most likely age, weight, size or sex of the baby.

The high quality of the cry data is ensured by acoustically monitoring the baby and automatically selecting the relevant cry data from the stream of sound data. The selected data can be isolated from the sound data stream, that is they can be extracted, or can be marked to be part of a cry or potentially part of a cry; where it is not entirely clear whether or not sound data belong to the cry, for example because the baby started crying due to a prolonged loud noise in the surrounding, the corresponding data could be marked as being "potentially part of a cry". Such marking could be different from a marking where a higher confidence level is given that sound data belongs to the cry.

In this respect, it will be understood that monitoring the baby usually and preferably is done in a continuous manner, so that the sound is recorded from the vicinity of the baby during an extended time. This has a variety of advantages over a situation where for example the parents only trigger the collection of sound data once they have noted that the baby is crying. Monitoring the baby for a prolonged time will give access to sound data both comprising cry periods and non-cry periods. This in turn simplifies consideration of the typical background behavior. It should be understood that the acoustical background characteristics will vary with respect to the levels of sound, with respect to the spectral distribution of noise and with respect to the length and occurrence of significant background noises due for example to dogs barking, horns blowing, doors slamming, elder siblings crying and so forth. Understanding such background behavior clearly helps in selecting data as cry data from the sound stream and thus helps to improve the quality of data provided for personalized assessments.

For example, where an air conditioning system generates noise in a specific frequency band, in some implementations of baby cry assessments, such frequency band should be disregarded in determining parameters to describe the baby cries. By monitoring the baby in a continuous manner, it becomes possible to note that such noise in a specific frequency band is present by looking at sound data obtained in periods during which the baby does not cry. Accordingly, in the respective implementations of baby cry assessments relying on eliminating noise in specific frequency bands, it can be determined that the corresponding frequency band should be disregarded, and corresponding information can be added to the sound data selected. This is preferred over simply filtering out noise-affected frequencies, because then, while the remaining frequency bands have been found to be generally relevant for the baby cry, they will not be considered for the specific case. Also, this does not imply that the specific sound data stream has to be subjected to (computing intensive) band filtering; it would be sufficient to feed forward the corresponding information to the parameter determination stage so that rather than assigning values representing for example a spectral intensity in the respective band, such values could be stated to be "not available" (N/A). It will be understood that where certain frequency bands are to be disregarded, different algorithms for cry detection might become necessary, using for example different filter parameters. It will also be understood that cry data can alternatively and/or in addition be selected by choosing frames for a certain period after the baby started crying. However, there are also embodiments where it is preferred not to filter out any specific frequency bands which are particularly noise prone. It would be understood that in embodiments where the amount of data is not reduced strongly, for example because no specific parameters such as formant related parameters, pitch frequency related parameters, maximum values of first performance and so forth (compare in particular the parameters listed hereinafter), but rather a more complete information relating to the baby cry is fed into a convolutional neural network or the like, the adverse effects of noise are significantly less pronounced. It has been realized that at the same time, the quality of the assessment increases. Now, it will be understood that processing a more complete information in a convolutional neural network or the like will require a larger computational effort; however, this additional computational effort is compensated at least in part by omitting any filtering step and/or by allowing that the same processing is effected independent of specific noise properties present. Thus, it has been realized by the inventors that from an overall perspective, it is more useful in analyzing baby cries to feed a more complete information into an artificial intelligence-based assessment stage rather than spending a significant computational effort for reducing the complexity of data fed into the assessment stage. However, what can be done is to ensure that such more complete information to be assessed actually is relevant for assessing the baby cry, which can easily be assumed in case a pattern typically found in cries has been identified in the sound data and isolated there from. Accordingly, in a preferred embodiment, selecting the correct sound input data for sound assessment comprises identification of sound related patterns in the data stream and preferably isolating such sound related data from non-sound related data.

Usually, a baby will be crying for a prolonged period, but there will also be short times where no loud cry sounds are recorded, for example because the baby needs to breathe. The information relating to these short times need not be discarded completely. In particular, where parameters are determined for further assessment, these short times preferably are not cut out from a sound data stream, as they might contain useful information as well. It should be understood that in certain cases, the length of such times when no very loud sounds are recorded after the baby started crying might give important clues in the assessment of the reason why the baby cries. Therefore, it may be helpful to at least include an indication of the length of sound data where this should be the case. In other instances, it may be useful to at least determine a time or time tag during which the cry-related pattern has occurred in the sound data.

However, where cry parameters are determined, it will be even more preferred to determine the cry parameters from a longer, uninterrupted period, as in this manner, clues can be obtained from the repeated onset of crying, even though the baby might not be particularly loud during the repeated onsets.

Where a longer uninterrupted cry period is considered, the cry may be isolated by cutting off extended periods of pre-cry noises and/or post-cry-noises. Also, it will be understood that a baby not receiving adequate care is capable of crying for very long periods. Therefore, it will be understood that the reason why a baby cries preferably is assessed even though the crying still continues. In such case, the assessment can be repeated in case the parents or caregivers should not respond soon enough; if the assessments obtained during such period of prolonged crying should vary, an evaluation of a best assumption among the different assessments can be made. it will be understood that the assessment may vary during a prolonged period as the reason why the baby cries slowly changes during the prolonged period, for example because a baby that previously was feeling pain slowly becomes tired.

Accordingly, when providing or procuring data for an automatic baby cry assessment, selecting or extracting or identifying cry data may relate to identifying the times that should be analyzed and/or the frequency bands or frequencies that should (or should not) be analyzed. Regarding omitting frequency bands, it should be mentioned explicitly that bandpass filtering to avoid Nyquist aliasing is not considered an "omission" of frequencies. Rather, where reference is had to omitting frequencies, it will be understood that the omitted frequencies will be lower than the sampling frequency and that typically, the omission is effected on the digital data. Accordingly, frequencies could be omitted by disregarding certain frequencies bands that are above the lowest processable frequencies and below the highest processable frequencies. It is noted however that while a specific filtering is not vital, in particular with respect to embodiments that detect cry patterns based on a spectrogram-like representation and accordingly sound processing can be kept to a minimum, it may be preferred to normalize the sound level, e.g. in a manner such that a normalized maximum sound level is the same for each window. Note that once a cry pattern has been identified and isolated in a window, a possibility exists that the maximum sound level occurring in the window and used as a reference for normalizing the sound level does not constitute a part of the cry pattern. This would be for example the case where a door is slammed very loud, causing the baby to cry. Therefore, where it is preferred to use cry patterns having a normalized sound level for subsequent cry translation or, to use another term, cry assessment, it is possible to re-normalize the cry pattern. Also, it is noted that in certain implementations of cry translations, in particular those using convolution or neural networks for translation, it is preferred to have cry patterns of a standardized length. Therefore, it is possible to add data representing silence, for example by extending the sound data by a corresponding period of silence or by adding an area to a spectrogram representing silence, for example by being completely black. It is noted that both using a normalization and a standardized length in cry pattern translation is particularly preferred when using machine learning model such as based on convolution or neural networks into which spectrogram. like representations are fed as input. It is also noted that while reference is had on several occasions throughout the description and claims to spectrogram-like representations of the sound data, that is the segmented windows and/or the cry patterns, it is not necessary to use linear spectrogram-like representation of the sound data; rather, nonlinear spectrogram-like representations of the sound data could be used, in particular melspectrogram-like representations and/or lock spectrogram-like representations.

These nonlinear spectrogram like representations of the sound data can be used both for cry pattern translation and for the cry pattern identification and isolation.

As stated before, it is not necessary to implement the personalized assessment in a manner where the personalization follows preceding steps of detecting a cry, selecting cry data or determining parameters from the selecting cry data. This in turn is advantageous as the computational and/or organizational effort of the personalization are kept to a minimum; also, where a personalized assessments should not be possible, for example because for a baby having specific personal data such as sex, age, size, weight medical preconditions and so forth, the peer group still is too small, at least a non-personalized assessment can be effected that is not impaired by insufficient specific data. Note that a "similar" peer group could also be selected and/or that the number of peer groups may be smaller until the database has grown sufficiently. Regarding personalization, such personalization can be implemented either as a privatization using distinct and different parameters for every individual baby, or can be implemented as a clusterization determining peer groups or clusters of babies having very similar cry patterns. It will be understood that a privatization is possible by training and model specifically on baby cries obtained from only one specific baby; however, privatization can also be achieved by first determining a more general model, for example based on the cries from a peer group or cluster of babies having very similar cry patterns and/or very similar personal data (such as weight, age, size, and sex) by adapting the filter parameters slightly so that they fit better for the specific baby. This is known as transfer learning and it should be understood that the specific way suggested in the present application of providing data for the assessment of the baby cry is particularly helpful in baby cry assessment personalized by transfer learning.

What has been stated above that in the paper "Neural Transfer Learning for Cry-based Diagnosis of Perinatal Asphyxia" by Charles C. Onu, Jonathan Lebenso, William L. Hamilton and Doina Precup, it has been suggested that model parameters learned from adult speech could serve as a better (than random) initialization for training models on infant speech, the applicant is not aware of any attempt to personalize the baby cry assessment by transfer learning from more general baby cry assessment models, in particular not in a manner where the initial model on which the transfer learning is based is obtained by clusterization of database entries, in particular not a fine clusterization distinguishing per assessed reason why a baby cries more than e.g. 6, 8, 10, 15, 20 different clusters of database entries.

It will also be understood that the method of the present invention helps in generating a database with cries from different babies so that the clusterization can use distinctions finer than known in the past, for example grouping babies in weight intervals no larger than 500 g, 400 g, 300 g, 200 g or 100 g; size intervals no larger than 5 cm, 4 cm, 2 cm or 1 cm; age intervals no larger than 8 weeks, 6 weeks, 4 weeks, 2 weeks. Obviously, any interval in between could also be selected. It will be understood that intervals even larger than the largest indicated for the weight, size or age will result in a personalization that is rather cause and thus does not take full advantage of the high quality cry data obtainable by the present invention, whereas the lower limits indicated for weight and size reflect inaccuracies of measurements typically observed in private homes, so that a more refined person personalization would not be overly helpful. Additional parameters such as the current temperature of the baby in thorough 0.1° C. steps or 0.2° C. steps or 0.3° C. steps or pre-known medical conditions can also be taken into account where clusterization is to be based fully or partially on the respective personal baby data.

The sound data will be sampled, for example with a sampling frequency of 4 kHz, 8 kHz or 10 kHz, 16 kHz; the sampling frequency usually is determined in view of the frequency content of baby cries, the frequency response of the microphone used in monitoring the baby and/or in view of the computing power available and/or a bandwidth available for uploading sound data to a cloud and/or to a server used in the automatic baby cry assessment. Bandwidths may be adapted to e.g. the bandwidth available for uploading sound data to a cloud. However, while relevant cry information can be found in the frequency range above 8 kHz, recording these frequencies often is difficult in the field both in view of microphones used and in view of their directivity, because even where a microphone is sufficiently sensitive at high frequencies, the polar pattern of the microphone sensitivity used might be disadvantageous; this becomes more important with higher frequencies. Therefore, without limiting the invention, for a large number of users sampling frequencies of up to 8-10 kHz give results that cannot be distinguished from those results obtained with higher frequencies. The sound signal from a microphone will be preconditioned such as amplified, low-pass and/or bandpass filter and digitized. For further processing and/or for communicating the sound data to server, cloud servers and the like, it is preferred to define frames comprising a number of samples, in particular a fixed number of samples such as 64 samples, 128 samples or 256 samples. While it is not necessary to use fixed frames or use fixed frames at all, hereinafter, reference is frequently had to frames as using frames reduces the computational complexity.

Regarding the parameters determined from the cry data, one or more of the following parameters can be determined:

- average cry energy during current cry event, sliding average of cry energy over a specific number of consecutive and/or frames in particular in 2, 4, 8, 16 or 32 frames, and/or over a specific time such as one second, two seconds, five seconds, 10 seconds, 15 seconds, 30 seconds; cry duration variance between breaks during one event;
- cry energy variance in particular over 2, 4, 8, 16 or 32 frames 2, 4, 8, 16 or 32 frames, and/or over a specific time such as one second, two seconds, five seconds, 10 seconds, 15 seconds, 30 seconds;
- current pitch frequency; pitch frequency averaged over 2, 4, 8, 16 or 32 frames 2, 4, 8, 16 or 32 frames, and/or over a specific time such as one second, two seconds, five seconds, 10 seconds, 15 seconds, 30 seconds; maximum of pitch frequency during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds;
- change of sliding maximum pitch frequency during cry event during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds;
- minimum of pitch frequency during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds; change of sliding minimum pitch frequency during cry event during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds;
- dynamic range of pitch frequencies during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds; pitch average rate of change of frequency during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds;
- first formant frequency in cry event or in 2, 4, 8, 16 or 32 frames 2, 4, 8, 16 or 32 frames of cry data, and/or during a specific time such as one second, two seconds, five seconds, 10 seconds, 15 seconds, 30 seconds (note that in the context of the present invention, the term formants can relate to a spectral shaping resulting of the human vocal tract; also, reference could be had to a peak, or local maximum, in the spectrum when speaking of a formant and/or to the harmonic partial that is augmented by a resonance);
- average rate of change of first formant frequency averaged over 2, 4, 8, 16 or 32 frames 2, 4, 8, 16 or 32 frames of cry data, and/or during a specific time such as one second, two seconds, five seconds, 10 seconds, 15 seconds, 30 seconds;
- sliding average rate of change of first formant frequency sliding an average over 2, 4, 8, 16 or 32 frames 2, 4, 8, 16 or 32 frames of cry data, and/or during a specific time such as one second, two seconds, five seconds, 10 seconds, 15 seconds, 30 seconds;
- mean value of first formant frequency, averaging over 2, 4, 8, 16 or 32 frames of cry data, and/or during a specific time such as one second, two seconds, five seconds, 10 seconds, 15 seconds, 30 seconds;
- maximum value of first formant frequency in 2, 4, 8, 16 or 32 frames of cry data, and/or in a specific time such as one second, two seconds, five seconds, 10 seconds, 15 seconds, 30 seconds; minimum value of first formant frequency in 2, 4, 8, 16 or 32 frames of cry data, and/or during a specific time such as one second, two seconds, five seconds, 10 seconds, 15 seconds, 30 seconds;
- first resonance Peak frequency dynamic range during cry event and/or during 2, 4, 8, 16 or 32 frames of cry data, and/or during a specific time such as one second, two seconds, five seconds, 10 seconds, 15 seconds, 30 seconds;
- second formant frequency during cry event and/or during 2, 4, 8, 16 or 32 frames of cry data, and/or during a specific time such as one second, two seconds, five seconds, 10 seconds, 15 seconds, 30 seconds;

second formant frequency average rate of change during cry event and/or during 2, 4, 8, 16 or 32 frames of cry data, and/or during a specific time such as one second, two seconds, five seconds, 10 seconds, 15 seconds, 30 seconds;

second formant frequency average during cry event and/or during 2, 4, 8, 16 or 32 frames of cry data, and/or during a specific time such as one second, two seconds, five seconds, 10 seconds, 15 seconds, 30 seconds;

second formant frequency maximum during cry event and/or during 2, 4, 8, 16 or 32 frames of cry data, and/or during a specific time such as one second, two seconds, five seconds, 10 seconds, 15 seconds, 30 seconds;

second formant frequency minimum during cry event and/or during 2, 4, 8, 16 or 32 frames of cry data, and/or during a specific time such as one second, two seconds, five seconds, 10 seconds, 15 seconds, 30 seconds;

second resonance during cry event and/or during 2, 4, 8, 16 or 32 frames of cry data, and/or during a specific time such as one second, two seconds, five seconds, 10 seconds, 15 seconds, 30 seconds;

peak frequency dynamic range during cry event and/or during 2, 4, 8, 16 or 32 frames of cry data, and/or during a specific time such as one second, two seconds, five seconds, 10 seconds, 15 seconds, 30 seconds;

Mel frequency cepstrum parameter (note that the cepstrum is the result of the following sequence of mathematical operations: a—transformation of a signal from time domain to frequency domain—b—log of the spectral amplitudes c—transformation to quefrency domain, where the final independent variable, the quefrency, has actually a time scale), the parameter being determined for the entire cry event and/or during 2, 4, 8, 16 or 32 frames of cry data, and/or during a specific time such as one second, two seconds, five seconds, 10 seconds, 15 seconds, 30 seconds; and/or the inverted Mel frequency cepstrum parameter.

It should be understood that while the parameters listed above or some of the parameters can be determined for each cry for feeding the precalculated parameters into a neural network, this would not be absolutely necessary. In particular, it is possible to feed into a machine learning model a representation of recorded cry sound that contains all relevant information; in that case, the machine itself "evaluates" which parameters actually are relevant. One example of such a representation would be the mel-spectrogram for the sound.

Note that where reference is made above to specific times such as one second, two seconds, five seconds, 10 seconds, 15 seconds, 30 seconds, reference could also be had to any other fixed period such as 7 seconds or 28 seconds up to the respective times explicitly mentioned. This holds for other parameters referred to hereinafter as well. It will however be understood that the respective times and/or frame numbers are advantageous as the shorter times up to 5 seconds are relevant to determine typical patterns in the cry data that are well-suited to translate the cry. The medium lengths up to 15 seconds are helpful if some of the information is buried in ambient noise while the longer periods up to 30 seconds are helpful to identify a major reason why a baby cries in case several such reasons coexist such as the baby being in pain, being hungry and being sleepy all at the same time.

It will be understood that not all of the above mentioned parameters are needed in an assessment, not even in a personalized assessment. In contrast, it is possible that an assessment yielding very good results relies on only a few of the above mentioned parameters. This is particularly so as some of the parameters will relate to somewhat redundant information, e.g. the average of the sound level during the entire crying event, the sliding average of sound level over 2, 4, 8, 16, 32 or 64 frames and so forth.

Where techniques such as convolutional neural networks are used in the personal assessment, different listed parameters might be best for different groups of babies having similar cry patterns due to the same age, ethnicity, sex, weight, body size and so forth. Nonetheless, even then, typically a common set of parameters for large variety of different babies can be found so that the overall number of parameters that needs to be determined can be rather low and still, a useful set of parameters can be provided for the personal assessment. The same holds for parameters where some frequency bands cannot be used due to noise. This helps in keeping the computational and organizational efforts associated with a personalization at a minimum, in particular where one or more relevant descriptor for personalization refer to weight, body size or age; using a set of parameters best for a range of weights, range of body size and/or a range of ages may help to still obtain very good assessment results where an update of the personalized assessment stage is due or overdue or where a non-personalized assessment must be carried out, for example because a cloud server normally addressed for personalized assessment of cry data is currently not available.

It should be emphasized, that in the above, the use of sliding parameters has been mentioned. Techniques such as the use of sliding parameters or crosscorrelation techniques are particularly preferred, because in that manner, the influence of determining the exact onset of the cry sufficiently precise can be reduced.

However, as mentioned above, it is not absolutely necessary to determine low-dimensional parameters from the sound data for subsequent assessment (note that reference is had to low dimensional parameters as by using a limited number of parameters, the dimensionality is clearly reduced compared to a situation where for example chunks of e.g. 500 ms sound data recorded with 16-bit and 48 kilohertz are assessed). Another possibility rather than calculating low dimensional parameters is to preliminary identify patterns that usually can be associated with baby cries, isolated these and then fed the isolated patterns into a subsequent assessment stage. A possibility particularly simple to implement is to generate spectrograms for chunks of a given length and to then look for patterns that usually are associated with baby cries in those spectrograms. The advantage is that generating spectrograms is straightforward and can be done with a low computational effort; the search for patterns that usually are associated with baby cries in those spectrograms can then be effected easily by common image analysis techniques. Thus, it is particularly easy to implement the steps necessary. In this context, it is preferred to identify and isolated and cry patterns that have a length of at least 0.25 seconds; preferably the minimum cry pattern length that is identified and isolated is even longer, in particular at least 0.3 seconds or 0.4 seconds. in a practical implementation, cry patterns having a minimum length of 0.4 seconds could be reliably identified despite any background noise observed in typical field installations by using a spectrogram-like representation of the sound data monitored, in particular by implementing an object localization method for searching cry patterns having at least 0.4 seconds duration in a sound level normalized Melspectrum-like representation of a 5 second windows of monitored sound data. At the same time, the length of patterns can be restricted as well, for example cutting off or completely excluding identified and isolated cry patterns having a length longer than 2 seconds; it would be possible to accept cry patterns longer than 2 seconds. Yet, each cry is segmented into a plurality of different cry patterns that more often than not are shorter than 2 seconds. Using cry patterns of a standardized length for subsequent translation thereof would imply that a major part of cry patterns identified and isolated would have to be extended for example by a black shoulder on one side for subsequent translation and can be understood that this might impair the precision of the cry assessment. Therefore, using cry patterns no longer than 4 seconds, preferably no longer than 3 seconds and in particular no longer than 2 seconds is highly preferred. Using shorter cry patterns also helps with concerns of privacy, in particular where only the short cry patterns or representations thereof rather than a continuous sound stream is uploaded into a cloud.

Even when normalizing the length of cry patterns for translation by adding periods of "silence" or corresponding spectrogram patterns, the original length could still be fed into a convolutional neural network or machine learning model used in the assessment of the baby cry. For example, in an embodiment first calculating the probability for each cry pattern to represent a specific reason why the baby cries and then assessing the overall reason why the baby cries from the probabilities collected, it might be useful to also include the length of each pattern considered.

In a preferred embodiment, it is suggested that the baby is continuously acoustically monitored and pre-cry sound data is stored at least temporarily until subsequent sound data have been found to be not cry-related. In this respect, it should be noted that this holds for both a situation where low dimensional parameters are determined from the sound data for subsequent baby cry assessment and for a situation where a straightforward search for patterns that can be associated with baby cries and the isolation of these patterns is executed. For example, where typical patterns searched for in baby cry sound data have a length of e.g. note more than 2 seconds, a number of frames corresponding to a 5 second period can be grouped together and processed in a manner such that finding patterns therein is particularly simple, for example by determining a spectrogram. Obviously, this means that the data acquired over 5 second periods first needs to be stored for such subsequent analysis. Also, it is noted that since cry patterns should by no means be expected to only start and end within a given period such as 5 seconds, the stride used should be lower so that an overlap exists between periods. The stride preferably should be such that each pattern searched for lies completely within at least one of the windows of a sequence. With a short stride, this is easy to guarantee. While this may lead to a situation where some patterns are identified into two subsequent periods, it is easy to discard patterns occurring twice; in more detail, it will be understood that the time-stamp technique can be easily used for discarding such cry patterns found twice due to an overlap of periods. It is noted that when implementing cry pattern detection and/or cry pattern isolation by an object localization algorithm based on a spectrogram-like representation of the sound data, in particular based on a male spectrogram like representation of the sound data, a situation may arise where a pattern is not completely included within a window into which the underlying sound data is segmented prior to obtaining the spectrogram-like representation. This is easy to notice as the pattern identified will extend to a border of the window. Even though one and the same cry pattern might be isolated in a somewhat different manner in each of a sequence of overlapping windows, it is very likely that a cry pattern incomplete in one window will be found again in another window where the cry pattern then is complete. It is thus preferred to discard any pattern that extends up to a border of the window, as in a subsequent step of translating an incomplete cry pattern, typically only a low precision is obtained. Even in cases where the incomplete cry pattern cannot be identified in a subsequent window, this has hardly any negative impact on the cry translation as in a typical situation, a plurality of cry patterns will be identified and observed so that the omission of incomplete patterns will not have any significant disadvantages.

Storing pre-cry data greatly reduces the overall computational effort as cry detection can be separated better from cry assessment without reducing cry assessment accuracy. In this respect, it should be noted that the identification of a cry can be simplified and/or can be done in a multistep process. Typically, the cry of the baby will be significantly louder than any background noise. preferably, such an increase in sound level is used as a first step of cry detection. Even in cases where cry detection is executed in a cloud, implementing such first step locally can be preferred, as it reduces the amount of data to be transferred to the cloud quite significantly, reducing the overall energy consumed by cry assessment. will be understood that implementing the first step of cry detection locally in view of sound level very easily be implemented, for example using a simple comparator. Thus, there is no need to have a particularly powerful local processor or microcontroller.

Accordingly, a first important criterion is the absolute sound level of a sample or frame. Rather than using an absolute sound level, an increase of sound level over a given-rather short-period could also be used so that an adaption to the allowed ambient noises is automatically effected. It should be understood that background/cry discrimination may rely on artificial intelligence/neural network filtering techniques and that, where this is the case, filters different from those used in the actual cry assessment can and preferably will be used.

As stated above, a corresponding test of sound levels can be done with extremely low computational effort as this only requires the comparison of the current sound level, that is the binary value of a current sound data, against a predefined or learned threshold. However, background noise such as dogs barking, doors slamming and so forth may also result in significantly high sound levels. Therefore, once significant high sound levels have been detected by comparing a current sound level against the threshold or by detecting a sudden increase in volume, it should still be determined whether or not the suddenly higher sound levels are associated with a sudden loud background noise or with a baby cry. For this, recording pre-cry sound data is helpful as this allows to evaluate the sound recorded immediately preceding those data where the threshold has been exceeded. Storing such pre-cry sound data for subsequent evaluation requires significantly less energy than continuously checking for a number of conditions that only in combination indicates with a sufficiently high probability that the baby is crying. It will be understood that the pre-cry sound data need not be stored for a particularly long time so that a small memory usually is sufficient. In this small memory, new data can be cyclically written over the oldest data. It will also be understood that clues indicating that the baby is crying may also be derived from non-acoustical data, for example from a video surveillance of the baby, indicating a movement or indicating that the expression of the baby is typical for a crying baby.

One preferred possibility to set a threshold is to constantly measure the noise level for consecutive fragments of the data stream (such as samples or frames), for example by determining the average value of a frame. It is noted that this would be even possible using an analog implementation. Also, instead of using the average during each fragment, and considering that the sound level is likely to vary within each fragment, the minimum of these varying sound levels can be determined as the background level. This background level can either be considered alone or from a plurality of background levels per fragment, and a new, overall background level such as a sliding average background level could be determined. The threshold that needs to be exceeded so as to assume that the baby cries can then be determined in view of the respective background level(s), for example considering only samples that are at least x dB higher than the past background level, with X for example being 6 or 12 or 18. However, it will be understood that where the background level is specifically high, it is not reasonable to assume that the baby is crying even louder, so the threshold that needs to be exceeded (or "x" in the example) could be a function of the overall sound level, as the baby should not be expected to cry particularly loud due to background noise. Therefore, X usually becomes smaller if the ambient surrounding has more background noise. In this context, it will be understood that the actual sound level of a baby cry will depend both on the distance of the microphone to the baby and on the baby itself; however, it usually will be possible to place a recording microphone in a distance to the baby ranging from 1 to 2 m; also, despite some variations, the overall sound level of a baby cry can be assumed to lie in a specific useful range, in particular given the resolution of sound levels conventionally achievable even with non-expensive digital analog-converters. Where the background noise is extremely loud, it may be prudent to continuously search for baby cries in the sound data stream. This is reasonable since where the sound level cannot be used as a first clue, other parameters such as the frequency content/spectrogram and the like should be assessed. It is noted that while the above first stage of baby cry identification is preferred, other possibilities would exist, for example using a fixed threshold, and using a threshold initially determined or determined on a regular basis in view of sound levels during sound events that have been positively related to specific reasons why a baby cries and so forth.

In a preferred embodiment, it is also suggested that a baby cry, in particular the onset of a baby cry in a continuous acoustical monitoring stream is detected based on at least one of and preferably at least two of, in particular at least three of a current sound level exceeding a threshold, a current sound level exceeding average background noise by a given margin, a current sound level in one or more frequency bands exceeding a threshold, a current sound level in one or more frequency bands or at one or more frequencies exceeding corresponding average background noise by a given margin, a temporal pattern of the sound, a model including acoustic features not just from the temporal domain but also from the frequency domain. In other words, the temporal and/or spectral pattern of the sound stream can be established and a decision can be made in view of the respective pattern(s). It is noted that sound data can be processed in a manner such that a decision with respect to the patterns can be made using conventional image analysis techniques. Where the cry is detected by comparison to an average background noise, the background noise can be averaged for example over the preceding five seconds, 10 seconds, 20 seconds, 30 seconds or one minute.

It will be understood that a plurality of conditions can be established that must be met in common in order to consider that the baby is crying. For example, a loud noise would only be considered crying if the spectral distribution of sound energy corresponds to the typical spectral distribution of sound energy of a baby cry and if it is sufficiently long. As the computational effort will be different for different conditions, it is reasonable to have a multistep/multistage cry identification with the identification steps requiring the least computational effort running continuously and the remaining and/or additional identification steps being executed only in case the continually running identification steps indicate that a sound pattern requiring more detailed analysis has been found. It will be understood that in this manner, energy consumption can be relatively low, which is particularly advantageous where the method is executed fully or at least with respect to an initial part on a battery operated device. Also, it will be understood that any cry identification steps can be carried out sufficiently fast even on processing devices such as DSPs, FPGAs, microcontrollers, micro processors that are considered slow at the time of application. Accordingly, despite a multistep cry identification approach, latency will be negligible. In other words, this will not give rise to noticeable or significant delays in the cry assessment. anyhow, typical latency is so low that it will be easily acceptable, as there is no direct communication to be established such as in the video or telephone communication between adults.

In view of this, it is suggested that in a preferred embodiment, a baby cry, in particular the onset of a baby cry in a continuous acoustical monitoring stream is detected based on at least one of a current sound level exceeding a threshold, a current sound level exceeding average background noise by a given margin, a current sound level in one or more frequency bands exceeding a threshold, a current sound level in one or more frequency bands exceeding corresponding average background noise by a given margin, a temporal and/or spectral pattern of the sound, preferably deciding whether or not a baby cry is present in the sound data stream by multistep/multistage cry identification, where the identification step or identification steps requiring less computational effort are running continuously and the remaining and/or additional identification steps are executed only in case the continually miming identification step(s) indicate that a sound pattern requiring more detailed analysis has been found.

It will be understood that where a baby cry or more precisely the onset of a baby cry or an alleged baby cry has been identified, several possibilities exist. First of all, it would be possible to assess each of a number of frames or specified periods following the detection of the cry to determine whether or not the baby still is crying; this could for example be done independently of the current sound level; in this manner, data from those periods where the baby needs to breathe will also be analysed, as the breathing sounds may also give important clues to the reason why the baby cries. (Note that the number of samples in a period or window for which a search for cry patterns is carried out may be different from the number of samples grouped together in frames to e.g. obtain a file that can be transferred to a cloud server easily; for example for transferal of files, a certain number of samples should be grouped together in a manner allowing a simple error correction, but this number should typically is smaller and the number of samples grouped together to form a window.

In an embodiment where a small number of parameters are extracted from the sound data for assessment and/or for detecting a cry in the sound stream, a counter could be used that counts up to the minimum number of frames that need to be acquired and analysed after a cry event or alleged cry event has been detected. Also, where periods in the sound stream are analyzed to determine whether or not patterns that have been found, such periods typically will consist of a number of frames and thus, the counter should be provided as well.

Note that it is preferred to monitor whether or not the baby (still) cries, so that in further incoming sound data loud noises should also be searched for in parallel to the calculation of parameters relevant for the personalized assessment of the reason why the baby cries and/or parallel to the identification and isolation of patterns typically associated with baby cries. Note that for detecting whether a cry continues, it may not be necessary to request that the average sound level of a frame recorded is significantly louder than the sound level of previous frames, but that the sound level should not fall below a given minimum. A hysteresis-like behavior can thus be implemented once an alleged cry is analyzed further.

If this is done, the counter can be reset whenever it is established that the baby is still crying. This approach ensures that where the parents and/or a caregiver do not respond to the cry of the baby before the crying had stopped, the end phase of crying is fully recorded. This may be helpful to establish whether or not a baby that has quietened down should be then left alone or not. However, it would also be possible to only consider those frames for which it has been established that the baby was crying during the recording of the samples in the frame. A particularly useful way to achieve this is to search for patterns in the sound stream that typically correspond to baby cries. Such a search can be effected for example by obtaining two-dimensional representations of sound snippets or periods, for example by determining spectrograms indicating the frequency content of a sound period (such as a 5 second sound period) over time. Searching for this patterns that typically correspond to baby cries in the sound stream can then be effected by training an artificial intelligence model with patterns known to relate to baby cries in a manner such that the output of the model will be those parts of the spectrogram that correspond best to a baby cry. For example, a part of the sound stream can be selected that has a likelihood of more than 50%, 60%, 70%, 75%, 80%, 90% or 95% to relate to a baby cry. Also, it is not necessary to isolate the actual part of the spectrogram (or sonograph, voiceprint, or voicegram) or spectrogram-like two-dimensional representation of the sound stream; rather, it would be sufficient to identify the starting time of a cry pattern—and, in case cry patterns having different lengths are considered in assessment, to also identify the time of the cry pattern. This is particularly helpful where a similar assessment of a pattern identified is then effected in the assessment stage as it may be desired to use a resolution for pattern identification and isolation which is different from the resolution used for pattern translation. in particular, both the frequency resolution as well as the temporal resolution might be lower for pattern translations. In cases where a significant fraction of the sound stream is discarded as not relating to baby cries, a reduction of the computational effort might result. In contrast, where a significant part of the sound stream is chosen for translation, it might be more useful from a computational viewpoint to search for cry patterns using the same temporal and/or frequency resolution as used for pattern translation later on. However, note that the windows or periods in which the search for cry related patterns is effected should have a significant overlap which in turn means that a cry related pattern, for in particular a short cry related pattern might be found both in the end of a preceding period and at the beginning of a subsequent period. When determining whether or not it is advantageous to effect the search for cry patterns with the temporal and/or frequency resolution different from those used for pattern translation, this should be taken into account.

In any case, it will be preferred to use timestamps so that the length of any interruptions of the crying, for example because the baby is gasping or intaking a breath, can be established, so that it can be used for improving translations or assessments of the cry pattern.

It will be understood that it may be advantageous to sample and/or analyze a general background, in particular a background where average sound levels are observed and thus short, pulse-like loud sounds such as those from doors slamming or dogs barking will not adversely affect the analysis of the background. Background analysis may serve to establish the most useful parameters for cry assessment and may also help to establish thresholds for a first cry detection stage. In should also be understood that certain parameters that in an extremely quiet surrounding would be best to assess the reason why the baby cries cannot be measured properly in an actual environment due to background noises or because the monitoring microphone must be placed too far away from the baby. In such cases, the relevant information otherwise obtainable would be buried under noise and other parameters for assessing the reason why the baby cries should be selected.

From this, it can be seen that information relating to the acoustical background can be very helpful in establishing the best parameters and/or for cry identification, in particular because for a personalized assessment, very high quality data should be provided. It will be understood that in view of variations due to the placement of microphones and/or the characteristics of microphones where a variety of different devices for the implementation of the method could be used, for example different smartphones, the selection of parameters should take into account the "stability" of the parameters.

This may be easily understood for parameters such as the overall sound levels of the cry that will vary with the distance between the baby and the monitoring microphone; however, other factors such as whether or not the baby is placed in a cradle, whether the curtains are closed in a room and thus higher frequencies are subjected to higher absorption, what the microphone sensitivity polar pattern looks like, e.g. cardioid, hypercardioid, supercardioid, subcardioid or unipolar and how it is oriented to the baby and so on also have an influence. It should be understood that this might not only affects a few low dimensional parameters derived from the sound stream, but might also adversely affect identification and isolation of cry patterns in the sound stream using spectrogram or spectrogram-like transformations. Therefore, when training an AI model, it is highly preferred to rely on data obtained with not just one set up/microphone, but to use a training set comprising sound samples obtained with a variety of different devices. In particular, for establishing a training set, it is possible to record the same sounds simultaneously with a plurality of devices. This also helps as these plurality of devices will not be fully synchronized so that the sound patterns relating to one and the same baby cry will have different starting times within their respective 5 second periods. Furthermore, it will be understood that the sound recorded would vary from device to device even if placed at the exact same position for recording the exact same sound. There are numerous reasons for these variations, for example variations with respect to microphone sensitivity, microphone response, response of amplifiers used for conditioning of the analog signal prior to digitalization and so forth. It should be understood that is would even be possible to synthesize a training set using a plurality of devices recording the playback of a number of baby cries previously recorded, preferably previously recorded using a high quality microphone arrangement.

It may be helpful, in particular where neural network filters need to be established for the personalized assessment of cries based on only a small number of parameters, to also consider the behavior of the acoustical background. Thus, it may be advantageous to upload some non-cry background sound patterns to a server so that typical background patterns can also be taken into account, particularly evaluation and determination of neural network filters/neural network filter parameters. It will be understood that while here, generally, reference is had to neural network filters or to the neural network parameters of the present application, reference could also be had to classifications, classification models and the like; this would not be considered to be a difference in techniques and methods implemented in the wording used describe such techniques.

It is particularly preferred if the cry data, from which parameters allowing cry assessment are determined, comprises sound data from the onset of a crying event, in particular sound data from the initial two seconds of the cry, preferably from the initial second of the cry, in particular preferably from the initial 500 ms of the cry. This is easily possible where the determination that the baby is crying is done in an automated manner; taking into account the onset of the crying event may be helpful in the assessment because the crying itself may add to discomfort, e.g. because the baby feels additional stress due to the fact that it's needs remain on answered for too long, and/or because the crying itself exhausts the baby if it continues for a prolonged period. Also, where changes of the parameters such as changes in the first frequency of the formant are considered as indicated above, the initial change might contain particularly valuable information. It is noted that in case where cry patterns are isolated from sound stream periods using convolution or neural networks or other artificial intelligence methods, this is frequently done following a first sound level assessment using a very simple circuitry, for example an analog or digital comparator. In such cases, it will also be preferred to evaluate the actual onset of loud noises; thus, sound data should be stored, preferably such that loud noise detectable with a comparator will be close to the end of a window in which a search for right patterns is carried out, for example a 4-, 5-, 6-7-, 8-, 9- or 10-second window.

Note that in a number of cases, it is advantageous to frequently alter the way baby cries are assessed, for example by frequently altering the filter coefficients in a neural network filter used for assessing the baby cry in view of the growth and development of the baby. This can be advantageous e.g. very early after birth, because the sound characteristics of a newborn baby are changing fast; also, it may be that fast-changing medical conditions such as an elevated temperature strongly influence the way the data should be assessed, so that for a useful personalization, the neural network filters of filter coefficients should also change frequently. Depending on the exact implementation of personalization, it may not be feasible to implement the execution of the personalized assessment steps locally, as this would require a rather large memory for different filter coefficients and/or because currently suitable filter coefficients must be identified and downloaded; therefore, the assessment will sometimes be preferably executed on a centralized server and/or in a cloud.

Accordingly, in a preferred embodiment, it is also suggested to implement all or some, e.g. at least one of the steps of cry detection in the sound obtained from an acoustically monitored baby locally, and to upload data to a (cloud) server arrangement used in a centralized automated baby cry assessment, in particular uploading data for assessing the baby cry in a cloud. Even a simple first step of cry detection such as a threshold comparator will help to reduce the data streams that need to be uploaded, saving energy and bandwidth. Note that such first simple local step of cry detection thus is preferred even in cases where the actual assessment of the baby cry or major parts thereof are carried out in a cloud server. It is also noted that it is not necessary to upload the sound to a decentralized remote cloud server. for example, case might exist where the device placed close to the baby has extremely limited computing power and the device used to inform the parents that the baby is crying is a smart phone that nowadays has at least a computing power to effect an assessment. In such a case, rather than uploading sound to the remote set cloud server, sound from the device placed close to the baby could also be uploaded to the smart phone for further assessment, thus reducing any privacy concerns parents might have.

It will be noted however, that while it is clearly preferred to determine locally at least to some degree of likelihood whether or not a cry event currently is recorded so as to save bandwidth otherwise needed for continually uploading sound data to a cry identification stage, improved results can already be obtained by taking into account at least some of the characteristics of the baby, in particular the most relevant for personalization such as sex, age, weight and size, that is even without a full personalization taking other personal data into account such as current temperature, current medical conditions, time since the baby has been fed and so forth. As age, weight and size only change slowly, a personalized assessment can also be implemented locally, in particular for a situation where uploading of sound data is impaired. It will be understood that even in such situations, it is highly preferred to establish a connection between a device recording baby sounds and a (cloud) server so that neural network filters for a personalized baby cry assessment may be updated frequently. Also, during periods of connections, data collected locally can be uploaded to the server and new filters or executable instructions to assess the reason the baby cries in view of sound data recorded can be downloaded.

It will be understood that in order to improve the personalized assessment of baby cries, it is preferred to upload to the cloud and/or to a central server data relating to the acoustical monitoring of the baby crying, and/or parameters relating to the selected cry data allowing cry assessment. Where the computing power locally available is sufficient to effect a cry identification, at least in cases where bandwidth is insufficient, it might be preferred not to upload any data; however, as a database of sound samples grows when uploading a large number of patterns, preferably provided with tags from a feedback confirming or disagreeing a previous assessment, and as a model can be retrained using an enlarged database of tagged samples, it is highly preferred to upload as many samples relating to cry patterns as possible.

Thus, to improve the personalized assessment, at least some of the cries and/or parameters derived from the cries could be stored on a server together with respective personal baby data to allow a personalized assessment in view of the information stored on the server. It will be understood that in cases where for example a subscription to new filters has been acquired for a specific device, and where the parents or caregivers have initially indicated the age of the baby and further details, it may be sufficient to only transmit an ID of the device. However, as other parameters such as the weight and size of the baby should also be frequently updated, it is preferred that the parents and/or caregivers are requested to enter corresponding information on a regular basis. It will be understood that entering such information can be done inter alia using a separate device such as a smart phone running a suitable App and/or by allowing the user to enter corresponding information via speech into the device, using either a local or a centralized speech recognition.

As can be seen from the above, it is suggested in a preferred embodiment that the method comprises a step of downloading from a centralized server information allowing a local personalized baby cry assessment. Given that as the baby grows and becomes older, after some time, the personalized filters will not give the most favorable results any longer. Thus, it is possible and useful to limit the use of a local personalized baby cry assessment to a specific time. Once such period has elapsed, a warning can be issued that the personalization is no longer reliable and/or a standard, non-personalized filter can be used and/or a message to the user can be issued requesting renewal of filters instead of indicating the reason why the baby cries. In particular cases where the parents or caregivers have subscribed to a regular updating of filters, and such filters have not been updated for a prolonged period, for example because the connection to a centralized server has been impaired and/or blocked, a warning can be generated some time before the use of personalized filters is stopped overall and/or before the assessment is effected in a non-personalized manner only. Also, it is obvious that a personalized assessment can be effected in a cloud server as well.

As indicated above, in a preferred embodiment, it is suggested that sound data acquired before the onset of a cry is (also) used to determine an acoustical background and/or to determine additional parameters for baby cry assessment. Regarding the determination of additional parameters for baby cry assessment, a situation may arise where the exact onset of the cry cannot be determined with a sufficiently high probability, for example because of a coincidence with a loud acoustical background. It is noted however that by relying on spectrograms and the like for pattern identification, cry related sound data can be isolated significantly more reliable than by merely relying on only a small number of parameters derived from a sound stream. Therefore, the spectrogram-based identification and isolation of crying times or crying patterns is significantly more robust against acoustical disturbances and it will be understood that this very significantly helps in obtaining better cry translation results.

It will be understood that an exact onset of a cry might nonetheless be impossible to determine with a sufficiently high probability and evaluation of additional (preferably preceding) frames might help in the assessment. This can preferably be done by evaluating sliding parameters and/or by cross correlation techniques or by analyzing time periods, for example the 1, 2 or 3 standardized time periods as used for identification and isolation of cry patterns in a sound stream preceding a loud noise exceeding a threshold. Also, where a baby cry is detected following loud noises, it is more likely that the baby needs to be comforted; accordingly, such events might be useful in the assessment even though they are not considered as a background pattern that needs to be subtracted or filtered out from the sound data.

Regarding the minimum probability from which it is considered that the onset of a cry has been detected without necessitating evaluation of sound data acquired before the onset of the cry, it should first of all be understood that in the typical case of a multistage cry detection, such likelihood or probability can be determined, and an assumption is made that the cry has been detected if such probability is higher than for example 70%, 80%, 90%, 95% or 99%, the exact threshold of considering the probability sufficiently high depending inter alia on the pattern of the background noise and/or the quality of the multistage cry detection.

Given the current standards already achieved by the applicant, the probability that a cry has been detected in a frame for the first time and thus the onset of cry has been detected easily surpasses 99% probability. However, a lower threshold can be set such as 97%, 95%. 90% or 80%. Note that even where a very high probability of having determined the onset of the cry exactly has been achieved, it would still be possible to feed preceding frames into a baby cry assessment stage together with those frames recorded after the (highly likely) onset of the cry. This might help in particular where techniques such as cross correlation are used in the assessment. The number of frames preceding the assumed onset of a cry that should be fed into the cry assessment can even be determined in view of the probability, for example determining the number of preceding frames by the formula (100−Probability in %)×A, with a being 0.5 or 1 or 1.5 or any number between; obviously, the number of preceding frames obtained from these formulas rounded to the next larger integer.

It will be understood that the above method of providing data for the assessment is particularly helpful in a field environment, that is outside of a sound or audio laboratory. In the field, the suitable preparation of data allowing an increase of accuracy of cry assessment is particularly important. For example, in a typical laboratory set up, the sound will have a clean, low noise background and the cries can be recorded clearly. In contrast, in a typical field environment, the background noise will be significantly higher, sound volumes of cries will vary stronger and the records are not as “clear” for example with respect to the high-frequency content due to a less than optimal microphone positioning. These differences typically cause the accuracy in the field to be significantly lower than in a laboratory environment. However, by using cross correlation techniques and/or sliding averages, the accuracy of identifying the onset of the cry and/or identifying the cry itself in the field becomes absolutely comparable to the accuracy obtainable in a lab environment, despite the presence of significant noise. furthermore, it is noted that with respect to the final precision of translation, significantly better results can be obtained by identifying and isolating cry patterns with image-processing like AI methods relating the spectrogram-like transformations of sound periods.

Nonetheless, it will be understood that the absolute accuracy obtainable and determined both in the lab in the field might still depend on e.g. the samples used, on the quality of the actual assessment, e.g. as represented by the neural network filter, on the length of a record or on the definition and mathematical determination of the measure of "accuracy". Therefore, accuracy determined by different methods cannot be compared easily. Typically, an accuracy will be defined such that a method gives accuracies higher than 90% in the lab. This accuracy will usually drop significantly in the field.

Nonetheless, using the same methods, the overall accuracy in the field need not drop from =>90% in the lab to less than 80% in the field any longer if appropriate data is provided to the assessment stage, for example data allowing to consider considering sliding averages and/or cross correlations, or a search for patterns in spectrogram-like representations of sound periods. Note that a spectrogram-like representation might be a standard spectrogram or might differ in that the resolution of frequencies differs over the audio spectrum and/or might have a different dynamic range for different frequencies.

From the above, it will already be understood that preferably, the parameters are fed into a cry assessment stage in a manner allowing the assessment of the cry using neural networks, convolutional neuronal networks and/or other known artificial intelligence techniques. It is noted in typically, such techniques rely on a plurality of so-called "layers" and that a personalization can be achieved if at least one such layer is personalized; however, it would also be possible to personalize the cry assessment by personalizing more than one layer, that is by selecting for example different filter parameters for one or more convolutional layers depending on the personal data relating to the baby. Where a plurality of layers are personalized, it is possible to either fully personalize each layer, for example by selecting different filter parameters depending on sex, age and weight; in contrast, it would also be possible to select different filter parameters depending only on sex in a first personalized layer, selecting different filter parameters depending only on weight in a second personalized layer and selecting different filter parameters depending only on age in a third personalized layer (with the first second and third personalized layer not necessarily processing data in that sequence). it would be obvious to a person skilled in the art that when multiple layers are personalized, it would also be possible to fully or partially personalize them, for example personalizing a first layer with e.g. 1, 2, 3 or more personal parameters and personalizing a second layer also with 2, 3, 4 or more personal parameters that may or may not partly overlap with the personal parameters used for personalizing the first layer.

In a computer-implemented multistage cry assessment method having for example one or more stages for cry detection and cry pattern isolation e.g. based on object localization methods searching for cry patterns of a length of at least 0.4 seconds and preferably shorter than 3 seconds based on (mel-) spectrogram-like representations of an overlapping sequence of windows segmenting the original sound data; further having one or more stages for classification of the cry patterns isolated, preferably also based on two-dimensional representations of the cry patterns, e.g. representations having a different temporal and/or frequency resolution than the representations used for cry pattern detection and isolation and/or being normalized by setting the maximum sound level with in each cry pattern to a specific value and/or by complementing a short cry pattern up to a desired length and determining probabilities for each cry pattern isolated and considered to belong to one of the plurality of different classes (or reasons why the baby cries); and another "collector" stage assessing the sequence of probabilities determined in view of the sequence of cry patterns, it is possible to implement each stage separate from the other, for example in a manner where the first stage is executed close to the baby, the second stage is executed in a cloud, and the third stage is executed on the smart phone of the parent or caregiver; in such a case, it is easy to see that the personalization of one stage, preferably the final collector stage and/or the stage assigning probabilities to each cry pattern, would be sufficient to obtain an overall personalized assessment of the baby cry. However, there is no need to separate the different stages and would be well possible to implement the computer implemented multistage cry assessment method in a manner where different stages and the interfacing steps such as re-normalizing length and sound level, are executed in such a manner that the user will not take notice of the different stages, but will see the entire assessment as a unique process. This could be achieved by concatenating the stages for execution at one and the same place, for example by uploading the entire sound stream into a cloud and receiving only the assessment of the cries from the cloud. Nonetheless, this could still be considered a multistage cry assessment. It is explicitly noted that providing a cry pattern detection and isolation, a cry pattern probability assessment of a sequence of cry patterns and the personalized automated collective assessment of probabilities obtained from assessing the probabilities is considered inventive, in particular when using object localization for cry pattern detection and isolation.

It will also be understood that in a preferred embodiment, the parameters and/or a datastream of recorded sound will be uploaded together with baby data information. It will be understood that uploading the entire sound recording is preferred in situations where an existing baby cry database is to be enhanced while otherwise, uploading only parameters extracted can be preferred because fewer data need to be transmitted, allowing a faster response in particular where data transmission bandwidths are low. In this context, it should be understood that in artificial intelligence evaluation of data, one of the important steps is a reduction of dimensionality. For example, if chunks of sound data are considered comprising 64 frames of 128 consecutive 16-bit samples, the initial space is (64*128*16=) 131072 dimensional. In order to handle this, parameters such as those listed above, for example average sound level, change of first formant frequency and so forth may be determined; (as an alternative, spectrogram source spectrogram-like representations might be used.) Now, as can be seen above, where it is desired to assess the baby cry based on a number of parameters rather than a 2 dimensional, spectrogram like representation, a large number of different parameters exists that could be used in describing and assessing the baby cry; this large number of different parameters typically is reduced further by selecting only the most relevant parameters.

In the personalized assessment of baby cries, patterns to be also found in sound data from other babies are identified and a set of parameters are searched for that best describe these patterns. Where techniques based on spectrogram-like representations are used, such identification in spectrogram-like representations of the cry pattern can be based on an image-like analysis comparing the spectrogram like representations of the cry to be assessed with cry patterns relating to known cries. The known cry patterns might be selected from a large database such that only cries from babies of similar age, sex, weight, medical condition and so forth are grouped; in such a case, the filters used for the comparison of patterns will have a distinct personalization as the cries of each similar (peer) group will be somewhat different from cries of babies belonging to different peer groups, even if the babies cry for the same reason. However, when the database is not large enough to establish a large variety of different peer groups, it would also be possible to assess in a first step the cry patterns identified and isolated in the original sound stream recorded by one or more layers using the exact same filter parameters for all babies. As a cry will comprise a plurality of cry patterns, in this first step a plurality of possible reasons why the baby cries will result, with a reason or likelihood of a reason being assigned to each cry pattern. Then, the plurality of such possible reasons or likelihoods why the baby cries can be assessed in a further step, with this step then being personalized. It should be noted that by processing data in this manner, the number of personalized filter coefficients for personalization is significantly lower than when personalizing the first step assigning a reasonable likelihood of the reason for a cry to each single cry pattern.

Note that where different ("peer") groups of babies are established for personalization, a situation may arise in which a different set of parameters might be best for each different group of babies. It is desirable to reduce the computational effort to determine the parameters and thus select a small set of parameters sufficient for personal assessments. However, if only a limited number of parameters or, even worse, only a reduced set parameters are transmitted to the server instead of the complete sound stream or instead of at least the fractions of the sound stream related to cry patterns or the spectrogram-like representations thereof, the identification of novel patterns might be impaired. Accordingly, at least for identifying novel patterns from additional data, transmitting the full sound data—or the full extracted/separated cry data—rather than only parameters extracted therefrom is preferred.

In a preferred embodiment, the computer-implemented method of the present invention comprises uploading the parameters and/or a datastream of recorded sound and/or fractions thereof and/or information relating to such fractions such as identified and isolated cry patterns together with baby data information, in particular baby data information relating to at least one, preferably at least two, three or four of age, sex, size, weight, ethnicity, single/twin/triplets, current medical status, known medical preconditions, in particular known current diseases and/or fever, language of parents and/or caregivers.

It will be understood that the information such as date of birth, single/twin/triplets need not be transmitted every time data is transmitted to the server or cloud from a local device. However, as some of the baby data information is needed, at least information allowing to identify the local device and associable with corresponding necessary baby data could be transmitted, for example the ID of a locally used device; such a case, the actual baby data could be transmitted independently prior to the personalized assessment, stored in the cloud or on the server and retrieved according to the transmitted information such as the ID of the locally used device. It will be understood that it is sufficient in this context if the parents register the baby or the device using an app, website form or the like, inputting the respective baby data.

Furthermore, it is preferred if (feedback) information relating to the accuracy of one or more previous assessments is uploaded to the server. This may help to re-calibrate filters (or classifications) used in the machine learning model and/or eliminate previous errors. Again, information relating to the accuracy of previous assessments can be uploaded at times where no assessment of a current crying event is needed. It will be preferred to transmit information relating to the accuracy of one or more previous assessments together with data relying to the crying event such as a crying event ID, a device id+ time tag or the like; also, this could e.g. be a combination of the actual automated assessment, the feedback of the assessment by the parents or caregivers and additional information such as corresponding baby cry parameters and/or sound raw data, in particular where the assessment was judged to be not good; instead of the raw data, a timestamp of a previously assessed crying event, preferably a previously assessed crying event for which data already have been transmitted and have remained stored on a centralized server such as a cloud server could also be transmitted. Whether it is preferred to retransmit sound data or parameters determined in view of sound data or just the ID or a time tag will depend inter alia on the storage space on the server. Mere statistical data indicating how often the assessments have been correct overall or indicating how often a specific assessment such as "baby wants to be comforted" or "baby needs to burp" have been correct or wrong could also be transmitted. Using statistical information about assessments allows to provide different assessment algorithms/filters or assessment results using different filters and/or algorithms to different users despite relating to babies in the same peer group and to then evaluate the different assessments in a statistical manner. This is particularly helpful where the group of users is sufficiently large.

It can be understood that different channels and/or different times can be used to transmit different kinds of data.

The data provided for personalized assessment is preferably determined from the extracted cry data such that an assessment allows to distinguish at least one condition of "baby tired", "baby hungry", "baby is uncomfortable and needs attention", "baby needs to burp", "baby in pain". Where parameters are transferred, such parameters are preferably selected and provided such that at least two, in particular at least three and specifically, all of the different conditions can be distinguished and identified. It can be estimated that once a sufficiently large database is available, certain medical conditions such as "baby has reflux", "baby has flatulence", "baby has an inflammation of the middle ear" or more specific reasons for discomfort such as "baby is too hot", "baby is too cold" "baby is bored" can be identified at well. In this context, it should be understood that the method of providing data for the personalized assessment suggested in the present invention is also very helpful in enlarging existing databases of baby cries, thus helping in the improvement of baby cry assessments. Thus, by properly implementing the present invention, the database of cries can be enlarged to allow a highly refined personalization of the assessment in a short time.

While the method described above can be implemented using a large variety of devices and/or systems, protection is specifically sought for an automated baby cry assessment arrangement comprising a microphone for continuously acoustically monitoring a baby, a digital conversion stage for converting a monitoring sound stream into a stream of digital data, a memory stage for storing personal baby data information, a communication stage for transmitting data to a centralized server arrangement and an indication means for indicating the results of an assessment, such as a loudspeaker arrangement for acoustically indicating the result of the assessment, a display and/or an interface to a display; a cry identification stage for identifying the onset of cries in the stream of digital data is provided and wherein the communication stage is adapted for transmitting to a centralized server arrangement data relating to cries for assessment in view of personal baby data information and to receive from the centralized server arrangement data relating to a personalized assessment of baby cries. The cry assessment arrangement could be implemented in a manner where the display a loudspeaker arrangement for acoustically or visually indicating the result of the assessment are arranged in a device separated from the device comprising the microphone.

It will be understood that one or more stages, in particular the cry identification stage for identifying the onset of cries in the stream of digital data can be implemented by a combination of hard- and software. Also, from the centralized server arrangement, either a personalized filter for local assessment of cries automatically identified can be received, or, in case some or all parameters obtained in view of the sound data are transmitted to the centralized or cloud server for assessment, the results of the assessment can be received.

In a preferred embodiment, it is suggested that the automated baby cry assessment arrangement comprises a feedback arrangement for obtaining feedback information relating to the accuracy of one or more previous assessments and the communication (or I/O) stage is adapted for transmitting feedback information to a centralized server arrangement. In a preferred embodiment, the feedback arrangement is integrated into a device used for acoustically monitoring the baby; this helps to ensure a high quality of the feedback.

Furthermore, in a preferred embodiment, the automated baby cry assessment arrangement will comprise a local assessment stage adapted to assess baby cries in view of data received from the centralized server arrangement relating to a personalized assessment of baby cries. The local assessment can be an auxiliary assessment stage allowing assessments in cases where no sound data can be transmitted to a centralized server arrangement or could be the main or only assessment stage where all assessments indicated to the parents and/or caregivers are generated.

It has been stated above that the personalized assessment of baby cry data depends on factors such as the age, size and weight of the baby which will change significantly as the baby grows older; this results in the fact that the personalization might become outdated. In order to prevent that a personalized assessment is attempted using outdated filters, a corresponding check should be made. Accordingly, it is preferred if the automatic baby cry assessment arrangement comprises a timer and an evaluation stage evaluating the current age of personal baby cry assessment information and/or an age or validity of (filter/algorithm) data received from the centralized server or cloud arrangement and relating to a personalized assessment of baby cries, prior to the assessment of the baby cry, the baby cry assessment arrangement being adapted to output a baby cry assessment depending on the evaluation.

The invention will now be described by way of example and with reference to the drawing. In the drawing, FIG. 1*a* shows a sequence of steps in the assessment of baby cries, with some of these steps implementing an embodiment of the invention;

FIG. 1*b* shows a part of the cry detection/data preprocessing:

FIG. 2 shows a plurality of symbols that could be used to indicate a current need of a baby;

FIG. 3*a-e* shows 3D spectrogram's extracted out of a number of audio recordings representative of baby cries indicating different needs—time increases along the X-axis, frequency increases along the Y-axis and intensity increases along Z axis. Units are arbitrary but the same for all parts.

FIG. 4*a-f* show a comparison of spectrograms, to visualize the variations of intensity for a plurality of frequencies over time for different cries; in more detail, FIG. 4*a* relates to cries from different hungry babies FIG. 4*b* relates to different cries from same hungry baby FIG. 4*c* relates to cries from different babies in pain FIG. 4*d* relates to different cries from same baby in pain FIG. 4*e* relates to cries from different babies needing to burp FIG. 4*f* relates to different cries from the same baby needing to burp.

FIG. 5*a-f* shows a clusterisation of different cries, with

FIG. 5*a* showing the overall cluster of cries

FIG. 5*b* showing Hungry cries in overall cluster

FIG. 5*c* showing "Sleepy cries in overall cluster

FIG. 5*d* showing "Need to Burp" cries in overall cluster

FIG. 5*e*: discomfortable cries in overall cluster

FIG. 5*f* showing pain cries in overall cluster.

(It will be understood that the separation of clusters in a 2d graphic is not as complete as it would be if considering additional differentiating parameters; however, it becomes obvious that even in the 2d graphic shown, clusters start to emerge).

FIG. 6 shows a 3d-representation of a T-SNE dimensionality reduction mel-spectrogram from two different perspectives.

FIG. 7 shows the K-Means clustering with the centroids for each cluster of 5 different labels being drawn as white crosses, and the partitioning into different cells.

Figure 1A:
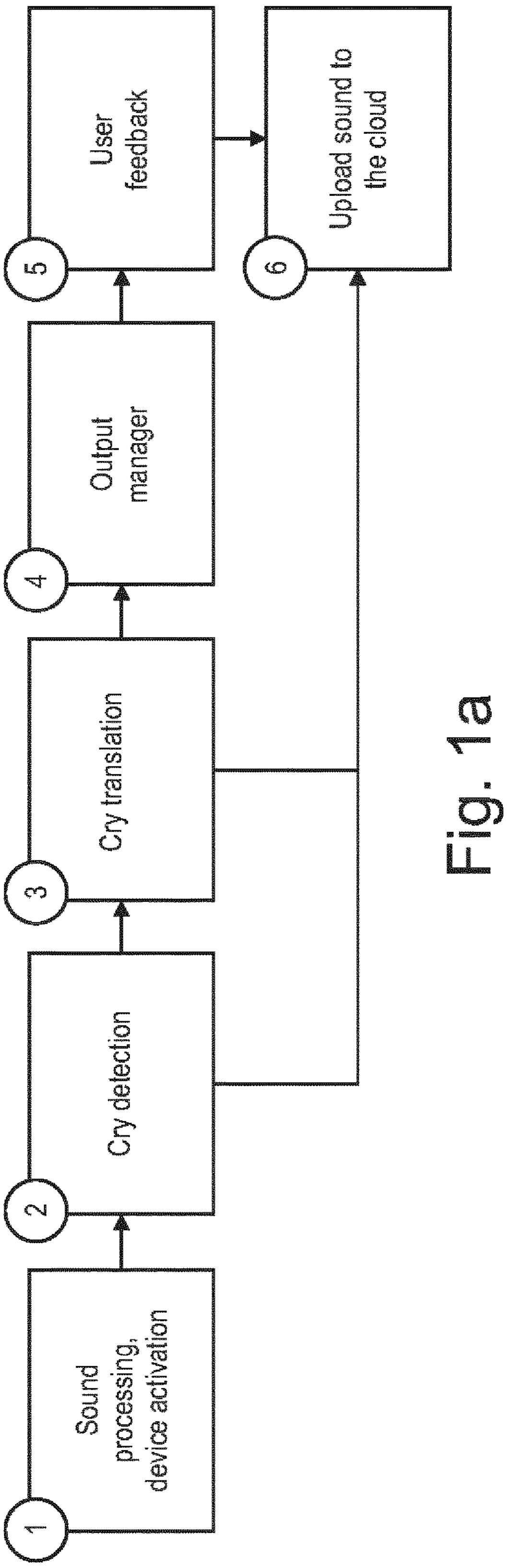
Figure 1B:
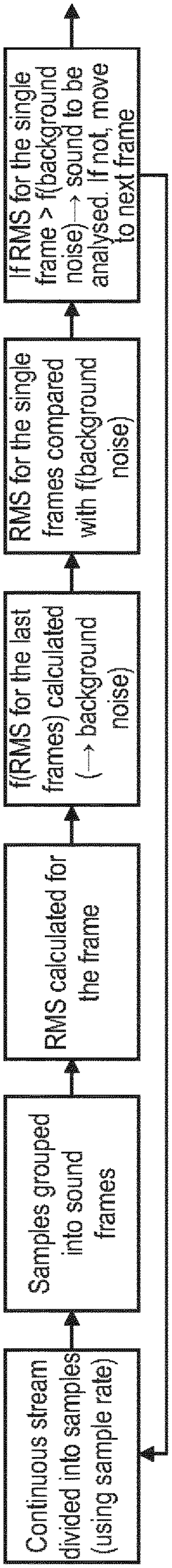

FIG. 1 illustrates steps useful in a baby cry assessment for which a computer-implemented method of providing data for an automated baby cry assessment is executed, the computer implemented method of providing data for an automatic baby cry assessment comprising the steps of acoustically monitoring a baby and providing a corresponding stream of sound data, detecting a cry or part of a cry in the stream of sound data, selecting data from the sound data in response to the detection of a cry or part thereof, determining personal baby data for a personalized cry assessment, preparing an assessment stage for assessment according to personal baby data, processing the selected data for cry assessment, and feeding the processed information into the cry assessment stage prepared for personalized assessment according to personal baby data.

In this respect, FIG. 1 suggests that for the assessment of the baby cry, first of all, a suitable sound processing or preprocessing device is activated, is placed sufficiently close to a baby to be monitored and is switched on.

In a preferred embodiment, a sound preprocessing is effected close to the baby and then, as long as a connection to a central server is available, preprocessed sound data together with personal baby data information is uploaded to a centralized server, which could be a cloud server. In such a preferred embodiment, the sound preprocessing device will be part of an automated baby cry assessment arrangement (not shown), the automated baby cry assessment arrangement comprising a microphone for continuously acoustically monitoring a baby, a digital conversion stage for converting a monitoring sound stream into a stream of digital data, a memory stage for storing personal baby data information, a communication stage for transmitting data to a centralized server arrangement, wherein a cry identification stage for identifying the onset of cries in the stream of digital data is provided and the communication stage is adapted to receive from the centralized server arrangement data relating to a personalized assessment of baby cries.

It will be understood that basically, a typical smart phone could be used as a preprocessing device, since the typical smart phone will comprise a battery, a microphone and suitable microphone signal conversion circuitry, processing unit and a wireless I/O connection. Where the preprocessing device is implemented by using a smart phone, a suitable app can be installed to implement the functionalities and processing stages so that all necessary preprocessing (and, where applicable, both preprocessing and assessment) can be executed on the smartphone; however, as not all parents and/or caregivers have smartphones to spare and as some applications, for example applications and pediatric stations of hospitals require a rather large number of preprocessing devices, it is preferable to integrate the necessary hardware into a stand-alone package or into other baby monitoring devices such as video cameras for baby surveillance or sensor arrangements monitoring whether the baby is breathing. Note that it is possible to use a non-smart phone device close to the baby, from which sound data is transferred by short range communication such as Bluetooth and/or Wi-Fi to the smart phone device of a parent or caregiver, where an additional (pre-) processing is effected, so that preprocessed sound related data can be uploaded to a centralized server. In such an arrangement, sound data will only have to be transferred to the smart phone device in case particularly loud noises are being detected in the vicinity of the baby; nonetheless, many parents wish to receive a continuous stream of sound from their baby and in that case, it is obviously possible to send a continuous sound stream from the baby to the smart phone, laptop, tablet or the like of a parent or caregiver into effect any preprocessing of the sound stream necessary for assessment of the baby cry there, including detection of those parts of the sound stream that relate to cries or can be assumed to relate to cries with some nonzero probability.

A preferred integrated standalone device (not shown) will now be described. A standalone device will comprise a power source, a microphone, a processing unit, memory, a wireless I/O connection and input/output means and, preferably, a timer. It will be understood that such a device can be built in a manner that will boot particularly fast so that no significant delay between switching on and actual operation will occur.

The power source can be a battery, for example a rechargeable battery, or could be a power supply to be plugged into a power outlet.

The microphone can be any microphone sensitive in a range between 150 Hz-3000 Hz; it will be understood that a broader range is preferable, for example ranging from 100 or even 80 Hz as a lower limit and arranging up to 3500, preferably up to 4000 Hz as an upper limit. It will be understood that modern microphones will record this range of frequencies easily; nonetheless it will also be understood that variations in the spectral sensitivity may adversely affect the assessment of the baby cry, because such variations in the spectral sensitivity may lead to sound data where certain frequencies are subdued or over-emphasized. While this is a particular problem in case the use of smartphones as standalone devices is allowed, since different smartphones from a variety of different manufacturers may have widely varying spectral sensitivities, the problem is less pronounced and better results are to be expected using one or a few models of standalone devices, because in that case, identical microphone models could be used. It is even possible to calibrate the microphones and to install calibration data on the device, so that any sound recorded can be corrected for the actual (spectral) sensitivity of a given device. Nonetheless, one should be aware that variations in the spectral sensitivity might also be caused by variations in the environment, for example because more or less absorbing materials are placed around the baby leading to higher or lower absorptions, in particular of high frequencies. Then, the overall sensitivity of the microphone should be such that placed at a distance between about 0.25 m through 1.5 m, a very loud baby cry should give a digital signal close to, but not exceeding the maximum digital signal strength. In a preferred embodiment, the sensitivity of the device will be set either manually or automatically. The polar pattern of the microphone will be such that the orientation of the device will not influence the overall sensitivity and/or spectral sensitivity significantly; therefore, a unipolar pattern is preferred. The microphone signal will be amplified, preferably bandpass filtered and converted to a digital signal audio signal. It will be understood that the sample frequency of the analog-to-digital-conversion will be high enough to avoid aliasing problems according to the Nyquist theory. Accordingly, where the microphone is sensitive up to 4000 Hz as an upper limit, a sample frequency of 8 kHz is considered to be the minimum. Also, it is useful to cut off the analog signal at 4 kHz using appropriate analog (bandpass or low pass) filters where an 8 kHz sampling frequency is used. In a typical implementation, the analog-to-digital-conversion will produce at least a 12 bit output signal and preferably a 14 bit output signal. As there usually will be inevitably some background noise, higher dynamic resolutions will typically not improve the assessments.

The I/O connection forms part of a communication stage for transmitting information to parents or caregivers close by and to transmit data to a centralized server arrangement. Different connections can be chosen to communicate with parents or caregivers on the one hand and with the centralized server on the other hand; for example, short ranged wireless protocols such as Bluetooth, Bluetooth LE, Zigbee and so forth could be used to transmit information to the caregivers, while wide area wireless protocols such as G4 G5 GSM UMTS or WiFi communicating with an internet access point could be used to communicate with a centralized server. In this context, it will be understood that only a limited amount of information needs to be transmitted from the device close to the baby to the parents or caregivers. For example, a regular device-heartbeat-signal indicating that the device is working correctly or indicating another status such as "battery low" could be transmitted; furthermore, in case the baby cries, a cry indication could be transmitted independent of the actual assessment of the cry and the cry assessment once available should be indicated. The average skilled person will understand that this can be done by transmitting a very small number of bits and that accordingly, both the bandwidth and the energy consumption can be rather low. Nonetheless, in a preferred embodiment, parents might have the possibility to decide whether or not a transmission of any sound is preferred or not. In some cases, parents would like to have a permanent acoustic surveillance of the baby.

It should however be understood that it is not even necessary to transmit the actual assessment to the parent or caregiver, since one mode of operation would be to only inform the parent or caregiver that the baby is crying so that the caregiver moves to the device where the actual assessment then is indicated. In contrast, when transmitting data to a centralized server, typically cry data either from a cry to be currently assessed together with personalized baby information and/or data collected from a plurality of cries should be transmitted. As it is frequently hard to soothe the baby, even if the reason why the baby cries is known, it can be anticipated that such cry data may be collected over an extended period of time such as several minutes, resulting in a significantly larger amount of data to be transmitted. Therefore, it is useful to have a broadband connection to the server. While it is not absolutely necessary to transmit large amounts of data to the caregiver parents located in a room away from the baby, thus not requiring that a broadband connection is used, it will be understood that there is no need to use a low energy protocol such as Bluetooth LE, Zigbee and so forth. Rather, it is possible to use a (broadband) I/O such as Wi-Fi for communication with the parent or caregiver as well.

The input-output means of the preferred standalone device serves to on the one hand input personalizing baby data information such as the age, weight, size, facts and/or current or permanent medical preconditions of the baby into the device. The input means could be implemented using the I/O connection described above when used in connection with a smartphone, laptop, tablet, PC or the like when data can be entered and transmitted to the standalone device so as to be stored. However, an even more preferred way to input personalizing baby data information would be to use the microphone and additional speech recognition; where this way to input personalizing baby information is chosen, a button or the like could be provided so that entering a personalizing baby information input mode could be requested by pushing the button. Note that it is not necessary to have a speech-recognition stage implemented on the device itself, but that speech data of the parent or caregiver can be uploaded into a cloud for speech processing there, sending back the personalizing information and/or information from which the personalizing information can be more easily determined than from speech, for example a text file. It will be understood that speech recognition relating to personalizing information could be implemented using services already available in the web.

It would even be possible to guide the user by asking for specific input information using an integrated speaker and preferably to confirm the input as understood over a speaker via a machine-synthesized voice. This is particularly helpful for personalized baby data information that should be updated on a regular basis such as the weight of the baby or information relating to an elevated temperature, because using the microphone, the update of the personalized information can be done effortless and fast by the parents or caregivers. Where it is desired that personalizing baby information baby data information should be entered using a different device and a wireless or wired connections such as USB—which could be used anyhow for supplying power—the only input means that preferably is provided nonetheless could be a confirmation/rejection button for confirming or rejecting an assessment, thus providing feedback regarding the quality of the assessment. Also, in certain cases such as the use of the standalone device and pediatric stations, it might be preferred if medical conditions can be entered as personalizing information. This is advantageous because in a pediatric station, cries from babies having an unusual medical condition will be more abundant, allowing the database to grow faster.

Regarding the necessity to provide feedback, it will be understood that while it is not necessary to allow feedback for each and every device at each and every cry, it still is highly preferable to do so since to provide feedback helps to enlarge the database of samples available and thus helps to improve the assessment; furthermore, a large number of "tagged" samples is available in case suitable feedback is provided. It will be understood that where techniques such as neural network filters are used for an assessment and/or for detecting cries in a more or less noisy background, samples are needed to train a model to determine suitable filters. Now, where feedback is provided, the database of available samples tagged with feedback by the parent or caregiver whether or not the automatic assessment is correct, would be significantly larger than otherwise and in particular may grow fast once a sufficient number of devices have been deployed. Furthermore, a sufficiently large database with samples from a plurality of babies having different ages, different sex, different sizes, different weight and so forth allows to provide assessments that are personalized to a higher degree. Also, a larger database may be helpful to identify novelties; accordingly, it is highly desirable to ask the parent or caregiver for feedback and to provide the feedback to a centralized server, and preferably in a manner that allows to combine the feedback with personalized information and the sound data the cry relates to. It is however not necessary in certain cases to transmit or retransmit the entire sound data where the sound data has been previously assessed and remains stored on the server until the feedback is received.

Regarding the personalized assessment, a current understanding of baby cries is that for newborn babies up to a certain age such as 4 to 6 months, there is no large difference between babies from different countries, ethnicities or "races". Rather, according to the present understanding of the applicant, the differences in the cries can be attributed to physiological difference between smaller and larger babies, newborn and elder infants, with medical conditions of babies having a significant influence as well. It will be understood that it might be possible to distinguish between different cries ever more clearly and/or to distinguish between a larger number of reasons why the baby cries. It will be understood from the above discussion of the prior art that certain medical conditions may alter the way a baby cries, so that from an analysis of the sound data, important medical hints could be obtained. Furthermore, it will also be understood that providing new samples for the database is also done to provide data for an automatic baby cry assessment and, depending on the way the samples for enlarging the sample database are prepared, might constitute a computer implemented method according to the present invention.

The memory of the preferred standalone device will be used to store executable instructions for a processing unit such as a microcontroller, CPU, DSP and/or FPGA of the standalone box; then, the personalizing information will be stored in the standalone device, a device ID, sound data/feedback data for uploading to a server and filter data for a local cry identification and for personalized local cry assessment shall be stored. In addition, the memory will allow a buffering of very recent sound data so that once a cry is detected in the sound data, the sound data immediately preceding the cry, for example preceding a period between 20 seconds and 0.5 seconds is also available, preferably a period of at least 5, in particular at least 10 and specifically at least 15 seconds, where 5 second windows are used to search for cry patterns in the sound stream. The length of the data immediately preceding the cry can be determined in view of the cost and availability of suitable buffer memory as well as in view of expected noise levels. Where the environment is expected or allowed to be particularly noisy, it is helpful to store samples of background/ambient noise as well, for example to identify frequency bands that are particularly noisy or particularly quiet. It will be understood that different types of memory such as ROM, e.g. EEPROM memory, RAM memory, flash memory and so forth may be used for the specific different purposes indicated. Furthermore, it will be understood that the size of memory necessary can easily be estimated in view of the intended use and the periods allowed between two transmissions of sound data samples to a centralized server and in view of the kind of data that is to be stored locally at least for some time. This could be just the feedback data, parameters derived from the cry data, the original (raw) sound data of all cries identified since a preceding upload, samples of the background noise at different levels, for example with particularly loud non-cry background noises, or non-cry background noises having a frequency content often observed; note that the later implies a local statistical analysis of background behavior.

The size of the memory provided will also depend on the length of a baby cry considered. As indicated above, the assessment might be effected locally and/or in a centralized manner using AI/CNN-filters that are trained prior to the assessment to distinguish cries from background noises. Such filtering can be very precise given the typical length of a baby cry, provided of course that the entire cry to be assessed is made available to the assessment stage. Frequently, of course, an assessment is required prior to the baby finishes crying. Accordingly, the fraction of the baby cry typically evaluated should be considered in determining the size of memory needed to store cries for a later upload and/or for buffering data. Note that in a preferred embodiment that has yielded a very high rate of correct detections in a practical implementation, cry patterns of a length less than 5 seconds, in particular between 1.5 and 4.5 seconds, specifically about 2, 3 or 4 seconds along are isolated from the sound stream for assessment of the cry. As a number of such isolated cry patterns are preferably analyzed the baby is likely to cry for prolonged periods, unless the parents or caregivers succeed to sue the baby, it is preferred to store at least 10, preferably at least 20 and in particular at least 30 cry isolated patterns of the length indicated above. Note that even with a sampling rate corresponding for example to CD-quality, only between 0.5 MB to 8 MB usually should be needed to implement a very useful memory.

As indicated above, the standalone box will have some sort of data processing possibility, for example a microcontroller, CPU, DSP and/or FPGA and memory to store instructions and/or configurations respectively for these devices. These instructions will preferably comprise inter alia instructions to effect at least the cry detection locally. This allows to select those data that relate to the cry, thus significantly reducing the amount of data that needs to be transmitted to a centralized server compared to a case where the entire assessment is effected only on a centralized server. Note that even a first stage assessment based on the sound intensity only for detecting particularly loud noises already results in a very significant reduction of data to be transmitted as each baby will have prolonged periods where the baby does not cry.

The processing power necessary for a local assessment can easily be estimated. In this respect, it should be noted that while the processing unit preferably should be able to effect a local cry detection, a full personalization up to a degree possible on a centralized server might neither be necessary nor possible on a local device given e.g. memory and processing constraints and constraints with respect to the frequency of updates. However, it will be understood that some personalization will be possible locally as well.

Therefore, a preferred processing unit typically will be arranged such that the automated baby cry assessment arrangement comprises a local assessment stage, the local assessment stage being adapted to assess baby cries in view of filter or assessment instruction data received from a centralized server arrangement and relating to a personalized assessment of baby cries.

It will be understood that accordingly, the local assessment need not be effective for each and every cry but could be restricted to cases where the centralized server is found to be inaccessible or accessible with a particularly low data transmission rate only. Such conditions can easily be determined by the I/O stage of a standalone box as described.

Local assessment stages could serve as auxiliary assessment stages having no personalization, but will typically be personalized as well, although to a lesser degree than possible on a server, the degree of personalization depending e.g. on the availability of filters and/or on the processing power available locally. However, given that in a typical application, only rather low-resolution audio data need to be analyzed and processed, the processing power typically locally available is sufficient, allowing even processing steps such as Fourier filtering, cross correlation and the like without undue strain on the processing device.

So, in case a sufficiently broadband connection is not available to upload data to a server, in the preferred embodiment a local assessment of the cry could be effected provided that suitable assessment stages are implemented on the device. By analyzing the sound data locally, parents need not have permanent Internet access, which might be advantageous when travelling or when the parents are irrationally concerned that WI-FI radiation might harm their baby. At any rate, in a preferred embodiment, it is possible and preferred to activate the wireless transmission only once a cry has been detected. This reduces battery consumption and is addressing the concerns of parents afraid of electromagnetic radiation sources close to the baby.

The standalone box will typically also comprise a timer. The timer could be a conventional clock, but it will be understood that at least a plurality of days typically needs to be counted so as to judge whether or not a personalized assessment is still valid, or to decide whether a previous personalization relating to an elevated temperature of the baby should still be considered valid in view of time that has passed since the elevated temperature event. Also, the time since the last personalization can be measured and a warning could be issued if the data typically is outdated, for example because a healthy baby should have an increased of weight by more than 10% under normal conditions since a last personalization data input.

Accordingly, the local standalone box may comprise a timer and an evaluation stage evaluating the current age of personal baby data information and/or an age and/or a validity of data received from the centralized server arrangement and/or relating to a personalized assessment of baby cries, prior to the assessment of the baby cry, and the baby cry assessment arrangement will be adapted to output a baby cry assessment depending on the evaluation.

A timer is also helpful to extrapolate personalization data. For example, the device is initialized at first use and then, the time since initialization at first use can be determined for each sound sample. While it is particularly preferred that at initialization, the age of the baby is entered, although this is not absolutely necessary as the cries could be assessed in a non-personalized manner until the parents had time to enter all information. Then, the age of the baby at the time of recording a specific sound sample can be determined and can be entered into the database. The age of the baby can be easily calculated later on based on this information. However, further information such as the size could be extrapolated. For example, if an initial size is entered together with the age and sex of the baby, it can be determined whether at this time, the baby was of average size or above or below a specific given percentile of same age, same sex peer group babies. It can be assumed that the baby remains in the percentile range for some time and an extrapolation of size can be effected.

The filter update can be offered as a service for which the user has to pay, for example via a subscription. Once a subscription runs out, the user could use the device either with a final filter, a general filter or as a simple baby phone not having any cry detection capabilities. As the subscription will be limited to a specific time, once the device is sold, which typically will be the case after the baby has grown quite a bit, the subscription period typically will have run out and a new subscription is to be paid for. Also, a reason that could be allowed or enabled, for example by transmitting a corresponding reset code.

Figure 2:
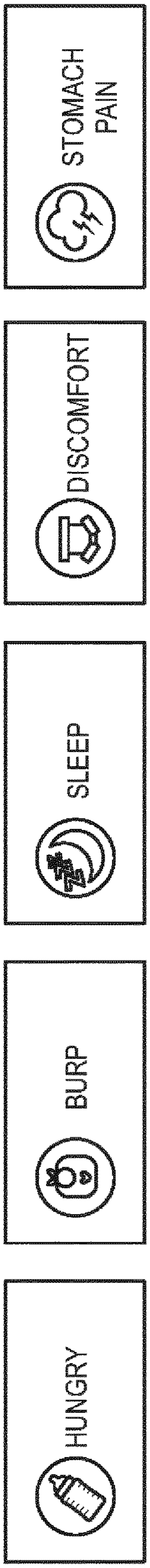

The device will also comprise an output means for outputting the result of a baby cry assessment. The output means could be a screen or LED lit symbols as shown in FIG. 2, which is particular helpful if no additional different reasons shall be indicated other than those for which LEDs are provided. The output means could additionally or alternatively be or include a speaker and/or an I/O for communication with a smart phone of a user so that an immediate assessment can be provided at a remote location e.g. on the screen of the smart phone where the parents or caregivers are located, in a different room away from the baby.

Using the device previously described, cries can be assessed in the following manner and to this end, data may be provided for an automatic personalized baby cry assessment using the following method which, as can be understood, will be a computer implemented method.

First, the local device is activated, that is switched on and placed in the vicinity of a baby cradle. Once the device has booted, a check is made whether a centralized server can be reached with sufficient bandwidth. Any data that needs to be uploaded to the centralized server, for example previously sampled cry data together with local assessments and/or feedback to previous assessments is uploaded to the centralized server. Then, communication with a remote station close to the parents, for example to a smart phone, is established by transmitting suitable data via the I/O communication interface. A check is made whether a current subscription for personalized assessment still is valid or should be renewed. Should the current subscription be not valid any longer, warning information is transmitted to the remote station. If the current subscription is still valid, sound sampling starts and a message is transmitted to the remote station indicating that the local device is now "listening to your baby".

Sound sampling is then effected such that the microphone is set in an active mode and a suitable amplification of the electric signal from the microphone is set such that the signal is well above the electronic noise floor of the device while not overloading a black during loud sound events. Furthermore, the electrical input signal is filtered with a 4 kHz cut off. The filtered and amplified electrical analog signal is then converted to a digital signal with a sample rate of 8 kHz and a dynamic resolution of 14 bits. This is done continuously and automatically as long as the local device remains activated.

The digital signal is subjected to an automated multistage cry-detection. In the embodiment discussed here, to detect cries, first, the samples in the digital audio stream are grouped into frames of 128 samples each, the frames thus having a length of 16 ms. The frames are written into a frame ring buffer storing in the embodiment described 1024 frames, cyclically storing the newest frames at the memory location where the current oldest frames have previously been stored. However, it should be noted that rather than using frames of 128 samples each, the number of samples in a frame might be different. While using frames having less than 128 samples allow for a more refined slicing or cutting off of irrelevant data, frames having more samples are more easily to handle by a low-power CPU. Note that 1024 frames of 128 samples obtained with an 8 khz sampling rate corresponds to 1024*128 samples*(1/8000) sec=16.38 sec. Accordingly, where 5 second windows in which cry patterns are searched for, it is possible to search for cry patterns or the onset of cries in 3 windows preceeding loud noises.

Then, as an initial step of cry assessment, for every frame, the root mean square of the digital values of the 128 samples is determined so as to provide an estimate of the current average frame sound level. The estimates of the current average frame sound level are stored as well. From the current average frame sound levels, a threshold value is determined that must be exceeded by a sound level of a new frame so as to fulfil a first criterion that a cry might have been detected. Note that the threshold value can be determined in an adaptive manner and need not be constant irrespective of the current average frame sound levels.

If it is detected that the average frame sound level does not exceed the average frame sound level of the preceding frame by an amount corresponding to the threshold value, it is determined that no cry is detected and the next frame is analysed.

It will be understood that the first cry detection stage could be implemented in a different manner, for example using the average of preceding average frame sound levels or the minimum of average frame sound levels in a preceding number of frames such as, for example the 4, 8 or 16 preceding frames. Here, the minimum should be selected because the minimum is a good estimate of how noisy the environment is at least. Accordingly, the cry detection first stage filters out sounds that are below and adaptive threshold in the preferred embodiment described here.

If it is detected that the average frame sound level of the new frame exceeds the average frame sound level of the preceding frame by an amount corresponding to at least a threshold value, the first criterion on that a cry might have been detected is fulfilled and the 1024 frames in the frame buffer are saved to another memory location. In one embodiment, the alleged cry related data will remain protected until it has been decided by additional cry detection stages that despite the fulfillment of the first criterion, no cry is present or otherwise, until the data can be selected as relating to a cry. This allows to later on consider sound data that at first glance seems to be irrelevant, although actually already including sound data relating to the onset of a cry. In another embodiment, the information relating to the alleged cry is subjected to cry pattern identification and isolation steps. For this, overlapping windows can be defined, for example windows of 5 seconds length and a 3 second stride. It is possible to effect the cry pattern analysis non-locally, that is on e.g. a centralized cloud server; in that case, the other memory location will be on the cloud server. In other cases, in particular where the processing power provided locally is sufficiently high, it would be possible to search for the cry patterns locally even without storing the stored frames in another memory location, given that if processing is fast enough, alleged cry patterns could be detected directly in previously stored 1023 frames. Then, only the cry patterns isolated would have to be transferred to a cloud server or further local processing stage. It will be understood that a cry pattern identification isolation can be affected by first defining windows having a multiple of the length of the cry patterns to be detected, by defining a spectrogram like representation of the windows defined and by searching for cry patterns in the spectrogram like representations using artificial intelligence techniques, in particular convolutional neural networks. It will be understood that for such search of cry patterns, it is not absolutely necessary to use models trained in a personalized manner as baby cry patterns will have very similar features for a large variety of babies. This is helpful in a local search for cry patterns as it is not absolutely necessary to search for cry patterns in a personalized manner. In the above text, it has already been stated that the cry patterns searched for should preferably have a minimum length; such minimum length of 0.25 seconds or 0.3 seconds or preferably 0.4 seconds are advantageous in that the distinction between a cry pattern and non-cry-periods is significantly more reliable for the longer patterns considered, even when no personalization of cry detection and cry isolation is implemented. In other words, by searching for longer cry patterns, personalization of cry detection becomes dispensable, in particular when object localization algorithms known per se are used for cry pattern detection in spectrogram-like representations of the sound data.

However, it is not absolutely necessary to implement a second stage of cry detection as a cry pattern detection and isolation—accordingly, a more rigorous analysis can be effected by means other than search for a cry pattern to determine whether or not the sudden increase of sound intensity as judged by the average frame sound level of the new frame exceeding the average frame sound level of the preceding frame by an amount corresponding to at least a threshold value actually is due to a baby cry or not. For such more rigorous analysis without cry pattern identification and isolation, it must be understood that the baby cries over a prolonged period, so that only sound data relating to a prolonged high sound intensity should be considered at all. Therefore, the subsequent frames exceeding a certain intensity, for example because the root mean square average frame intensity as defined above exceeds the current minimum noise by an adaptive threshold level, are copied into a cry detection frame buffer for further analysis. On the other hand, where a cry pattern detection and isolation is implemented using object localization methods in view of spectrogram like representations of the sound data, it is not absolutely necessary to only start such cry pattern detection and isolation only in case the sound level has exceeded the given threshold. It is possible to continuously execute a cry pattern detection and isolation method based on object localization in spectrogram-like representations. Thus, a decision whether or not a preceding check for particularly loud sound levels is implemented can be made e.g. in view of energy consumption, for example when operating a local device from the battery, or in view of available data bandwidth for uploading sound data to a centralized device such as a cloud server when implementing the cry pattern detection and isolation in the cloud.

If it is found that the number of subsequent frames that need to be copied into the cry detection frame buffer for further analysis is too low within a specific period, it can be safely assumed that the baby is not crying and the data stored in the buffer can be deleted. Otherwise, additional tests will be carried out. Accordingly, here, by counting the frames input into the buffer during a given period, a further cry detection stage is implemented. This is a preferred way of rejecting noises as alleged cries, although in some implementations, such additional rejection would not be used.

It is emphasized that since only those frames having a sufficiently high average sound level are copied into the buffer, the buffer will not represent a complete sequence of frames since one or more intermediate frames might have a lower average sound level and would thus be not copied into the cry detection frame buffer. It should be understood that this approach is different from the typical laboratory set up where sound without background noise is available for analysis and accordingly, no frames need to be left out in view of an estimated background environmental noise level. Note that in embodiments where cry patterns are identified and isolated as part of the cry detection itself, obviously, parts of the initially recorded sound streams are omitted as well.

However, in some embodiments and implementations, after the onset of a potential cry, no frames are omitted. In an implementation omitting no frames, cross correlation/sliding average techniques could easily be used. The advantage of deleting frames that have a low sound level is that the overall amount of data to be handled and analysed is lower; one of the advantages of not deleting frames is that higher precision/accuracies can be obtained, in particular where sliding/cross correlation techniques are used. In this context, it will be understood that it usually is helpful to analyze the complete sequence to assess the reason for a cry once it has been established that a cry is present in the sound data, so a complete sequence comprising all frames following a first frame meeting the first cry detection stage criterion should be stored anyway. Obviously, when identifying and isolating cry patterns from windows defined in the originally recorded sound stream, the complete sequence comprising all frames is also assessed; it is noted that identifying and isolating cry patterns as part of the cry detection yields particularly good results in the assessment of the cry.

It will also be understood that providing a separate buffer for the complete sequence is not necessary in case the cyclic buffer including all pre-cry data is sufficiently large; in that case, the complete sequence would simply be stored in the cyclic frame ring buffer.

It should also be emphasized that where the number of frames exceeding a given—and, where applicable, adaptive-threshold is not used to identify and reject short events, the buffer could still be closed, for example because a number of consecutive frames are identified as not relevant, for example because due to low sound levels. In that case, obviously, the buffer would not be completely filled.

In order to establish whether the particularly loud frames constitute part of the baby cry, a neural network filter trained with baby cries that previously have been identified is then used. Note that this neural network filter would be different from the neural network filter used in the assessment (or "translation") of the cry. As explained above, one way of using a neural network filter is to define spectrogram like representations of a plurality of frames and to then search for cry patterns in this representations. Accordingly, for the cry detection neural network filter, it is neither important why the baby is crying nor is a personalization absolutely necessary for increasing the accuracy of cry detection, although it will be understood that under certain circumstances, the sound energy and certain frequency ranges of the spectrogram might give important clues that differ both from baby to baby and from environment to environment. Still, given that personalizing cry detection and/or cry assessment is rather computing intensive if artificial intelligence techniques such as convolutional neural networks are used, it is considered advantageous to restrict any personalization to the minimum necessary to still obtain favorable results.

For example, in certain environments, frequency bands in which babies cry particularly loud might also experience a stronger background noise, rendering them less suitable for cry detection. Unfortunately, the background noise pattern might change even faster than the personalized cry assessment of the baby, for example because the location where the baby is monitored changes often, background noise changes because windows are opened or closed depending on the weather condition and so forth. Accordingly, in the most preferred embodiment, the cry detection itself is not personalized. Nonetheless, in practical implementations, cry detection having an accuracy of better than 99% of the field can easily be achieved using appropriately trained neural network filters as a stage following sound level evaluations. It is also noted that one advantage of spectrogram like representations of sound windows comprising a leached cry sounds is the robustness against noise; in other words, despite noise, cry patterns will be identified very reliably in the representation of the windows using such techniques.

However, in some cases it might be preferred not to isolate cry patterns found in a spectrogram like representation; in such a case, for cry detection using neural network filters, either the original complete sound data, for example each frame in the buffer, can be directly input into a suitable neural network filter or parameters. Above, a plurality of parameters that can be extracted from cry data have been disclosed. Similar parameters could be determined for cry detection, for example average alleged cry energy of frames within alleged cry buffer, sliding average of alleged cry energy over a specific number of consecutive and/or frames in particular in 2, 4, 8, 16 or 32 frames in buffer, and/or over a specific time such as one second, two seconds, five seconds, 10 seconds, 15 seconds, 30 seconds; alleged cry duration variance of frames within buffer; alleged cry energy variance in particular over 2, 4, 8, 16 or 32 frames 2, 4, 8, 16 or 32 frames, and/or over a specific time such as one second, two seconds, five seconds, 10 seconds, 15 seconds, 30 seconds and so forth;

- current pitch frequency; pitch frequency averaged over 2, 4, 8, 16 or 32 frames 2, 4, 8, 16 or 32 frames, and/or over a specific time such as one second, two seconds, five seconds, 10 seconds, 15 seconds, 30 seconds; maximum of pitch frequency during alleged cry event and/or during 2, 4, 8, 16 or 32 frames 2, 4, 8, 16 or 32 frames of alleged cry data in buffer, and/or during a specific time such as one second, two seconds, five seconds, 10 seconds, 15 seconds, 30 seconds;
- change of sliding maximum pitch frequency during alleged cry event during alleged cry event and/or during 2, 4, 8, 16 or 32 frames 2, 4, 8, 16 or 32 frames of alleged cry data, and/or during a specific time such as one second, two seconds, five seconds, 10 seconds, 15 seconds, 30 seconds;
- minimum of pitch frequency during alleged cry event according to the frames buffered and/or during 2, 4, 8, 16 or 32 frames 2, 4, 8, 16 or 32 frames of alleged cry data, and/or during a specific time such as one second, two seconds, five seconds, 10 seconds, 15 seconds, 30 seconds; change of sliding minimum pitch frequency during alleged cry event and/or during 2, 4, 8, 16 or 32 frames 2, 4, 8, 16 or 32 frames of alleged cry data, and/or during a specific time such as one second, two seconds, five seconds, 10 seconds, 15 seconds, 30 seconds;
- dynamic range of pitch frequencies during alleged cry event and/or during 2, 4, 8, 16 or 32 frames 2, 4, 8, 16 or 32 frames of alleged cry data, and/or during a specific time such as one second, two seconds, five seconds, 10 seconds, 15 seconds, 30 seconds; pitch average rate of change of frequency during alleged cry event and/or during 2, 4, 8, 16 or 32 frames 2, 4, 8, 16 or 32 frames of alleged cry data, and/or during a specific time such as one second, two seconds, five seconds, 10 seconds, 15 seconds, 30 seconds;
- also, assuming the frames would represent cry data, formant related parameters could be determined such as first formant frequency in alleged cry event or in 2, 4, 8, 16 or 32 frames 2, 4, 8, 16 or 32 frames of alleged cry data, and/or during a specific time such as one second, two seconds, five seconds, 10 seconds, 15 seconds, 30 seconds;
- average rate of change of first formant frequency averaged over 2, 4, 8, 16 or 32 frames 2, 4, 8, 16 or 32 frames of alleged cry data, and/or during a specific time such as one second, two seconds, five seconds, 10 seconds, 15 seconds, 30 seconds;
- sliding average rate of change of first formant frequency sliding an average over 2, 4, 8, 16 or 32 frames 2, 4, 8, 16 or 32 frames of alleged cry data, and/or during a specific time such as one second, two seconds, five seconds, 10 seconds, 15 seconds, 30 seconds;
- mean value of first formant frequency, averaging over 2, 4, 8, 16 or 32 frames of alleged cry data, and/or during a specific time such as one second, two seconds, five seconds, 10 seconds, 15 seconds, 30 seconds;
- maximum value of first formant frequency in 2, 4, 8, 16 or 32 frames of alleged cry data, and/or in a specific time such as one second, two seconds, five seconds, 10 seconds, 15 seconds, 30 seconds; minimum value of first formant frequency in 2, 4, 8, 16 or 32 frames of alleged cry data, and/or during a specific time such as one second, two seconds, five seconds, 10 seconds, 15 seconds, 30 seconds;
- first resonance Peak frequency dynamic range during alleged cry event and/or during 2, 4, 8, 16 or 32 frames of alleged cry data, and/or during a specific time such as one second, two seconds, five seconds, 10 seconds, 15 seconds, 30 seconds;
- second formant frequency during alleged cry event and/or during 2, 4, 8, 16 or 32 frames of alleged cry data, and/or during a specific time such as one second, two seconds, five seconds, 10 seconds, 15 seconds, 30 seconds;
- second formant frequency average rate of change during alleged cry event and/or during 2, 4, 8, 16 or 32 frames of alleged cry data, and/or during a specific time such as one second, two seconds, five seconds, 10 seconds, 15 seconds, 30 seconds;
- second formant frequency average during alleged cry event and/or during 2, 4, 8, 16 or 32 frames of alleged cry data, and/or during a specific time such as one second, two seconds, five seconds, 10 seconds, 15 seconds, 30 seconds;
- second formant frequency maximum during alleged cry event and/or during 2, 4, 8, 16 or 32 frames of alleged cry data, and/or during a specific time such as one second, two seconds, five seconds, 10 seconds, 15 seconds, 30 seconds;
- second formant frequency minimum during alleged cry event and/or during 2, 4, 8, 16 or 32 frames of alleged cry data, and/or during a specific time such as one second, two seconds, five seconds, 10 seconds, 15 seconds, 30 seconds;

second resonance during alleged cry event and/or during 2, 4, 8, 16 or 32 frames of alleged cry data, and/or during a specific time such as one second, two seconds, five seconds, 10 seconds, 15 seconds, 30 seconds;

peak frequency dynamic range during alleged cry event and/or during 2, 4, 8, 16 or 32 frames of alleged cry data, and/or during a specific time such as one second, two seconds, five seconds, 10 seconds, 15 seconds, 30 seconds; also, again assuming that a baby actually is crying, it is possible to determine a Mel frequency cepstrum parameter, the parameter being determined for the entire alleged cry event and/or during 2, 4, 8, 16 or 32 frames of alleged cry data, and/or during a specific time such as one second, two seconds, five seconds, 10 seconds, 15 seconds, 30 seconds;

and/or an inverted Mel frequency cepstrum parameter.

While it is possible to use such parameters for cry detection, it will easily be understood that given the large variance described above with respect to the background, frequently, accuracy will not be improved by using more refined and computationally more intensive parameters. Accordingly, a decision whether or not the baby currently is crying can be based on parameters selected such that the computational effort remains low, while still providing a high accuracy of cry detection. This in turn allows to effect the cry detection locally even if a multistage cry detection is used with at least one stage using neural network filter techniques.

Accordingly, from the above, it can be seen that as a step in the cry detection stage, the content of the buffer is analysed further. Usually, a plurality of n frames will be stored in the buffer and an output signal is generated indicating whether or not the frames in the buffer relate to a baby cry; as an alternative, it is possible to first identify and isolate the cry patterns and to then store these cry patterns for further assessment of the reason why the baby cries and/or transmit them to a centralized server and/or process them immediately.

In a most typical implementation relying on evaluation of parameters rather than on cry pattern identification isolation, the judgment whether or not frames in the buffer relate to a baby cry is made indicating a probability that the sound data relates to the cry and/or also to a degree of the reliability of the judgment. Such determination could be made frame by frame in the buffer, but handling is significantly easier if the determination is made in a buffer-wise manner. In this respect, a plurality of buffers could be analysed one after the other, for example because a first buffer has been filled completely and/or because a previous buffer has been closed since the temporal distance between two frames exceeding a threshold became too large. Once a number of buffers has been analyzed, a final output can be determined, the final output therefore being a function of the results calculated for each single bar for each single frame. This could be done by averaging probabilities that a respective buffer relates to the cry with equal weights, or could be done by probabilities that a respective buffer relates to the cry in a manner taking into account the reliability of each probability. In a preferred embodiment, the number of buffers that are analyzed during cry detection is set to 2 or 3. In a preferred implementation it is requested that to judge that a cry is detected, the probability of the sound data in at least one buffer should exceed 75% and it is also requested that the (linear) average of probabilities for N=3 buffers is larger than 50%. If all criteria are met, the sound data is judged to belong to a baby cry. However, if the criteria are not met, the corresponding analysis is repeated for the subsequent buffers until for a prolonged time, no frames have been detected that must be considered candidates of a cry in view of the initial first threshold criteria. In other words, should the output of the last stage of cry detection analyse be negative for buffers (n, n+1, n+2), then the analysis is repeated for buffers (n+1, n+2, n+3) as long as some frames indicate particularly loud sounds.

It will be understood that if no cry is detected in the final stage, the data in the cry detection frame buffer will be flushed, unless it is decided that the background sound data in one or more cry detection frame buffers should be uploaded to the server for training cry detection neural network filters and/or for identifying typical or critical background patterns.

Such a decision to upload non-cry sound data to a server could be random or buffered non-cry sound data is marked for uploading because the average probability is very close to the probability judged to refer to a cry or because the average probability is extremely low. It will be understood in this context that the purpose of uploading non-cry sound data to the server on a regular basis is to identify novelties in the background behavior pattern and to improve the neural network cry detection filter. It will be understood that even though non-cry data is to be uploaded, data protection regulations can be observed. In particular, it would be possible to allow upload only after a person owning the local device has agreed to upload the specific non-cry pattern. Also, a speech detection could be effected so as to prevent uploading sound data relating to speech; also, it would be possible to upload non-cry-sound without reference to a specific device.

Above, it has been stated that if no cry is detected in the final stage, the data in the cry detection frame buffer will be flushed. In a similar approach, it would be possible to discard cry patterns even if positively identified with a very high likelihood of being related a cry in case the number of cry patterns in a given period is too low, that is if the baby has been crying only for an extremely brief period such as 5 or 6 seconds. This would be particularly the case where the final assessment relies on the assessment of a larger number of cry patterns, for example 5 to 10 cry patterns.

Otherwise, that is when it is determined that a cry is detected, first of all, the parents or caregivers are informed by sending a corresponding message to the remote station. This is helpful as the parents or caregivers will need some time to reach the local station and an assessment of the reason why the baby cries can often be carried out during that time. In addition to or as the message that the baby cries, the sound data of the cry preferably including the pre-onset sound data stored in the cyclical buffer could be transmitted for audio reproduction to the remote station. It should be understood that transmitting pre-cry sounds may help in getting the attention of the parent since the sound reproduced at the remote station resembles more closely what a caregiver would hear while being close to the baby. Furthermore, it may help to acoustically evaluate the surroundings of the baby at the time it started crying, which in turn might be helpful where the crying was induced by external influences such as siblings or pets entering the room. However, it will be understood that some embodiments will not require to inform the parents or caregivers that the baby is crying, because of the parents and caregivers will remain within earshot of the baby anyhow, even if they are in a different room.

Then, after sending the message to the remote station, a decision is made whether the cry can be assessed by a centralized server or whether the assessment needs to be done locally. To this end, a data transmission file is prepared comprising all relevant frames of the sound data stream of the cry and/or all cry patterns up to the preparation of the file. In an embodiment not relying on local cry pattern identification and isolation, this file may include not only those frames that have exceeded the given threshold after the first frame exceeded the threshold (and hence will include more frames than buffered for mere cry detection), but will include the complete sequence of frames recorded since the first frame has exceeded the threshold. Furthermore, the file will include those frames from the cyclical pre-cry frame buffer that have been locked after the detection of a first exceedingly high sound level. In an embodiment where a local cry pattern identification and isolation is effected, only the isolated cry patterns will be transmitted; in an embodiment wherein only a first cry identification stage such as a threshold comparison is effected, but a cry pattern identification isolation is effected on a centralized device, the file uploaded to the centralized device will preferably comprise the entire contents of the ring buffer. Then, personalized baby data is added into the file such as weight, sex, age, medical preconditions and so forth. This can be done in a coded manner, for example by inclusion of an ID previously assigned. In this case, corresponding information stored in a centralized database on a centralized server could be retrieved corresponding to the specific ID assigned to the device. This is preferable as data considered by many users to be confidential will have to be transmitted less often, so that confidentiality issues are avoided. In a preferred embodiment, the device will negotiate with the server to obtain a permission to upload data using a token system. Negotiating with the server to obtain the permission to upload data will reduce the load from incoming unwanted data on the server. Furthermore, it is possible to store incoming data from a specific user in a predetermined location uniquely assigned to the specific user, thus increasing confidentiality. It will be understood that where the overall data rate transmitted to a server is of no concern, it would not even be necessary to effect a first local simple assessment such as by using a comparator.

It will be understood that the exact content of the data file and/or the exact structure of the data file may vary. Also, it would be possible—although less preferred—to omit pre-cry data—or cry patterns that could be identified in a sound representation even if the baby is not yet particularly loud-and, where bandwidth is a particular problem, voids could be left in the sequence of frames, leaving out for example those frames that are very close to the minimum background level determined before the onset of the cry. However, obviously, this is significantly less preferred as the results typically obtained in such manner are not as accurate. In particular, the possibility of using cross-correlation techniques might be impaired. It should also be emphasized that for an ongoing cry, after a first number of frames has been transmitted to the server, so that an assessment can begin, additional data may be collected and transferred to the server to improve the assessment of the ongoing cry.

A preferred way of cry translation—or cry assessment—will now be described; it will be understood that a plurality of different ways to assess the baby cry exist. It will also be understood that the method of providing data for assessment the present application suggests will be helpful for all or at least a very large variety of such different ways to assess the baby cries. Nonetheless, by describing the typical implementation of cry assessment, it will become more obvious how the method of providing data for assessment is implemented best.

To understand cry translation, it should be understood that the cries of babies show features clearly distinct for a current specific need of the baby. This can be seen for example in the 3D spectrograms shown in FIG. 3*a-e*, clearly showing that the difference between spectrograms of cries recorded while one and the same baby had different needs. What can be clearly seen in FIG. 3 is that the 3D spectrograms clearly differ. Note that a spectrogram shows and a three-dimensional plot the energy content (z-Axis) over time for a plurality of different frequencies (x axis and y axis respectively). Basically, the same information is given in FIGS. 4*a* and 4*b* for different cries.

The patterns shown are typical for the respective reasons, so that the significant differences in the cries in principle allow to distinguish the cries from one another or to assess the reason why the baby cries in view of the sound, cmp. FIG. 4*a*-4*f*. It will however be understood that the patterns do look different not only for different cries from one and the same baby, but also for different babies crying for the same reason, the differences depending inter alia on age, weight, size of the baby and so forth. Nonetheless, significant differences between different sort of cries can still be identified, in particular when isolating specific parameters from the cries and/or using machine learning algorithm, cmp. FIG. 4*a-f*.

Then, it should be understood that frequently, there is no single cause for a baby crying; for example, the baby might be both tired and might be needing to burp; the baby could be hungry and be need to be called comforted and so forth. This will reflect in the cries and correspondingly the respective cry patterns; accordingly, any given cry pattern might simultaneously reflect a plurality of patterns where the baby is crying and a proper assessment preferably takes that into account.

For a first way of identifying differences between different cry patterns in an automatic manner, it may be helpful to describe each cry using adequate parameters or to feed specific parameters obtained from the cries into a model. Using adequate parameters, it is possible to define groups (or "clouds") of cries with each cloud comprising cries for different reason. This is shown in FIG. 5*a-e* and FIG. 6. Note that the pattern shown in FIG. 5 is from a raw data set of cries augmented by an unsupervised deep learning technique referred to as Self Organizing Maps. In FIG. 6, each cry is represented by a dot in a multidimensional parameter space. The different types of dots represent different reasons why a baby cries and FIG. 6 clearly indicates that it is possible to group the different types of dots and thus the different types of reasons why a baby cries. Even where the actual cry assessment is based on cry patterns identified and isolated in the original sound datastream, learning about novelties and/or grouping of peer groups might rely on self organizing maps based on specific parameters. Then, once such peer groups are established, cry patterns previously obtained for each peer group could be used to train respective models personalized for each peer group. In another way of improving personalization, it is possible to determine for each cry pattern the probabilities that this cry pattern relates to each of a plurality of different classes of reasons; from the sequence of cry patterns, the overall assessment why the baby cries could then be provided in view of the sequence of probabilities for each of the different classes. A simplification of personalization with very good results is to only personalize the assessment of this sequence of probabilities.

In this manner, the computing intensive personalization can be reduced to a minimum while still giving excellent personalized results. It will be understood that this simplifies personalization because the assignment of probabilities to each cry pattern may be effected in a non-personalized manner.

The purpose of a cry translation or "cry assessment" is to classify the sound data that have been identified as belonging to a baby cry into one of a plurality of different classes. In FIG. 3, cries for 5 different reasons why the baby cries are shown, namely "hungry, uncomfortable, need to burp, feeling pain and being sleepy". It would be possible to use these 5 different reasons as classes into which each baby cry is classified. However, these classes while very helpful for young parents and easily to distinguish, should not be construed to be limiting the possibilities of cry assessment. Rather, less classes could be implemented, combining for example "uncomfortable" and "pain" or more classes could be used, such as classes describing breathing patterns for example relating to "cough", "hiccup", "sneeze". Also, it would be possible to use additional classes that were not related to a cry at all, for example "silence" or "undefined"; using such additional classes that do intentionally not related to cries help to filter our potential for positive as even with a good cry detection stage, sound data falsely identify as cries might be transferred to the cry assessment stage. Providing one or more non-cry classes in the filter helps to reduce the number of false positives.

It will be understood that this is a situation often found in data mining and in data analysis and that accordingly, artificial intelligence techniques and in particular neural network techniques, such as CNN (convolutional neural network)-techniques, are applicable to distinguish different cries if suitable training data can be provided and adequate parameters can be found.

Accordingly, some data must be provided either to a local or a centralized cry assessment stage. In both cases, similar techniques can be used, for example artificial intelligence/neural network filtering techniques. Also, in both cases, it is possible to assess the sound data in a personalized manner, although it will be understood that the degree of personalization and/or the computational effort that can be afforded might be different for the local and the centralized cases respectively. In particular, in a centralized case, frequently, the processing power available might be larger, in some cases significantly larger than in a case of local assessment in a local device. Therefore, the number of parameters used in the assessment as input into neural network filters might be larger, because computing parameters as those listed above require at least some computational effort.

Then, the neural network filters used in a centralized power for server arrangement might be more complex than those filters that can be implemented locally on a local station having a lower processing power. It will also be understood that the filter coefficients for a local assessment will be determined in a most typical case on a centralized server and transferred from the centralized server to the local device (note that in reference to a centralized server is made as this server can be used by a large number of users having sound data transferred from their local devices to the server; this does not exclude the possibility that the "server" is distributed spatially as is the case with a "cloud server"). Where centralized server is used, the update/personalization of the filters can be better, because typically, personalized filters will be determined more often on the server then downloaded to the local device and also, in some instances, only a partial personalization as possible on a local device. For example, cries may change when a baby has a fever or has a fever with an elevated temperature in a specific range. As a fever may occur frequently and spontaneously, corresponding sets of filter coefficients would have to be stored locally on the local device each time the personalized filter coefficients are updated. As similar conditions such as fever might need to be taken into account, the memory size required for storing a large variety of different filter coefficients would be very large, and also, the amount of data that would have to be transferred from the server to the local device to update filter coefficient for each different condition that could be distinguished on the server would often be too large. Therefore, the local assessment frequently is bound to be less precise than a centralized assessment in view of technical difficulties.

Nonetheless, even for a local sound assessment, sound data must be provided to the assessment stage and depending on whether or not the sound data is assessed locally, —the assessment can be considered to be personalized when done locally, given that specific filters for the particular baby have been downloaded or obtained via a push service: for uploading, the sound data can be combined with an ID if the personalized data relating to the baby relating to the ID has been stored before on the server; also, the complete personal information can be transmitted; it will be understood that the decision whether a frequent transmission of personal information or the transmission of an ID which relates to personal information stored on the server is used can be made in view of data protection regulations taking into account the wish to preserve privacy in the best manner possible.

Despite difficulties such as the computing power available that may have an influence on the exact way sound data is assessed in a sound assessment stage, it will be considered sufficient in the present case to describe what can be done if sufficient computing power is available, for example after uploading sound data to a centralized server. From this, it can easily be deduced as well how a local assessment could be affected. For example, where cross correlation techniques are too computing intensive, it would be possible to determine an assessment not by calculating the best correspondence when shifting the input signal in a sample-wise manner, but to only consider the results obtained when shifting the input signal in a frame wise manner or when shifting the input signal and over 2 frames, thus reducing the computational load by a factor of 2.

For one embodiment, it will also be assumed hereinafter that the number of frames initially transferred to a centralized server suffice to implement and execute cross correlation steps and that once the cry data initially transferred in multiple pieces have been assessed, the parents have reached the local device and can confirm any assessment initially made. Note that the confirmation of any assessment need not be immediate; on the one hand, often parents will feel confident to confirm or reject an assessment only once the baby has stopped crying in response to actions taken by the parents. Also, even where the assessment is immediately considered to be correct, parents should attend the baby before evaluating the assessment. Therefore, any assessment could in principle also be made later on, using for example a smart phone running a suitable app. Nonetheless, in one embodiment, parents might have the possibility to immediately input an assessment or feedback into the device and where in this embodiment the parents have not yet judged the assessment, additional data can be uploaded and the cry assessment can be effected as if a larger file has been transmitted initially. The only difference to the case where data is transmitted repeatedly rather than in a larger file is that using the first part of the data, a first assessment could be made and transmitted. Then, if more and more data are received, the assessment could be corrected or confirmed; where the initial assessment is not changed by analysis of more and more data and hence is confirmed, the user might not even know that additional data are assessed, in particular not unless the probability that the assessment is correct is indicated; it can be expected that by providing more data, the probability that the assessment is correct would increase. Where the assessment changes over time, it would be possible to explicitly advise the user that the assessment has changed so that the user does not consider an initial assessment the user might have noted to be a glitch. It will be understood that transferring data to the cry assessment stage may continue until a user has confirmed the cry assessment and/or until the baby has stopped crying. Nonetheless, in view of what has been said above, in the present application, it will be sufficient to describe the case where the assessment is effected in view of only the first file transferred to a centralized server.

From the above, it will be understood that it is both possible and useful to analyse a long sequence of frames. Above, reference had been made to the first comprising for example 1024 frames. A plurality of such buffers could be packed into one single file that is then analysed to determine the reason why the baby cries. It should be understood that while it is useful to detect as soon as possible that the baby is crying, as a corresponding information should be communicated to the parent or caregiver as soon as possible, the assessment may take some more time in view of the reaction time needed by the parent or caregiver anyhow. Therefore, using a larger number of frames for cry assessment usually does not constitute a significant problem. Accordingly, where the cry detection is preferred to work based on no more than 3 buffers, cry assessment could be effected on a significant early larger number of buffers such as 5, 6, 7, 8, or 16 buffers (with each buffer holding e.g. 1024 frames). Nonetheless, it is preferred if a first assessment is made available to the user within the last than 15, preferably no more than 10 seconds after cry detection. Otherwise, the user might consider the local device to be unresponsive.

From the above, it will also be understood that it is preferred to use a larger number of buffers for the cry detection and that the local device should preferably have sufficient memory to store at least 16 buffers, preferably more in case detective cries cannot be analyzed on the central server must be stored for later load on the local device.

Once sufficient data has been collected for assessment in the cry assessment stage and uploaded to the centralized server, pre-processing can begin. During pre-processing, a set of filter parameters corresponding to the personalizing information is determined, for example by reference to a filter per parameter set database, and a neural network filter is configured according to this set of filter parameters.

Then, either the sound data itself is fed into a personalized neural network filter, for example in a frame-wise manner, or parameters describing the sound data are determined and the determined parameters describing the sound data are entered into the personalized neural network filter.

As indicated above, parameters that might describe the sound data can be inputted into a neural network filters might comprise average cry energy during current cry event, sliding average of cry energy over a specific number of consecutive and/or frames in particular in 2, 4, 8, 16 or 32 frames, and/or over a specific time such as one second, two seconds, five seconds, 10 seconds, 15 seconds, 30 seconds; cry duration variance between breaks during one event; cry energy variance in particular over 2, 4, 8, 16 or 32 frames 2, 4, 8, 16 or 32 frames, and/or over a specific time such as one second, two seconds, five seconds, 10 seconds, 15 seconds, 30 seconds; current pitch frequency; pitch frequency averaged over 2, 4, 8, 16 or 32 frames 2, 4, 8, 16 or 32 frames, and/or over a specific time such as one second, two seconds, five seconds, 10 seconds, 15 seconds, 30 seconds; maximum of pitch frequency during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds; change of sliding maximum pitch frequency during cry event during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds; minimum of pitch frequency during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds; change of sliding minimum pitch frequency during cry event during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds; dynamic range of pitch frequencies during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds; pitch average rate of change of frequency during cry event and/or during 2, 4, 8, 16 or 32 frames 2, 4, 8, 16 or 32 frames of cry data, and/or during a specific time such as one second, two seconds, five seconds, 10 seconds, 15 seconds, 30 seconds; first formant frequency in cry event or in 2, 4, 8, 16 or 32 frames 2, 4, 8, 16 or 32 frames of cry data, and/or during a specific time such as one second, two seconds, five seconds, 10 seconds, 15 seconds, 30 seconds; average rate of change of first formant frequency averaged over 2, 4, 8, 16 or 32 frames 2, 4, 8, 16 or 32 frames of cry data, and/or during a specific time such as one second, two seconds, five seconds, 10 seconds, 15 seconds, 30 seconds; sliding average rate of change of first formant frequency sliding an average over 2, 4, 8, 16 or 32 frames 2, 4, 8, 16 or 32 frames of cry data, and/or during a specific time such as one second, two seconds, five seconds, 10 seconds, 15 seconds, 30 seconds; mean value of first formant frequency, averaging over 2, 4, 8, 16 or 32 frames of cry data, and/or during a specific time such as one second, two seconds, five seconds, 10 seconds, 15 seconds, 30 seconds; maximum value of first formant frequency in 2, 4, 8, 16 or 32 frames of cry data, and/or in a specific time such as one second, two seconds, five seconds, 10 seconds, 15 seconds, 30 seconds; minimum value of first formant frequency in 2, 4, 8, 16 or 32 frames of cry data, and/or during a specific time such as one second, two seconds, five seconds, 10 seconds, 15 seconds, 30 seconds; first resonance Peak frequency dynamic range during cry event and/or during 2, 4, 8, 16 or 32 frames of cry data, and/or during a specific time such as one second, two seconds, five seconds, 10 seconds, 15 seconds, 30 seconds; second formant frequency during cry event and/or during 2, 4, 8, 16 or 32 frames of cry data, and/or during a specific time such as one second, two seconds, five seconds, 10 seconds, 15 seconds, 30 seconds; second formant frequency average rate of change during cry event and/or during 2, 4, 8, 16 or 32 frames of cry data, and/or during a specific time such as one second, two seconds, five seconds, 10 seconds, 15 seconds, 30 seconds;

second formant frequency average during cry event and/or during 2, 4, 8, 16 or 32 frames of cry data, and/or during a specific time such as one second, two seconds, five seconds, 10 seconds, 15 seconds, 30 seconds; second formant frequency maximum during cry event and/or during 2, 4, 8, 16 or 32 frames of cry data, and/or during a specific time such as one second, two seconds, five seconds, 10 seconds, 15 seconds, 30 seconds; second formant frequency minimum during cry event and/or during 2, 4, 8, 16 or 32 frames of cry data, and/or during a specific time such as one second, two seconds, five seconds, 10 seconds, 15 seconds, 30 seconds; second resonance during cry event and/or during 2, 4, 8, 16 or 32 frames of cry data, and/or during a specific time such as one second, two seconds, five seconds, 10 seconds, 15 seconds, 30 seconds; peak frequency dynamic range during cry event and/or during 2, 4, 8, 16 or 32 frames of cry data, and/or during a specific time such as one second, two seconds, five seconds, 10 seconds, 15 seconds, 30 seconds; Mel frequency cepstrum parameter, the parameter being determined for the entire cry event and/or during 2, 4, 8, 16 or 32 frames of cry data, and/or during a specific time such as one second, two seconds, five seconds, 10 seconds, 15 seconds, 30 seconds; and/or the inverted Mel frequency cepstrum parameter.

As indicated above, where reference in the list of parameters has been made to specific times, reference could also be had to any other fixed period up to the respective times explicitly mentioned. Also, the reader is reminded that explanations why certain lengths are advantageous have been indicated above.

It has also been emphasized above repeatedly that advantages may be obtained if the pattern represented by the sound data is compared to the patterns typical for the different reasons and represented by the neural network filter is analyzed in a cross-correlation manner, that is by considering different potential onsets of the cry; considering different potential onsets of the cry can easily be done where sliding average is or other sliding parameters are determined frame by frame or sample by sample and very corresponding sequence of parameters is used as input into the neural network filter respectively. It will however be understood that such technique is computationally more intensive.

In another embodiment, where cry patterns have been isolated in a cry detection stage and/or the times cry patterns occur have been determined, rather than calculating specific parameters for frames relating to such times, spectrogram like representations of the sound recorded during the times in which cry patterns are observed can be prepared; it is noted where it is possible to use the same temporal and frequency resolution for cry pattern identification and isolation, there is no need to prepare additional spectrogram-like representations as the cry pattern isolated before can be used. The spectrogram like representations can then be fed into a convolution neural network that outputs likelihoods for each cry pattern fed into it to belong to any of the predefined classes. In a particularly precise although computationally more intensive embodiment, the respective convolution neural network filter parameters will be personalized, that is a different set of filter parameters for each peer group defined is used. In other implementations, it would be possible to use the same side of filter parameters for all peer groups, to determine a probability for each cry pattern isolated to belong to each of the different reasons why a baby should cry and to then evaluate the combined reasons obtained from each cry pattern in a personalized manner. It should be understood that by personalizing only one or a few final layer(s), the computational effort to train models and the number of parameters used in the assessment and having to be stored can both be reduced.

For the sake of clarity, it is emphasized that while a neural network filter can be used in a final stage of the cry detection and while neural network filter implementations can also be used for cry assessment, the neural network filter that is used in the final stage of cry detection will be different from the filter used in the cry assessment as will be the overall input into the respective neural network filters for cry detection and cry assessment respectively. The filter used for cry translation is likely to be more complex, using for example more layers in a convolutional neural network and/or more inputs, e.g. using a higher resolution and/or having additional inputs for the personal parameters and/or more layers.

It should be understood that it is not even absolutely necessary to assess a cry once a cry has been detected. Informing parents that the baby is crying sometimes is sufficient if the parents are confident that the reason why the baby cries is understood without any help from an electronic device. Therefore, in such cases there would be no need to translate the cry, thus saving for example energy. Accordingly, in some embodiments, it would even be possible to trigger the automatic cry assessment only in case the parents explicitly need support. In yet another arrangement, it would be possible to not allow for a cry translation at all and to only use the cry detection so as to improve the response of a baby surveillance monitor. In such an arrangement, transmission could only be reflected in respond to the detection of the cry and/or sound could be transmitted in a manner resulting in specifically loud sounds at the receiver, for example by changing the gain of the digital signal in response to the detection of a cry.

In the cry assessment stage, a probability that the sound data input into the neural network filter belongs to one of a number of predefined classes such as "hungry", "sleepy", "need to burp" and so forth is determined and accordingly, a number of probabilities is obtained, giving an n-tuple of probabilities, with the components of the n-tuple representing the probability that the baby was crying due to the reason related to the respective class. Proceeding from frame to frame or buffer to buffer, the components of the n-tuple obtained each time will vary. Therefore, from the sequence of n-tuples, an overall assessment must be calculated.

A variety of possibilities exist to determine the overall assessment. For example, an average of each component of the N-tuple could be calculated and the component having the largest average and thus the overall highest probability is selected as assessment. This average could be a linear average, a root mean square average or the like. In a preferred a simple embodiment, a linear average is calculated. Also, taking into account that cross-correlation techniques might lead to very high probabilities for very good matches, the maxima for each component over all and-tuple could be compared; as due to sampling and noise, the pattern matching achievable with cross-correlation techniques might not be perfect, it might even be preferred to consider the maximum of a sliding average averaging each component of e.g. 2, 3, 4 or 5 consecutive n-tuples. It would be possible to completely exclude some components from consideration, if the maximum for a given component does not exceed a specific threshold for all frames considered; in this way, components that never give a convincing match will not lead to a false assessment.

Another possibility would be to build up an N×M matrix out of M consecutive N-tupels obtained for M consecutive frames and to then feed this M across M matrix into a further neural network filter for final assessment (or to use a similar technique by implementing a corresponding layer of a convolutional-neural network. It should be understood that while some references had to neural network filters, the details of such filters will not be explained herein as a large variety of data processing techniques and in particular of implementing neural network filters, in particular with respect to the number and size of filter layers can be devised. In general, it will of course be understood that on a local device, fewer layers and/or less complex layers typically will be implemented.

In a particularly preferred embodiment, the cry detection comprises (an optional) very simple (optionally: first stage) detecting only that the sound level recorded is exceeding a threshold; a (second) stage of the cry detection comprising identifying and isolating (alleged) cry patterns in overlapping temporal windows that completely cover the sound stream (or optionally the time both immediately prior and following the excessive sound level), the cry patterns being identified by searching in a spectrogram like representation of the temporal windows for patterns known to correspond to baby cries; subjecting cry patterns identified and isolated identified to a pattern classification establishing probabilities for reason why the baby cries in view of the cry patterns, in particular in view of spectrogram-like representations of the isolated cry patterns, and thereafter identifying the specific reason why a baby cries in view of the probabilities obtained for a sequence of isolated cry patterns, with at least one of the steps of pattern classification and/or identifying the specific reason why baby cries in view of the probabilities being executed by an assessment personalized according to personal baby data, personalizing in particular the step of identifying the specific reason why baby cries in view of the probabilities obtained for each cry pattern.

Whatever the final decision how to implement the neural network filters and/or an algorithm selecting an assessment in view of the output of a given input will be, it will be understood that the reliability of the assessment is strongly dependent on the quality of the data available for analysis. It will be understood that techniques such as cross correlation and/or sliding parameters are particularly useful for a more precise analysis and in particular in personalizing the assessment and that providing data suitable for such techniques is vital to allow an improved assessment. In this respect it is noted that a practical implementation of an embodiment wherein a first cry detection stage in simply compares the current sound level with an average preceding background sound level and subject sound data recorded immediately prior to a loud noise exceeding the comparable tort threshold and the subsequently obtained sound data to a cry pattern identification and isolation based on a spectrogram-like representation yields particularly good results in the assessment of cries and has been found to be particularly robust irrespective of for example the exact placement of a sound recording device relative to the source of sound, irrespective of the specific sound recording device and the microphone it uses and/or any typical background noises present when recording baby cries.

Once an assessment has been obtained, a corresponding output has to be generated. To this end, the result of the assessment is to be fed into an output stage (or "output manager") to generate a corresponding output signal, which can be an audible signal, a visual signal, for example a pattern displayed on a monitor or a flashing LED.

It will be understood that indicating the output may be effected by a specific output stage adapted to improve the experience of a user. For example, where an initial assessment is transferred to the output stage relating only to sound data from one or two buffers, the output manager might suppress an output of the initial assessment or might suppress the output of an initial assessment if the time since informing the user about the onset of a cry has only been short. Not immediately showing the initial assessment helps to avoid confusing the users by assessment changing over time. Also, where the user has set preferences, for example indicating that the user wishes to have the two most likely reasons to be indicated together with the respective probabilities, the output manager could prepare such output as requested.

In case the assessment stage indicates that the cry detection might have triggered due to a false positive, corresponding information could also be shown to the user and/or a corresponding request to move the baby could be lifted. Also, if initially a first assessment has been made, particularly with a sufficiently high probability and based on a large number of frames and/or cry patterns, a situation may occur where a second assessment different from the first would also be justified, for example because the reason why a baby cries has actually changed. However, it might be preferable to prevent a change of the assessments for a certain time period such as 2 or 3 minutes, again in order to avoid confusion of a user.

Once the baby has stopped crying after a given time, for example 30 seconds, one minute, 2 minute, 3 minutes, 4 minutes or 5 minutes after the crying has stopped, the corresponding display of flashing of LED or generation of an audible signal could be ended and a standard message such as "listening to your baby" or "tracking audio stream" could be generated instead. Showing the user the reason why the baby had been crying might in some instances be helpful, because frequently, where a baby is particularly exhausted, the baby falls asleep although the reasons for previous discomfort might still remain valid. Displaying the previous assessment for some time might thus be helpful to parents or caregivers.

However, in a typical situation, it is expected that the parent or caregiver attend to the baby while the baby still is crying. There, they will typically attempt to soothe the baby, for example by feeding a hungry baby, by helping a baby burp or by comforting the baby until it falls asleep. Depending on the assessment displayed and the success or failure of their attempts to soothe the baby in view of the assessment, a feedback can be entered into the local device. This is particularly helpful if the feedback is transmitted to the centralized server, preferably in a manner so that the feedback can be related to the sound data previously assessed. It will be understood that such feedback helps to improve a cry database and in particular helps to provide user tagged samples for improving the database. It should be understood that by uploading to the centralized server the feedback, information relating the feedback to the specific sound data and any assessments previously derived as well as the personalizing information, advantages may be obtained for both the operator of the centralized server, because uploading helps to enlarge the database and for the parents, because having a plurality of tagged sound cries and, preferably also the personalizing information helps to improve the personalization, for example by identifying a peer group of other babies having similar cry patterns. This helps to distinguish groups of babies even though other parameters such as sex, age, size, weight are identical. Accordingly, the personalization is improved. Also, such personalization taking into account the actual cries is a helpful where a parameter entered by the parent such as size or weight is outdated or has been entered incorrectly.

Also, it will be understood that once a peer group of other babies have been identified, information obtained for such peer group might be used for the specific baby that is found to have cry patterns similar to those of a peer group. For example, where it is found that all cries of the given baby closely resembles that of a peer group of other babies having a specific rare disease, a corresponding warning could be issued to the parents. It will be understood that methods could be implemented for rewarding parents and other caregivers in case they provide feedback; for example, where a subscription model has been implemented, a refund could be made or a current subscription could be prolonged without requiring additional payments. Therefore, in a preferred embodiment, incentive generating means and/or incentive steps to upload feedback to the centralized server are provided. It can be understood that in case the connection to the centralized server is interrupted, relevant data is stored in the local device until a connection has been established in the data has been transferred.

It should be understood that feedback need not only relate to the accuracy of translation but that also, feedback could be given relating to the accuracy of cry detection. It should also be understood that a plurality of ways to implement feedback exists, for example using an app on a smart phone used as a station remote to the local device, pressing a button on the local device or speaking into the microphone of the local device to confirm or reject the assessment.

Depending on the size of the database, the neural network filters and thus the assessment might at first not be as specific as the assessment at a later time where more samples have been collected and more cases can be distinguished; accordingly, a general cry detection filter might be used. However, as the database is growing, the filter will become more and more specific.

Thereafter, it is to be anticipated that further distinctions can be made once enough samples have been collected, for example from particularly heavy or large babies that will sound different from smaller, more lightweight babies. The update of filters can be automated, for example once every week, adapting the filter to a mean general filter for the specific age/peer group. Also, while according to current knowledge, no significant differences are found in the baby cries of very young newborns, it is to be anticipated that the older the infant becomes, the more differentiated the cries will be depending on for example the country of origin or the mother language the incident he is on a regular basis. Accordingly, with a suitable adaption of cry detection filters, it might be possible to use the device longer and/or obtain more precise results for older kids, which is of particular advantage where non-standard cries not known to parents are analysed, such as those relating to specific diseases.

In this context, it can be assumed that a baby when growing older is likely to grow older in the same manner as other, similar babies in its peer group of same age/same sex/same size-babies and thus, will undergo a similar development of its speech organs. This assumption may be considered valid as long as no contradicting information is entered by the parents and/or as long as the cries tagged by parental feedback do not differ from corresponding cries of babies in the same peer group so that often, a filter can be determined for the respective peer group. A reassessment of the peer group could however also be effected every time the filters are updated and/or a specific period of time has passed.

The data uploaded to the centralized server would be entered into a database and the sounds samples in the database tagged by the user feedback will be repeatedly used to re-train the neural network filters used in the cry translation and, in as far as background noise is also transmitted to the database, to re-train the neural network filters used in cry detection. Regarding training of neural network filters, retraining of the database in view of novelties and so forth, it is considered that such techniques are well known in the art. This allows to provide adaptive filters even where only a limited amount of data for a specific kid is uploaded, for example because parents do not wish to transmit data for privacy reasons.

Above, it has been mentioned that the method would be applicable and devices would be usable in pediatric stations. In pediatric stations, the local device might pick up sound from more than one baby. The same e.g. holds for the surveillance of twins. In setups where a danger exists that the local device might pick up sound from more than one baby, a plurality of possibilities exist. First of all, it would be possible to connect to the local device to a plurality of microphones, with each microphone being placed very close to one of the babies. Then, a decision could be made which baby is crying in view of the sound intensity received from each of these microphones. Where a plurality of local devices rather than using a plurality of microphones connected to one single local device wire cables is used, the devices could exchange information regarding the sound intensity recorded at each local device and a decision could be based on the information exchanged. It will be understood that this even works for monozygotic twins. Another possibility would be to detect any cry and to assess each cry with a plurality of different personalizations, with each personalization corresponding to one of the babies monitored. For each of the personalizations, the likelihood that the assessment of the cry is correct can be determined and the assessment with the highest likelihood can be issued. Another possibility would be to indicate all possible assessments and let the caregiver decide which baby is crying accordingly which assessment is relevant. This could be a preferred implementation for pediatric stations. Accordingly, the device can easily be used simultaneously for a plurality of babies.

Accordingly, what has been suggested above is inter alia and without restricting the application a computer-implemented method of providing data for an automated baby cry assessment, comprising the steps of acoustically monitoring a baby and providing a corresponding stream of sound data, detecting a cry in the stream of sound data, selecting cry related data from the sound data in response to the detection of a cry, determining parameters from the selected cry data allowing cry assessment, determining personal baby data for a personalized cry assessment, preparing an assessment stage for assessment according to personal baby data, and feeding the parameters into the cry assessment stage prepared according to personal baby data. Note that in a particular embodiment, the parameters can be times a cry pattern has been identified and/or representations of the sound data corresponding to isolated cry patterns in a spectrogram like manner.

Furthermore, for the method suggested, it has been disclosed that the baby can be continuously acoustically monitored and pre-cry sound data is stored at least temporarily until subsequent sound data have been found to be not cry-related, e.g. because no cry patterns have been identified therein with a sufficiently high probability It has also been disclosed that in a method as suggested, a baby cry, in particular the onset of a baby cry in a continuous acoustical monitoring stream is detected based on at least one of a current sound level exceeding a threshold, a current sound level exceeding average background noise by a given margin, a current sound level in one or more frequency bands exceeding a threshold, a current sound level in one or more frequency bands exceeding corresponding average background noise by a given margin, a temporal pattern of the sound, a temporal pattern and/or spectral pattern of sound level deviating from temporal and/or spectral pattern patterns of sudden loud non-cry noises, non-acoustical hints, in particular derived from video surveillance data of the baby, a movement detector and/or a breathing detector.

It is also noted that the selected cry data from which parameters allowing cry assessment are determined may comprise sound data from the onset of a crying event, in particular sound data from the initial two seconds of the cry, preferably from the initial second of the cry, in particular preferably from the initial 500 ms of the cry. This can be done by examining, in a manner isolating cry patterns therefrom if present, windows comprising the time preceding an increase of sound level. Also, a computer-implemented method has been disclosed that additionally might comprise the steps of locally detecting a cry in the sound obtained from an acoustically monitored baby, and uploading data into a server arrangement used in a centralized automated baby cry assessment, in particular uploading selected data for assessing the baby cry in a cloud.

Then, it has also been disclosed that the method may comprise the step of uploading to a cloud data relating to the acoustical monitoring of the baby crying, and/or parameters relating to the selected cry allowing cry assessment and/or comprising the step of storing on a server at least some of the cries and/or parameters derived from the cries together with personal baby data and to establish an assessment in view of the information stored on the server.

It should be understood that a method as disclosed and suggested may also comprise the step of downloading from a centralized server information allowing a local personalized baby cry assessment, in particular allowing local personalized baby cry assessment for a limited time. It is noted that in a preferred computer-implemented method as disclosed and suggested monitoring sound data acquired before the onset of a cry is used for determining an acoustical background and/or for determining additional parameters for baby cry assessment, in particular if the exact onset cannot be determined with a sufficiently high probability.

Then, it has also been suggested that parameters are fed into a cry assessment stage in a manner allowing the assessment of the cry using neural networks and/or artificial intelligence techniques, in particular wherein the parameters fed into a cry assessment stage are obtained by transfer learning and/or obtained by training a model on cries of a single baby only.

Furthermore, it has been disclosed that the method may also comprise uploading the parameters and/or a datastream of recorded sound together with baby data information, in particular baby data information relating to at least one of age, sex, size, weight, ethnicity, single/twin/triplets, current medical status, known medical preconditions, in particular known current diseases and/or fever, language of parents and/or caregivers, and/or uploading baby data information relating to the accuracy of one or more previous assessments.

It is noted that it has also been disclosed that parameters determined from the selected cry data are selected such that the assessment of at least one condition of "baby tired", "baby hungry", "baby needs comforting", "baby needs to burp", "baby in pain" is allowed.

Note that an automated baby cry assessment arrangement has also been disclosed, comprising in one embodiment a microphone for continuously acoustically monitoring a baby, a digital conversion stage for converting a monitoring sound stream into a stream of digital data, a memory stage for storing personal baby data information, a communication stage for transmitting data to a centralized server arrangement, wherein a cry identification stage for identifying the onset of cries in the stream of digital data is provided and the communication stage is adapted and to receive from the centralized server arrangement data relating to a personalized assessment of baby cries.

Furthermore, it has also been disclosed that the automated baby cry assessment arrangement may further comprise a feedback arrangement for obtaining feedback information relating to the accuracy of one or more previous assessments and wherein the communication stage is adapted for transmitting feedback information to a centralized server arrangement. It is suggested that an automated baby cry assessment arrangement may comprise a local assessment stage, the local assessment stage being adapted to assess baby cries in view of data received from the centralized server arrangement relating to a personalized assessment of baby cries. Note that it is possible that an automated baby cry assessment arrangement comprises a timer and an evaluation stage evaluating the current age of personal baby data information and/or an age or validity of data received from the centralized server arrangement and relating to a personalized assessment of baby cries, prior to the assessment of the baby cry, the baby cry assessment arrangement being adapted to output a baby cry assessment depending on the evaluation.

While in view of the dependency of the claims as filed, certain features are explicitly disclosed to be combinable, it is not intended to restrict the disclosure to only the combination disclosed in the claims as originally filed. For example, an embodiment of a method according to appended claim 2 may be preferable wherein a convolutional neural network for cry pattern detection and isolation is non-personalized, and wherein the search for cry patterns is effected using a convolutional neural network for identifying the cry patterns, but not based on spectrogram-like representations of the sound data. Also, it would be e.g. possible to use a computer-implemented method as described in claim 5 and uploading any sound related data such as cry pattern representations identified and isolated together with baby data information relating to at least a plurality of age, sex, size, weight, ethnicity, single/twin/triplets, current medical status, known medical preconditions, in particular known current diseases and/or fever, language of parents and/or caregivers and/or uploading baby data information relating to the accuracy of one or more previous assessments, even if the machine learning model for cry pattern detection and isolation is personalized.

The invention claimed is:

1. A computer-implemented method of providing data for an automated personalized baby cry assessment, comprising:

obtaining personal information relating to a baby, wherein the personal information relating to the baby includes at least an age, weight and size of the baby for a personalized cry assessment, acoustically monitoring the baby in an environment having background noises and providing a corresponding acoustical monitoring stream of sound data samples, detecting cry related patterns in the acoustical monitoring stream of sound data samples at least in view of a temporal and/or spectral pattern of the sound, selecting the detected cry related patterns for further assessment, and providing the selected cry related patterns together with the obtained personal information for further assessment, carrying out an assessment of the selected cry related patterns based on the obtained personal information in order to classify the selected cry related patterns into plurality of pre-defined classes, by successively evaluating the selected cry related patterns by comparing each selected cry related pattern to patterns known to correspond to different predefined classes of cry reasons for babies in a predefined age, weight and size ranges, wherein said predefined age, weight and size ranges are, weight and size ranges containing said respective age, weight and size of the baby, wherein each selected cry-related pattern is compared only to patterns corresponding to said predefined classes for babies in said age, weight and size ranges, to yield a plurality of probabilities for each respective selected cry related pattern to belong to a respective of the different classes, establishing a sequence of such pluralities of probabilities by the successive evaluation of cry related patterns, and determining a reason for the baby crying based on an aggregation of the sequence of pluralities of probabilities, said aggregation being based on a temporal evolution of the detected patterns, by determining which of the predefined classes the baby cry belongs to based on the aggregated sequence of pluralities of probabilities, wherein said predefined classes comprise at least one of hunger, tiredness, pain, discomfort, in need of comfort, a need to burp, suffering from exhalation.

2. The method according to claim 1, wherein a sequence of sound data windows is established, spectrogram-like representations are established for each window and in each window, cry patterns are identified in the windows and data relating to the cry patterns is selected for further assessment.

3. The method according to claim 2, wherein the data relating to the cry patterns is selected for further assessment using windows that are overlapping in time.

4. The method according to claim 2, wherein the search for cry patterns is effected using a convolutional neural network for identifying the cry patterns in spectrogram-like representations of the sound data.

5. The method according to claim 4, comprising storing the sound data at least temporarily in a manner such that a temporal and/or spectral pattern can be established for the search of cry related parts based on the sound data at least partially obtained prior to the sound level exceeding a threshold.

6. The computer-implemented method according to claim 1 using the predefined classes such that an assessment of at least one condition of "baby tired", "baby hungry", "baby needs comforting", "baby needs to burp", "baby in pain" can be effected.

7. The computer-implemented method according to claim 1, comprising uploading, to a centralized device, sound related data together with baby data information relating to at least a plurality of age, sex, size, weight, ethnicity, single/twin/triplets, current medical status, known medical preconditions, known current diseases and/or fever, language of parents and/or caregivers and/or uploading to a centralized device baby data information relating to the accuracy of one or more previous assessments.

8. The computer-implemented method according to claim 1, wherein detecting a baby cry in the acoustical monitoring stream of sound data samples in view of a temporal and/or spectral pattern of the sound is effected as part of a multistep/multistage cry identification with a preceding detection step considering whether a sound level exceeding a threshold has been observed, wherein the step of considering whether a sound level exceeding a threshold has been observed is based on at least one of:

a current sound level exceeding a threshold, a current sound level exceeding average background noise by a given margin, a current sound level in one or more frequency bands exceeding a threshold, a current sound level in one or more frequency bands exceeding corresponding average background noise by a given margin, a temporal pattern of the sound, a temporal pattern and/or spectral pattern of sound level deviating from temporal and/or spectral pattern patterns of sudden loud non-cry noises, and/or non-acoustic hints, wherein such comparison is effected locally.

9. The computer-implemented method according to claim 8, wherein the non-acoustic hints are derived from video surveillance data of the baby, a movement detector and/or a breathing detector.

10. The computer-implemented method according to claim 8, wherein the comparison effected locally is effected during the identification of the cry patterns in a spectrogram-like representation of the sound data using a convolutional neural network on a data processing arrangement remote from the baby.

11. The computer-implemented method according to claim 10, wherein the data processing arrangement remote from the baby is a cloud server.

12. The computer-implemented method according to claim 8, comprising locally detecting whether sounds from an acoustically monitored baby exceed the threshold, and in response to a detection of the sound exceeding the threshold, uploading data into a server arrangement used in a centralized automated cry pattern detection.

13. An automated baby cry assessment arrangement operable to carry out the method according to claim 1, comprising:

a microphone for continuously acoustically monitoring the baby in an environment having background noises and providing a corresponding stream of sound data samples, a digitizer for converting said monitored sound stream into a stream of digital data, memory for receiving and storing said personal information relating to the baby, one or more processors collectively for detecting cry related patterns in the acoustical monitoring stream of sound data samples at least in view of a temporal and/or spectral pattern of the sound, and selecting the detected cry related patterns for further assessment, and a transmitter that is adapted to provide the selected cry related patterns, together with the personal information in the memory, to a centralized server arrangement; and wherein the centralized server arrangement is configured to carry out the assessment of the selected cry related patterns based on the personal information, to classify the selected cry related patterns into said pre-defined classes.

14. The automated baby cry assessment arrangement according to claim 13, further comprising a feedback arrangement for obtaining feedback information relating to the accuracy of one or more previous assessments and wherein the transmitter is adapted for transmitting feedback information to the centralized server arrangement.

15. The automated baby cry assessment arrangement according to claim 13, wherein the one or more processors are further collectively adapted to assess baby cries in view of data received from the centralized server arrangement relating to a personalized assessment of baby cries.

16. The automated baby cry assessment arrangement according to claim 13 comprising a timer, wherein the one or more processors are further collectively adapted for evaluating the current age of personal baby data information and/or an age or validity of data received from the centralized server arrangement, and relating to a personalized assessment of baby cries, prior to the assessment of the baby cry, the baby cry assessment arrangement being adapted to output a baby cry assessment depending on the evaluation.

17. A computer-implemented method of providing data for an automated personalized baby cry assessment, comprising:

obtaining personal information relating to a baby, wherein the personal information relating to the baby includes at least an age, weight and size of the baby for a personalized cry assessment, acoustically monitoring the baby in an environment having background noises and providing a corresponding acoustical monitoring stream of sound data samples, detecting cry related patterns in the acoustical monitoring stream of sound data samples at least in view of a temporal and/or spectral pattern of the sound, selecting the detected cry related patterns for further assessment, and providing the selected cry related patterns together with the obtained personal information to an assessment module, carrying out an assessment, via said assessment module, of the selected cry related patterns based on the obtained personal information in order to classify the selected cry related patterns into plurality of pre-defined classes by successively evaluating the selected cry related patterns by comparing each selected cry related pattern to patterns known to correspond to different predefined classes of cry reasons for babies in predefined age, weight and size ranges, wherein said predefined age, weight and size ranges are age, weight and size ranges containing said respective age, weight and size of the baby, wherein each selected cry related pattern is compared only to patterns corresponding to said predefined classes for babies in said age, weight and size ranges, to yield a plurality of probabilities for each respective selected cry related pattern to belong to a respective of the different classes, establishing a sequence of such pluralities of probabilities by the successive evaluation of cry related patterns, and determining a reason for the baby crying based on an aggregation of the sequence of pluralities of probabilities, said aggregation being based on a temporal evolution of the detected patterns, by determining which of the predefined classes the baby cry belongs to based on the aggregated sequence of pluralities of probabilities.

18. The computer-implemented method according to claim 17 using the predefined classes such that an assessment of at least one, condition of “baby tired”, “baby hungry”, “baby needs comforting”, “baby needs to burp”, “baby in pain” can be effected.

* * * * *